(12) United States Patent
Yeo et al.

(10) Patent No.: US 12,355,575 B2
(45) Date of Patent: Jul. 8, 2025

(54) METHOD AND DEVICE FOR TRANSMITTING OR RECEIVING GROUPCAST FEEDBACK IN WIRELESS CELLULAR COMMUNICATION SYSTEM

(71) Applicant: Samsung Electronics Co., Ltd., Gyeonggi-do (KR)

(72) Inventors: Jeongho Yeo, Gyeonggi-do (KR); Hyunseok Ryu, Gyeonggi-do (KR); Sungjin Park, Gyeonggi-do (KR); Jonghyun Bang, Gyeonggi-do (KR); Jinyoung Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/529,885

(22) Filed: Dec. 5, 2023

(65) Prior Publication Data

US 2024/0121034 A1 Apr. 11, 2024

Related U.S. Application Data

(63) Continuation of application No. 16/588,317, filed on Sep. 30, 2019, now Pat. No. 11,838,132.

(30) Foreign Application Priority Data

Sep. 28, 2018 (KR) .................. 10-2018-0116415
Mar. 21, 2019 (KR) .................. 10-2019-0032465
(Continued)

(51) Int. Cl.
*H04W 28/04* (2009.01)
*H04L 1/1812* (2023.01)
*H04L 1/1829* (2023.01)

(52) U.S. Cl.
CPC .......... *H04L 1/1854* (2013.01); *H04L 1/1812* (2013.01); *H04W 28/04* (2013.01)

(58) Field of Classification Search
CPC .... H04W 28/04; H04W 72/20; H04W 72/543
See application file for complete search history.

(56) References Cited

U.S. PATENT DOCUMENTS

2010/0296427 A1* 11/2010 Lohr .................. H04L 1/1822
                                                                              370/312
2016/0278003 A1*  9/2016 Kim .................. H04W 72/0446
(Continued)

OTHER PUBLICATIONS

3GPP TR 36.890 V13.0.0 (Jun. 2015), 3rd Generation Partnership Project; Technical Specification Group Radio Access Network; Evolved Universal Terrestrial Radio Access (E-UTRA); Study on single-cell point-to-multipoint transmission for E-UTRA (Release 13), 32 pages.

(Continued)

*Primary Examiner* — Pamit Kaur
(74) *Attorney, Agent, or Firm* — The Farrell Law Firm, P.C.

(57) ABSTRACT

The disclosure relates to a communication method for converging an IoT technology with a 5G communication system for supporting a higher data transfer rate beyond the 4G system; and a system therefor. The disclosure can be applied to intelligent services (for example, smart homes, smart buildings, smart cities, smart cars or connected cars, healthcare, digital education, retail business, security and safety services, etc.), based on 5G communication technologies and IoT-related technologies. A method and terminal are provided. The method includes receiving first sidelink control information (SCI) and first data corresponding to the first SCI, the first SCI including first priority information, receiving second SCI and second data corresponding to the second SCI, the second SCI including second priority information, identifying whether first feedback information associated with the first data or second feedback information associated with the second data is transmitted based on the (Continued)

first priority information or the second priority information when a resource for the first feedback information and a resource for the second feedback information are overlapped, and transmitting one of the first feedback information or the second feedback information which is associated with higher priority.

20 Claims, 28 Drawing Sheets

(30) Foreign Application Priority Data

May 31, 2019 (KR) ........................ 10-2019-0064874
Jul. 5, 2019 (KR) ........................ 10-2019-0081603
Aug. 14, 2019 (KR) ........................ 10-2019-0099866

(56) References Cited

U.S. PATENT DOCUMENTS

| | | |
|---|---|---|
| 2016/0302215 A1 | 10/2016 | Sorrentino |
| 2017/0105198 A1 | 4/2017 | Fu et al. |
| 2017/0325277 A1 | 11/2017 | Fujishiro |
| 2018/0317213 A1* | 11/2018 | Islam ................ H04L 1/1614 |
| 2019/0052436 A1 | 2/2019 | Desai |
| 2019/0132104 A1 | 5/2019 | Lee |
| 2020/0137536 A1 | 4/2020 | Nguyen |
| 2020/0236666 A1 | 7/2020 | Yu |
| 2020/0305176 A1 | 9/2020 | Hu |
| 2020/0328848 A1* | 10/2020 | He ................ H04L 1/1854 |
| 2021/0219320 A1 | 7/2021 | Belleschi |

OTHER PUBLICATIONS

3GPP TS 36.321 V14.7.0 (Jul. 2018), 3rd Generation Partnership Project; Technical Specification Group Radio Access Network; Evolved Universal Terrestrial Radio Access (E-UTRA); Medium Access Control (MAC) protocol specification (Release 14), 110 pages.
NTT Docomo, Inc., "QoS Management", R1-1809161, 3GPP TSG RAN WG1 Meeting #94, Aug. 20-24, 2018, 4 pages.
Fraunhofer IIS et al., "QoS Management for NR V2X", R1-1808540, 3GPP TSG RAN WG1 Meeting #94, Aug. 20-24, 2018, 3 pages.
Samsung, "Discussion on QoS Management for NR V2X", R1-1808783, 3GPP TSG RAN WG1 Meeting #94, Aug. 20-24, 2018, 2 pages,.
LG Electronics, "Discussion on QoS Management", R1-1808527, 3GPP TSG RAN WG1 Meeting #94, Aug. 20-24, 2018, 2 pages.
International Search Report dated Jan. 7, 2020 issued in counterpart application No. PCT/KR2019/012613, 8 pages.
3GPP TS 36.523-1 V15.3.0 (Sep. 2018), pp. 868.
Korean Office Action dated Dec. 23, 2024 issued in counterpart application No. 10-2019-0099866, 8 pages.

* cited by examiner

METHOD AND DEVICE FOR TRANSMITTING OR RECEIVING GROUPCAST FEEDBACK IN WIRELESS CELLULAR COMMUNICATION SYSTEM

CROSS-REFERENCE TO RELATED APPLICATION(S)

This application is a continuation of U.S. patent application Ser. No. 16/588,317, which was filed in the U.S. Patent and Trademark Office on Sep. 30, 2019, and claims priority under 35 U.S.C. § 119 to Korean Patent Application Serial Nos. 10-2018-0116415, 10-2019-0032465, 10-2019-0064874, 10-2019-0081603, and 10-2019-0099866 filed on Sep. 28, 2018, Mar. 21, 2019, May 31, 2019, Jul. 5, 2019, and Aug. 14, 2019, respectively, in the Korean Intellectual Property Office, the entire disclosure of each of which is incorporated herein by reference.

BACKGROUND

1. Field

The present disclosure relates generally to a wireless communication system and, more particularly, to a method and device for transmitting a hybrid automatic repeat request acknowledgement (HARQ-ACK) feedback for groupcast or unicast data communication in device-to-device communication.

2) Description of Related Art

In order to meet wireless data traffic demands increasing after commercialization of 4G communication system, efforts to develop an improved 5G communication system or a pre-5G communication system have been made. For this reason, the 5G communication system or the pre-5G communication system is called a beyond 4G network communication system or a post LTE system. The 5G communication system is being considered to be implemented in a super-high frequency (mmWave) band (e.g., about 60 GHz band) to achieve a higher data transfer rate. To reduce the path loss of radio waves and increase the transfer distance of radio waves in a super-high frequency band, technologies including beamforming, massive multiple-input and multiple-output (MIMO), full dimensional MIMO (FD-MIMO), array antennas, analog beamforming, and large scale antennas have been discussed for the 5G communication system. Further, technologies such as an evolved small cell, an advanced small cell, a cloud radio access network (cloud RAN), an ultra-dense network, device to device communication (D2D), a wireless backhaul, a moving network, cooperative communication, coordinated multi-points (CoMP), and received interference cancellation have been developed for the 5G communication system to improve the system network. In addition, advanced coding modulation (ACM) schemes such as hybrid (frequency shift keying (FSK) and quadrature amplitude modulation (QAM) modulation (FQAM) and sliding window superposition coding (SWSC), and advanced access technologies such as filter bank multi carrier (FBMC), non-orthogonal multiple access (NOMA), and sparse code multiple access (SCMA) have been developed for the 5G system.

Meanwhile, the Internet has been evolved to an Internet of things (IoT) network in which distributed components such as objects exchange and process information from a human-oriented connection network in which humans generate and consume information. In addition, Internet of everything (IoE) technology in which big data processing technique using connection with a cloud server is combined with IoT technology has emerged. In order to implement IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In the IoT environment, an intelligent Internet technology service of collecting and analyzing data generated from connected objects, to generate new value for human life can be provided. The IoT may be applied to fields, such as smart homes, smart buildings, smart cities, smart cars or connected cars, smart grids, health care, smart home appliances, or high-tech medical services, through the fusion and convergence of the conventional information technology (IT) and various industries.

Accordingly, various attempts to apply the 5G communication system to the IoT network have been made. For example, 5G communication technologies such as a sensor network, M2M communication, MTC, and the like is being implemented by a scheme such as beamforming, MIMO, an array antenna, and the like. The use of a cloud RAN as a big data processing technique as described above may also be an example of the fusion of a 5G technology and IoT technology.

In addition, device-to-device communication using the 5G communication system (or 5G and LTE) has been studied and may be called sidelink communication. In order to efficiently perform the device-to-device communication, a method and device for transmitting HARQ feedback on data transmitted in device-to-device communication has been researched.

It is necessary to provide a method and device for efficiently performing device-to-device communication. Specifically, a method and device for transmitting a HARQ-ACK feedback and retransmitting data for device-to-device communication is required to be provided.

SUMMARY

The present disclosure has been made to address at least the disadvantages described above and to provide at least the advantages described below.

In accordance with an aspect of the present disclosure, a method of a terminal in a communication system is provided. The method includes receiving first sidelink control information (SCI) and first data corresponding to the first SCI, the first SCI including first priority information, receiving second SCI and second data corresponding to the second SCI, the second SCI including second priority information, identifying whether first feedback information associated with the first data or second feedback information associated with the second data is transmitted based on the first priority information or the second priority information when a resource for the first feedback information and a resource for the second feedback information are overlapped, and transmitting one of the first feedback information or the second feedback information which is associated with higher priority.

In accordance with an aspect of the present disclosure, a terminal in a communication system is provided. The terminal includes a transceiver and a controller coupled with the transceiver configured to receive first SCI and first data corresponding to the first SCI, the first SCI including first priority information, receive second SCI and second data corresponding to the second SCI, the second SCI including second priority information, identify whether first feedback information associated with the first data or second feedback information associated with the second data is transmitted based on the first priority information or the second priority information when a resource for the first feedback information and a resource for the second feedback information are overlapped, and transmit one of the first feedback information or the second feedback information which is associated with higher priority.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
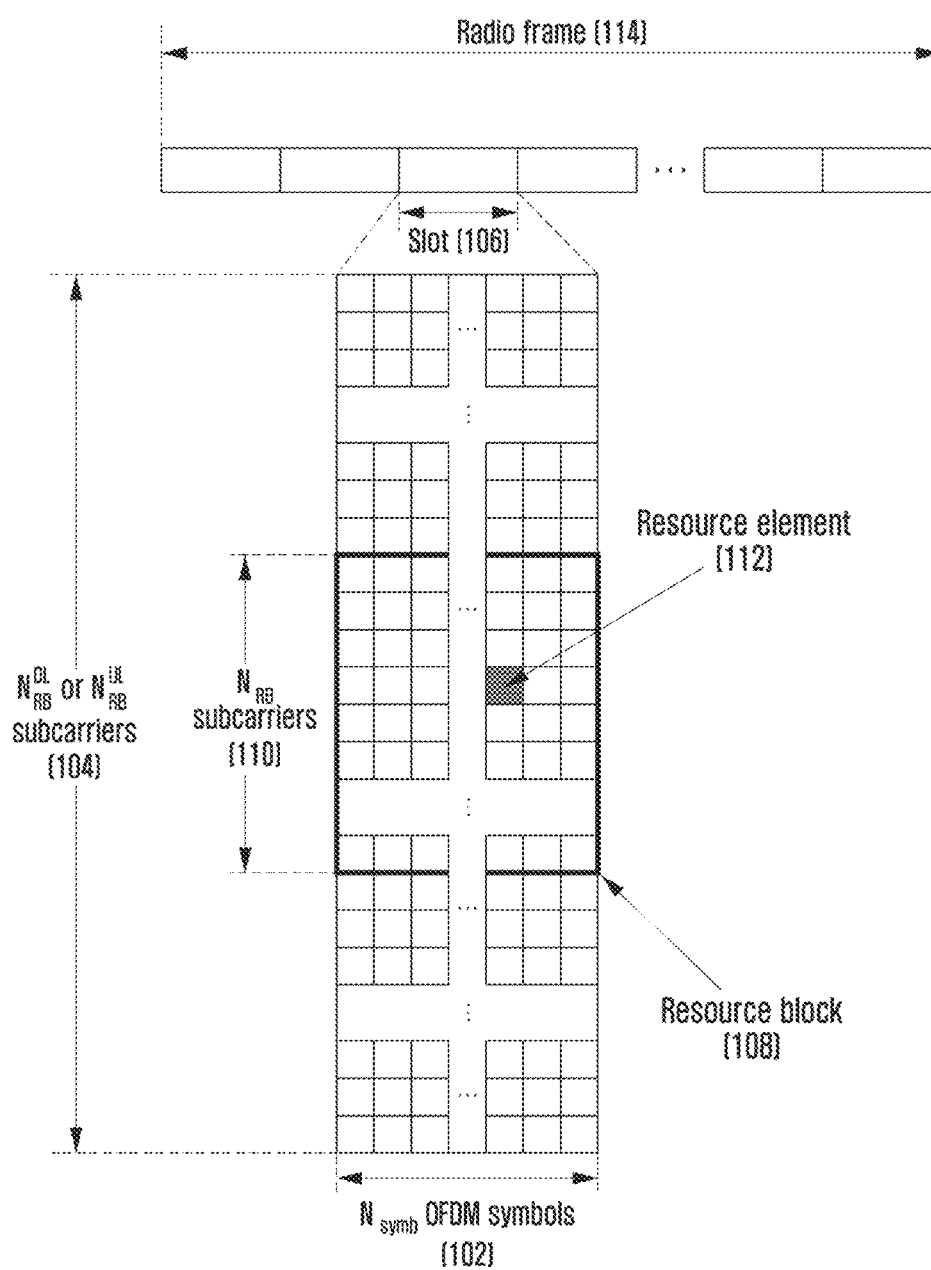
FIG. 1 illustrates a time-frequency domain transmission structure in a downlink or an uplink in a 5G (or new radio (NR)) system, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," " adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The term "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

A new radio access technology (NR), which is new 5G communication, has been designed so that various services are freely multiplexed in time and frequency resources, whereby waveforms, numerology, etc., and a reference signal, etc. can be allocated dynamically or freely according to a demand of a corresponding service. In an NR system, types of supported services are categorized into eMBB, mMTC, URLLC, and the like, and eMBB is a service aimed at transmitting high capacity data at a high speed, mMTC is a service aimed at minimizing power consumption of a terminal and allowing connection of a plurality of terminals, and URLLC is a service aimed at high reliability and low latency. Different requirements may be applied according to the types of services applied to a terminal.

Meanwhile, as recent research progresses on a next generation communication system, various methods for scheduling communication with a terminal has been discussed. Accordingly, an efficient scheduling and data transmission/reception method considering the characteristics of a next communication system has been required.

In the following description, a base station is a subject that performs resource allocation to a terminal and may be at least one of gNode B (gNB), eNode B(eNB), Node B, a base station (BS), a radio access unit, a base station controller, or a node on a network. A terminal may include a user equipment (UE), a mobile station (MS), a cellular phone, a smartphone, a car, a transport means (vehicle), a pedestrian, or a road side unit (RSU), a computer, or a multimedia system equipped with communication function. In the disclosure, the term "downlink" (DL) refers to a wireless transmission path of a signal transmitted by a base station to a terminal, and the term "uplink" (UL) refers to a wireless transmission path of a signal transmitted by a terminal to a base station. Although embodiments will be described below with reference to NR systems, the embodiments may also be applied to other communication systems having similar technical backgrounds or channel formats. Further, the embodiments may also be applied to other communication systems through partial modifications thereof in a range that does not greatly deviate from the scope of the disclosure through the judgment of those skilled in the art.

In the disclosure, the conventional terms of "a physical channel" and "a signal" may be used together with data or a control signal. For example, a physical downlink shared channel (PDSCH) is a physical channel through which data is transmitted, but a PDSCH may indicate data in the disclosure.

Hereinafter, in the disclosure, higher layer signaling is a signal transferring method for transferring a signal by a base station to a terminal by using a downlink data channel of a physical layer, or transferring a signal by a terminal to a base station by using an uplink data channel of a physical layer, and may be referred to as radio resource control (RRC) signaling or a MAC control element (CE).

A wireless communication system has been developed to be a broadband wireless communication system that provides a high speed and high quality packet data service, like the communication standards, for example, high speed packet access (HSPA), long term evolution (LTE or evolved universal terrestrial radio access (E-UTRA)), and LTE-advanced (LTE-A) of 3GPP, high rate packet data (HRPD), and ultra mobile broadband (UMB) of 3GPP2, 802.16e of IEEE, and the like, beyond the voice-based service provided at the initial stage. Further, communication standards for 5G or NR have been made in a fifth generation wireless communication system.

An NR system, which is a representative example of the broadband wireless communication system, adopts an orthogonal frequency division multiplexing (OFDM) scheme for a downlink and an uplink. More specifically, a cyclic-prefix OFDM (CP-OFDM) scheme is adopted for a downlink, and two schemes including a CP-OFDM scheme and a discrete Fourier transform spreading OFDM (DFT-S-OFDM) scheme are adopted for an uplink. In multiple access schemes as described above, time-frequency resources, on which data or control information is to be carried to each user, are usually allocated and managed to satisfy orthogonality, i.e., not to overlap to each other, so that data or control information for each user is distinguished.

The NR system employs a hybrid automatic repeat request (HARQ) scheme that retransmits corresponding data in a physical layer if decoding fails at the initial transmission. In a HARQ scheme, if a receiver fails to accurately decode data, the receiver transmits, to a transmitter, information (negative acknowledgement, (NACK)) of notifying of decoding failure, to allow the transmitter to retransmit the corresponding data in a physical layer. The receiver combines data retransmitted by the transmitter, with the previous data for which decoding has failed, to increase a data reception performance. Also, if the receiver accurately decodes data, the receiver transmits, to the transmitter, information (acknowledgement (ACK)) of notifying of decoding success, to allow the transmitter to transmit new data.

FIG. 1 illustrates a base structure of a time-frequency domain, which is a wireless resource domain in which data or control information is transmitted in a downlink or an uplink in an NR system, according to an embodiment.

In FIG. 1, the transverse axis indicates a time domain, and the longitudinal axis indicates a frequency domain. The minimum transmission unit of the time domain is an OFDM symbol, and $N_{symb}$ OFDM symbols 102 constitute a single slot 106. The length of a subframe is defined as 1.0 ms, and the length of a radio frame 114 is defined as a 10 ms. The minimum transmission unit of the frequency domain is a subcarrier, and the bandwidth of the entire system transmission band is configured by a total of $N_{BW}$ subcarriers 104.

The basic unit of resources in a time-frequency domain is a resource element (RE) 112, and may be indicated by an OFDM symbol index and a subcarrier index. A resource block (RB or physical resource block (PRB)) 108 is defined as consecutive $N_{symb}$ OFDM symbols 102 in the time domain and consecutive $N_{RB}$ subcarriers 110 in the frequency domain. Therefore, one RB 108 is configured by $N_{symb} \times N_{RB}$ number of REs 112. Generally, the minimum transmission unit of data is the unit of the RB. In an NR system, generally, $N_{symb}$ is 14, $N_{RB}$ is 12, and $N_{BW}$ is proportional to the bandwidth of a system transmission band. A data rate may increase proportionally to the number of RBs scheduled to a terminal. In a FDD system operating a downlink and an uplink of an NR system after dividing the downlink and the uplink according to frequency, a downlink transmission bandwidth and an uplink transmission bandwidth may be different from each other. A channel bandwidth indicates a RF bandwidth corresponding to a system transmission bandwidth. Tables 1 and 2 show a part of the corresponding relation between a system transmission bandwidth, subcarrier spacing, and a channel bandwidth, which are defined in an NR system, in a frequency band smaller than 6 GHz and a frequency band greater than 6 GHz. For example, 273 RBs constitute the transmission bandwidth of an NR system having a channel bandwidth of 100 MHz with subcarrier spacing of 30 kHz. In Table 1 and Table 2 below, N/A may indicate a bandwidth-subcarrier combination, which the NR system does not support.

TABLE 1

| | subcarrier spacing | Channel bandwidth $BW_{Channel}$ [MHz] | | | | | |
|---|---|---|---|---|---|---|---|
| | | 5 | 10 | 20 | 50 | 80 | 100 |
| Transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2

| | subcarrier spacing | Channel bandwidth BWChannel [MHz] | | | |
|---|---|---|---|---|---|
| | | 50 | 100 | 20 | 50 |
| Transmission bandwidth configuration NRB | 60 kHz | 66 | 132 | 264 | N/A |
| | 120 kHz | 32 | 66 | 132 | 264 |

In an NR system, scheduling information relating to downlink data or uplink data is transferred from a base station to a terminal through downlink control information (DCI). DCI is defined according to various formats, and may indicate, according to each format, whether DCI is scheduling information (UL grant) of uplink data or scheduling information (DL grant) of downlink data, whether DCI is compact DCI having a small size of control information, whether DCI applies spatial multiplexing using a multi-antenna, whether DCI is DCI for power control, etc. For example, DCI format 1_1, which is scheduling control information (DL grant) of downlink data, may include at least one of pieces of control information as follows: carrier indicator, which indicates on which frequency carrier transmission is performed; DCI format indicator, which classifies corresponding DCI into DCI for a downlink or DCI for an uplink; bandwidth part (BWP) indicator, which indicates in which BWP transmission is performed; frequency domain resource allocation, which indicates an RB in a frequency domain, allocated for data transmission, where, represented resource is determined according to a system bandwidth and a resource allocation scheme; time domain resource allocation, which indicates a slot and an OFDM symbol of the slot, through which a data-related channel is to be transmitted; virtual RB (VRB)-to-PRB mapping, which indicates by which scheme a VRB index and a PRB index are to be mapped; modulation and coding scheme, (MCS), which indicates a modulation scheme and a coding rate used for data transmission, that is, MCS may indicate a coding rate value capable of informing of a transport block size (TBS) and channel coding information together with information relating to whether the modulation scheme is QPSK, 16 QAM, 64 QAM, or 256 QAM; codeblock group (CBG) transmission information, which indicates information relating to which CBG is transmitted if retransmission is configured by the units of CBGs; HARQ process number, which indicates a process number of HARQ; new data indicator, which indicates whether transmission corresponds to HARQ initial transmission or HARQ retransmission; redundancy version, which indicates a redundancy version of HARQ, and transmit power control (TPC) command for physical uplink control channel (PUCCH), which indicates a transmit power control command for a PUCCH, which is an uplink control channel.

If a PDSCH is transmitted, time domain resource allocation (assignment) may be transmitted by information relating to a slot through which the PDSCH is transmitted, S which is the position of a start symbol in the corresponding slot, and L which is the number of symbols to which the PDSCH is mapped. S may indicate a relative position from the start of a slot, L may indicate the number of consecutive symbols, and S and L may be determined by a start and length indicator value (SLIV) defined as Equation (1):

if (L−1)≤7 then

SLIV=14·(L−1)+S else

SLIV=14·(14−L+1)+(14−1−S)

where 0<L≤14−S        (1)

In an NR system, a table including, in a single row, an SLIV value, a PDSCH or physical uplink shared channel (PUSCH) mapping type, and information relating to a slot through which a PDSCH or a PUSCH is transmitted may be generally configured for a terminal through RRC configuration. After the configuration, a base station may transfer an SLIV value, a PDSCH or PUSCH mapping type, and information relating to a slot through which a PDSCH or a PUSCH is transmitted to the terminal by indicating an index value in the table configured for time domain resource allocation of the DCI.

In an NR system, type A and type B are defined as the PDSCH or PUSCH mapping type. In PDSCH or PUSCH mapping type A, a first symbol among demodulation reference signal (DMRS) symbols is positioned in a second or a third OFDM symbol in a slot, and in PDSCH or PUSCH mapping type B, a first symbol among DMRS symbols is positioned in a first OFDM symbol of a time domain resource allocated by transmission of a PUSCH.

The DCI may be transmitted on a physical downlink control channel (PDCCH), which is a downlink physical control channel, through a channel coding and modulating procedure. Generally, the DCI is scrambled to a particular radio network temporary identifier (RNTI or terminal identifier) independently for each terminal, a CRC bit is added to the scrambled DCI, and channel coding is performed thereon, and then the DCI becomes independent PDCCHs and is transmitted. The PDCCH is mapped in a control resource set (CORESET) configured for a terminal and the mapped PDCCH is then transmitted.

Downlink data may be transmitted on a PDSCH, which is a downlink data transmitting physical channel. A PDSCH may be transmitted after the control resource set, and scheduling information, such as a specific mapping position in a time and frequency domain, and a modulation scheme, is determined based on DCI transmitted through the PDCCH.

A base station notifies a terminal of a modulation scheme applied to a PDSCH to be transmitted, and the size (TBS) of data to be transmitted, through MCS among pieces of control information, which constitute the DCI. MCS may be configured by 5 bits or less or more. The TBS indicates the size of data (transport block (TB)) to be transmitted by the base station, before channel coding for correcting error is applied to the data.

In the disclosure, a TB may include a medium access control (MAC) header, a MAC CE, one or more MAC service data units (SDU), and padding bits. A TB may indicate the unit of data sent down from a MAC layer to a physical layer, or a MAC protocol data unit (PDU).

A modulation scheme supported in an NR system is QPSK, 16 QAM, 64 QAM, and 256 QAM, and modulation orders $Q_m$ correspond to 2, 4, 6, and 8, respectively. That is, QPSK modulation can transmit 2 bits per symbol, 16 QAM can transmit 4 bits per symbol, 64 QAM can transmit 6 bits per symbol, and 256 QAM can transmit 8 bits per symbol.

Figure 2:
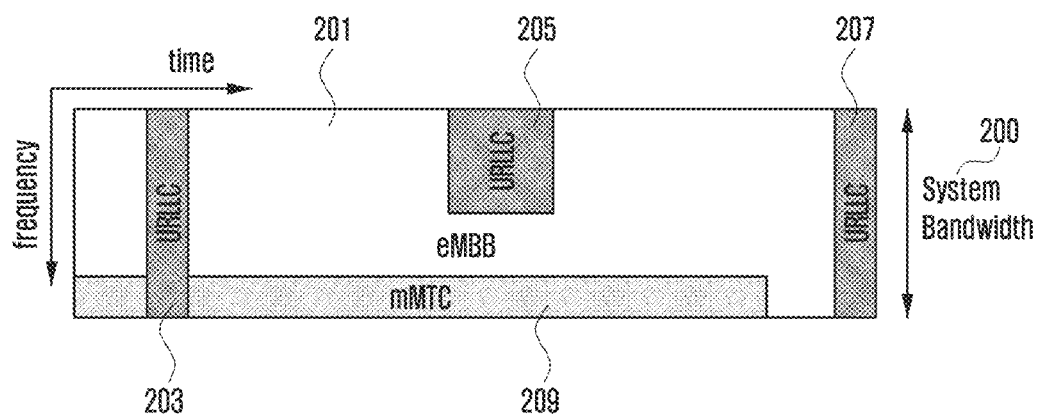
FIG. 2 is a diagram in which pieces of data of eMBB, URLLC, and mMTC are allocated in a frequency-time resource in a communication system, according to an embodiment.
Figure 3:
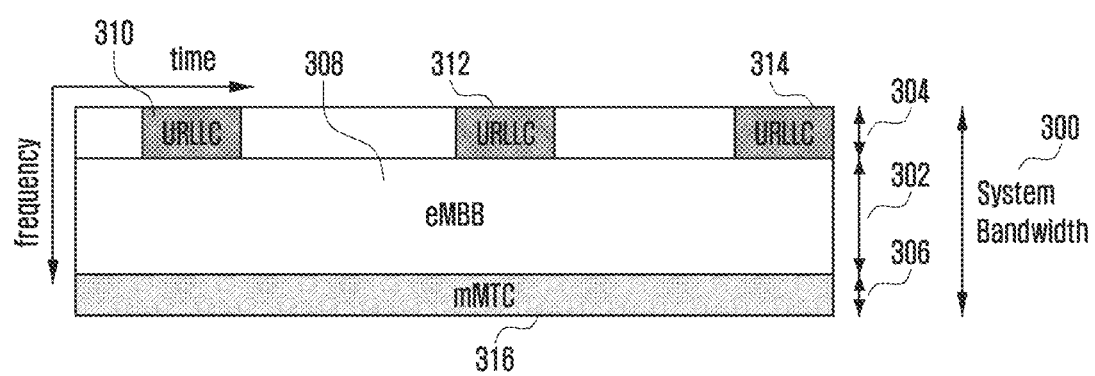
FIG. 3 is a diagram in which pieces of data of enhanced mobile broadband (eMBB), ultra-reliable and low-latency communications (URLLC), and massive machine type communications (mMTC) are allocated in a frequency-time resource in a communication system, according to an embodiment.

Each of FIGS. 2 and 3 illustrates an example in which pieces of data of eMBB, URLLC, and mMTC, which are services considered in a 5G or NR system, are allocated in a frequency-time resource.

FIG. 2 is a diagram in which pieces of data of eMBB, URLLC, and mMTC are allocated in a frequency-time resource in a communication system, according to an embodiment. FIG. 2 illustrates an example in which eMBB data, URLLC data, and mMTC data are allocated in the entire system frequency band 200. If pieces of URLLC data 203, 205, and 207 occur while eMBB data 201 and mMTC data 209 are being transmitted after being allocated to particular frequency bands, and thus the pieces of URLLC data 203, 205, and 207 are required to be transmitted, a transmitter may transmit the pieces of URLLC data 203, 205, and 207 without emptying the portions to which eMBB data 201 and mMTC data 209 have been already allocated, or transmitting the pieces of data. Since URLLC among the services is required to reduce a latency time, the pieces of URLLC data 203, 205, and 207 may be transmitted after being allocated to a part of the resource to which the eMBB data 201 is allocated. It is natural that if URLLC data is transmitted after being additionally allocated to a resource to which eMBB data is allocated, the eMBB data may not be transmitted in the overlapped frequency-time resource, so that transmission performance of eMBB data may decrease. That is, the eMBB data may fail to be transmitted due to the allocation of the URLLC.

FIG. 3 is a diagram in which pieces of data of eMBB, URLLC, and mMTC are allocated in a frequency-time resource in a communication system, according to an embodiment. FIG. 3 illustrates an example in which the entire system frequency band 300 is divided into subbands 302, 304, and 306, and each of the subbands 302, 304, and 306 is used to transmit a service and data. Information relating to the configuration of the subbands may be previously determined, and the information may be transmitted thorough higher layer signaling by a base station to a terminal. In relation to the information relating to the subbands, the base station or a network node may provide the services by randomly forming subbands without transmitting separate subband configuration information to the terminal. FIG. 3 illustrates an embodiment in which a subband 302 is used to transmit eMBB data 308, a subband 304 is used to transmit pieces of URLLC data 310, 312, and 314, and a subband 306 is used to transmit mMTC data 316.

The length of a transmission time interval (TTI) used to transmit URLLC may be smaller than that of a TTI used to transmit eMBB or mMTC. Further, a response of information relating to URLLC may be transmitted faster than that of eMBB or mMTC, so that information can be transmitted and received at low latency. The structures of physical layer channels used for the three types of services or data to transmit the three types of services or data may be different from each other. For example, at least one of the length of a TTI, the allocation unit of a frequency resource, the structure of a control channel, and a data mapping method may be different.

In the above description, three types of services and three types of data are explained, but a larger number of types of services and data corresponding thereto may exist, and the disclosure can be applied the services and data.

Figure 4:
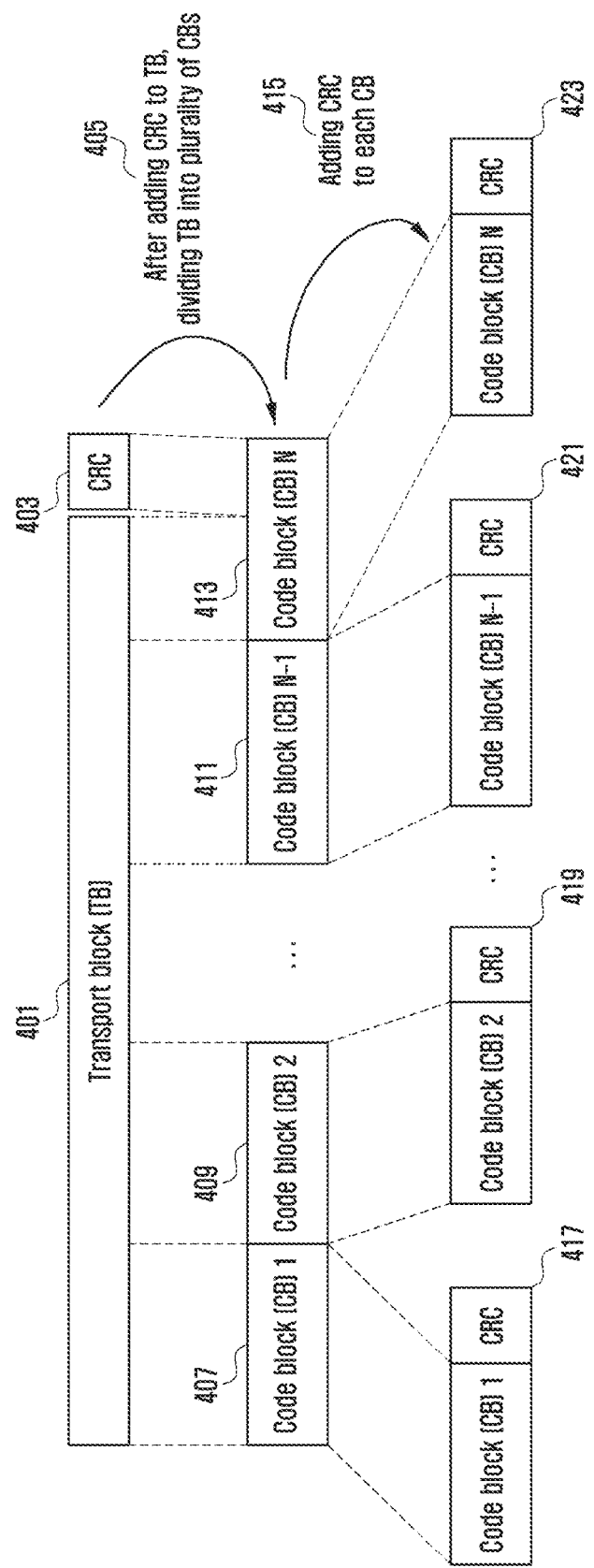
FIG. 4 is a diagram in which a single transport block is divided into a plurality of code blocks and a cyclic redundancy check (CRC) is added to the code blocks, according to an embodiment.

FIG. 4 is a diagram in which a single transport block is divided into a plurality of code blocks and a CRC is added to the code blocks, according to an embodiment.

Referring to FIG. 4, a CRC 403 may be added at the last portion or the foremost portion of a single transport block 401 to be transmitted in an uplink or a downlink. The CRC may have 16 bits, 24 bits, a predetermined number of bits, or bits, the number of which is variable according to a channel status, etc., and may be used to determine whether channel coding has succeeded. Blocks 401 and 403 in which the CRC is added to the TB may be divided into a plurality of code blocks (CB) 407, 409, 411, and 413 (operation 405). The maximum size of each of the code blocks may be previously determined before the code blocks are formed, and a last code block 413 may have a size smaller than those of the other code blocks, or may be adjusted to have the same length as those of the other code blocks by putting 0, a random value, or 1 in the last code block 413. CRCs 417, 419, 421, and 423 may be added to the divided code blocks, respectively (operation 415). The CRC may have 16 bits, 24 bits, or a predetermined number of bits, and may be used to determine whether channel coding has succeeded.

In order to generate the CRC 403, the TB 401 and a cyclic generator polynomial may be used, and the cyclic generator polynomial may be defined by various methods. For example, if a cyclic generator polynomial for a CRC having 24 bits is assumed to be $g_{CRC24A}(D)=D^{24}+D^{23}+D^{18}+D^{17}+D^{14}+D^{11}+D^{10}+D^7+D^6+D^5+D^4+D^3+D+1$ and L=24, in relation to TB data $a_0, a_1, a_2, a_3, \ldots, a_{A-1}$, CRC $p_0, p_1, p_2, p_3, \ldots, p_{L-1}$ may be determined to be $p_0, p_1, p_2, p_3, \ldots, p_{L-1}$ as a value making the remainder of $a_0D^{A+23}+a_1D^{A+22}+\ldots+a_{A-1}d^{24}+p_0D^{23}+p_1D^{22}+\ldots+p_{22}D^1+p_{23}$ be 0 after $a_0D^{A+23}+a_1D^{A+22}+\ldots+a_{A-1}D^{24}+p_0D^{23}+p_1D^{22}+\ldots+p_{22}D^1+p_{23}$ is divided by $g_{CRC24A}(D)$. As described above, an example in which L, which is the length of a CRC, is 24, has been described, but the length may be determined to be various lengths, such as 12, 16, 24, 32, 40, 48, 64, etc.

A transmitter adds a CRC to a TB according to the procedure, and then divides the TB into N number of CBs 407, 409, 411, and 413 (operation 405). CRCs 417, 419, 421, and 423 are added to the divided CBs 407, 409, 411, and 413, respectively (operation 415). The CRC added to the CB may be generated to have a length different from that of the CRC added to the TB, or may be generated by using a cyclic generator polynomial different from that used in the case where the CRC added to the TB is generated. However, the CRC 403 added to the TB and the CRCs 417, 419, 421, and 423 added to the code blocks may be omitted according to the type of a channel code to be applied to the code blocks. If a low-density parity-check (LDPC) code is applied to the code blocks rather than a turbo code, the CRCs 417, 419, 421, and 423 to be inserted into the code blocks may be omitted. However, even if the LDPC is applied, the CRCs 417, 419, 421, and 423 may be added to the code blocks. Also, if a polar code is used, the CRCs may be added thereto or may be omitted.

As illustrated in FIG. 4, the maximum length of a code block is determined according to the type of channel coding applied to a TB to be transmitted, and the TB and a CRC added to the TB are divided into code blocks according to the maximum length of the code block. In a conventional LTE system, a CRC for the divided CB is added to the CB, the data bit of the CB and the CRC are encoded by a channel code, whereby coded bits are determined, and the number of bits rate-matched with the coded bits, as previously promised, is determined.

The following embodiments provide a method and device for performing data transmission/reception between a base station and a terminal, or between a terminal and a terminal. In the embodiments, data may be transmitted by a single terminal to a plurality of terminals, or data may be transmitted by a single terminal to a single terminal. In addition, data may be transmitted by a base station to a plurality of terminals. However, the disclosure is not limited thereto and may be applied to various cases.

Figure 5:
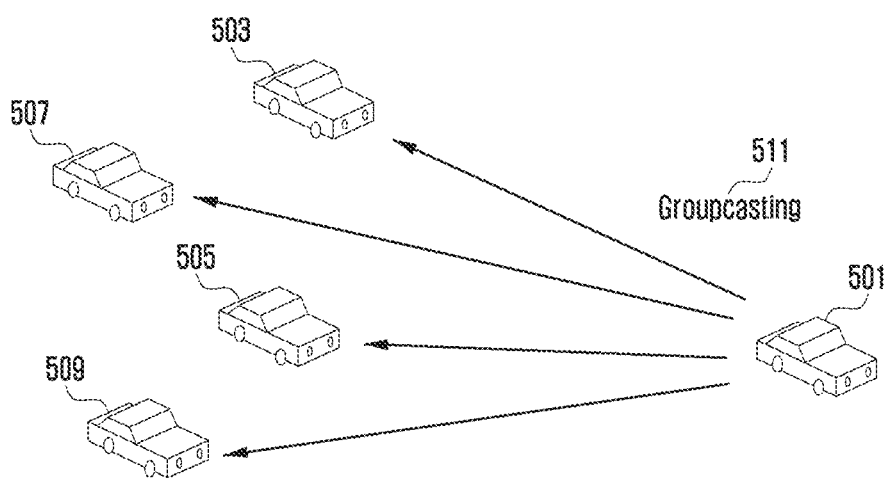
FIG. 5 illustrates an example of groupcasting for transmitting common data to a plurality of terminals by a single terminal, according to an embodiment.

FIG. 5 illustrates an example of groupcasting 511 for transmitting common data to a plurality of terminals 503, 505, 507, and 509 by a single terminal 501, according to an embodiment. The terminals may be moved when the terminal is in a car. Separate control information, a physical control channel, and data may be transmitted for the groupcasting.

Figure 6:
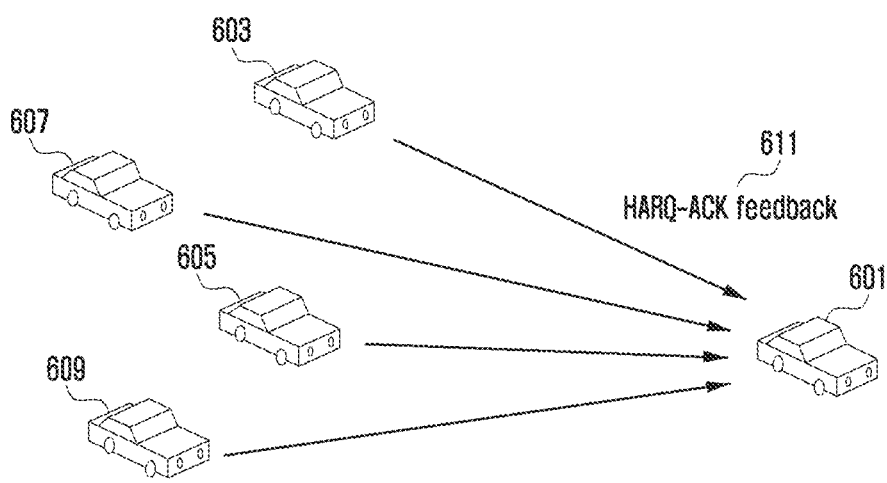
FIG. 6 illustrates a procedure in which terminals, which have received common data by groupcasting, transmit information relating to success or failure of reception of the data to a terminal, which has transmitted the data, according to an embodiment.

FIG. 6 illustrates a procedure in which terminals 603, 605, 607, and 609, which have received common data by groupcasting, transmit information relating to success or failure of reception of the data to a terminal 601, which has transmitted the data, according to an embodiment. The information may be HARQ-ACK feedback. (operation 611). The terminals may have an LTE-based sidelink function or an NR-based sidelink function. If a terminal has only an LTE-based sidelink function, it may be impossible for the terminal to transmit or receive an NR-based sidelink signal and an NR-based physical channel. In the disclosure, sidelink may be used together with PC5, vehicle-to-everything (V2X), or device-to-device (D2D FIGS. 5 and 6 illustrate an example of transmission and reception according to groupcasting, but the descriptions may also be applied to a unicast signal transmission and reception between terminals.

Figure 7:
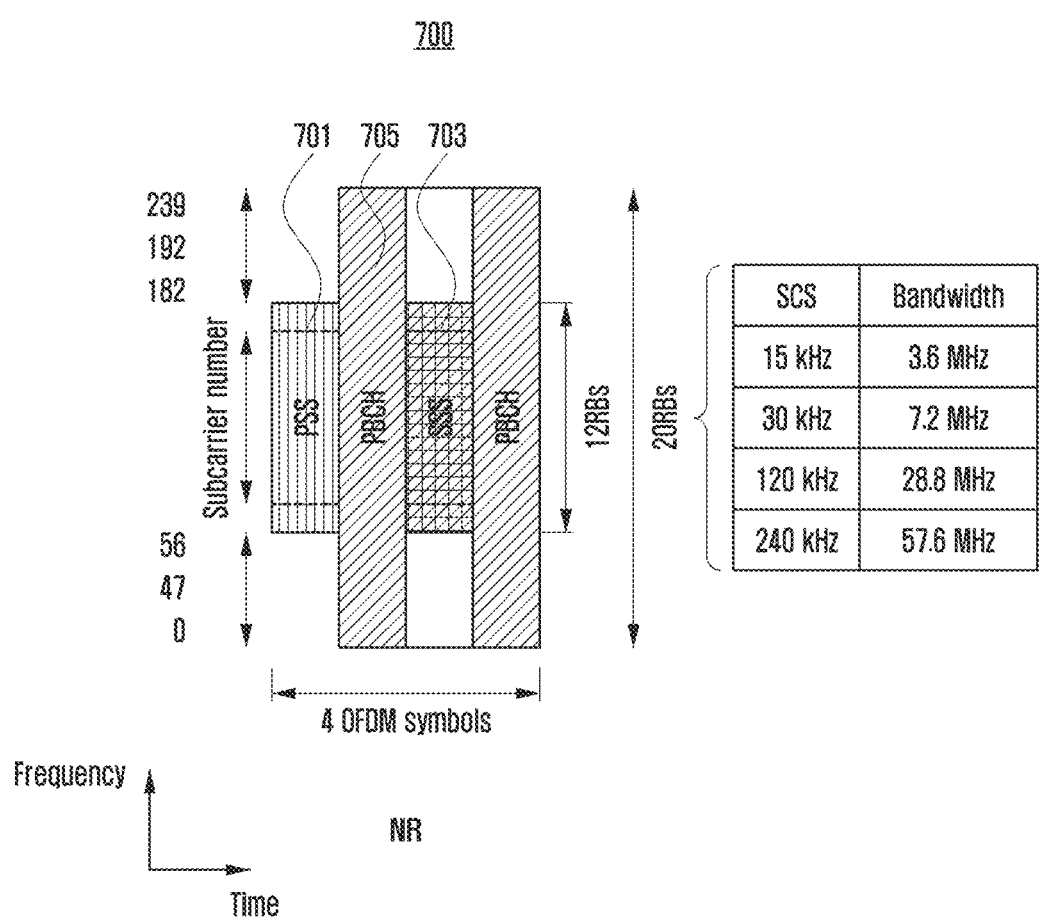
FIG. 7 is a diagram of a synchronization signal and a physical broadcast channel of an NR system, which are mapped in a frequency and time domain, according to an embodiment.

FIG. 7 is a diagram of a synchronization signal and a physical broadcast channel (PBCH) of an NR system, which are mapped in a frequency and time domain, according to an embodiment. A primary synchronization signal (PSS) 701, an auxiliary synchronization signal (secondary synchronization signal, SSS) 703, and PBCHs 705 are mapped over 4 OFDM symbols, the PSS and the SSS are mapped to 12 RBs, and the PBCH is mapped to 20 RBs. The table 700 in FIG. 7 shows how the frequency band for 20 RBs changes according to subcarrier spacing (SCS). A resource domain in which the PSS, SSS, and PBCH are transmitted may be called a SS/PBCH block.

Figure 8:
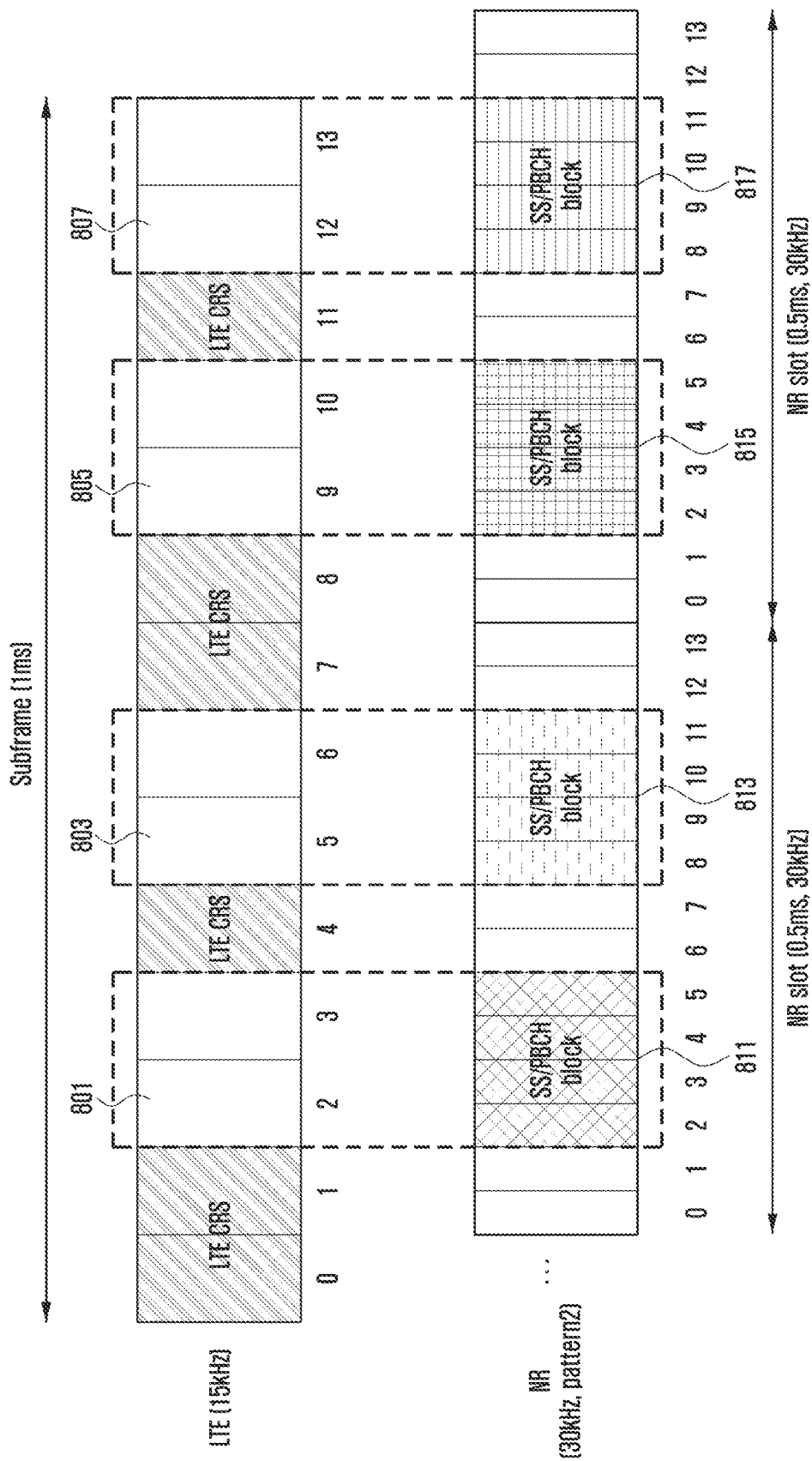
FIG. 8 is a diagram illustrating to which symbols in a slot a single SS/PBCH block is mapped, according to an embodiment.

FIG. 8 is a diagram illustrating to which symbols in a slot a single SS/PBCH block is mapped, according to an embodiment. FIG. 8 shows an example of a conventional LTE system using subcarrier spacing of 15 kHz and an NR system using subcarrier spacing of 30 kHz, and SS/PBCH blocks 811, 813, 815, and 817 of the NR system are designed to be transmitted at positions 801, 803, 805, and 807 at which cell-specific reference signals (CRS) always transmitted in the LTE system can be avoided. The purpose of the design may be to allow an LTE system and an NR system to coexist in a single frequency band.

Figure 9:
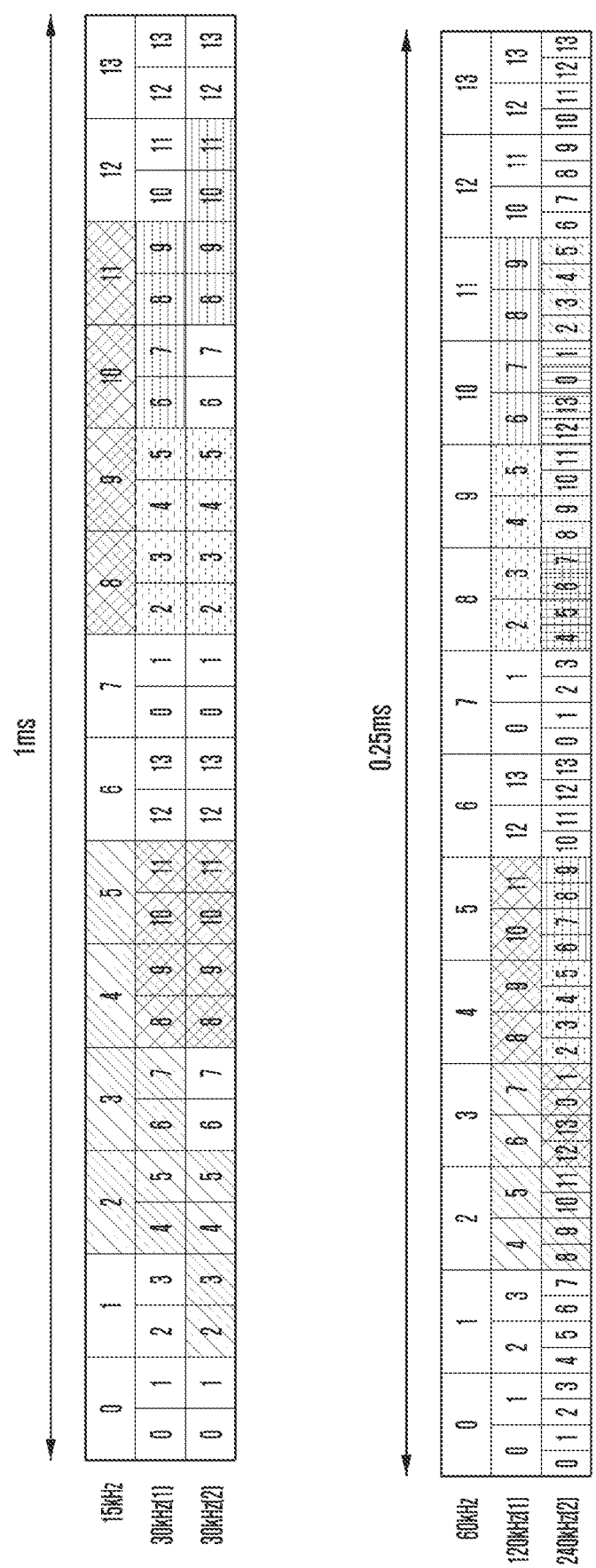
FIG. 9 is a diagram illustrating, based on subcarrier spacing, symbols through which a SS/PBCH block can be transmitted among symbols within 1 ms or less, according to an embodiment.
Figure 10:
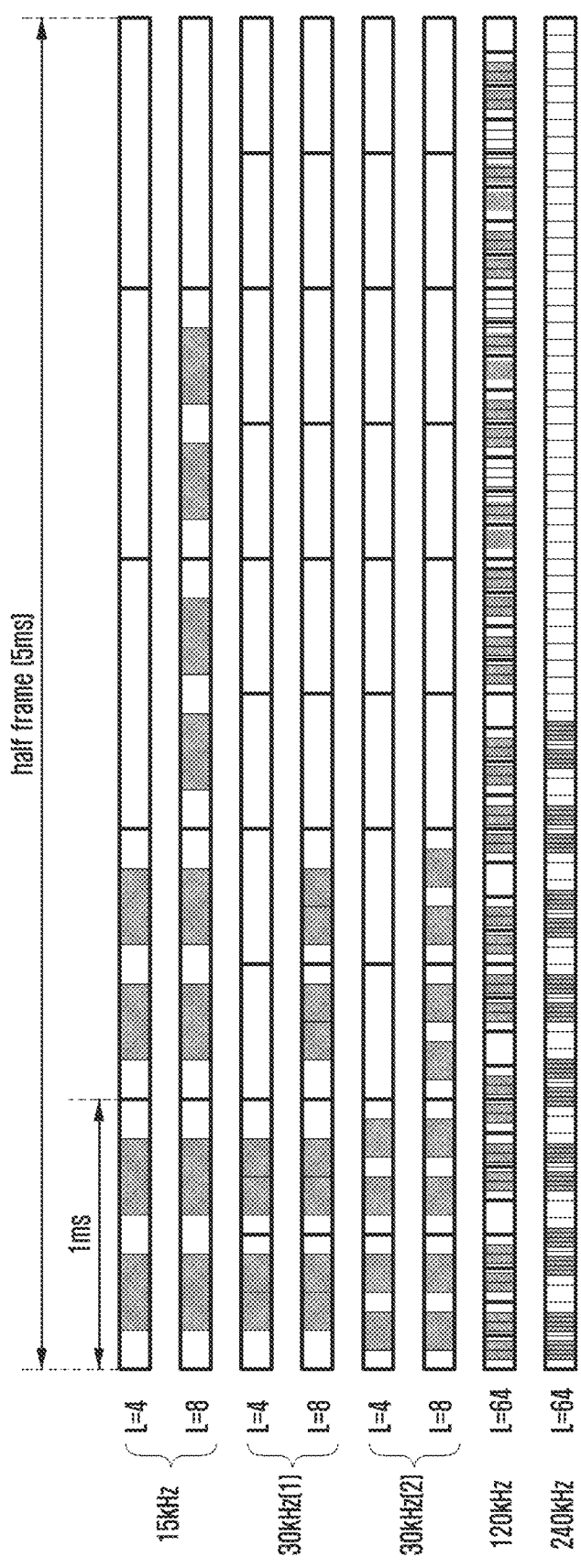
FIG. 10 is a diagram illustrating, based on subcarrier spacing, slots and symbols through which a SS/PBCH block can be transmitted among symbols and slots within 5 ms or less, according to an embodiment.

FIG. 9 is a diagram illustrating, based on subcarrier spacing, symbols through which an SS/PBCH block can be transmitted among symbols within 1 ms or less, according to an embodiment. FIG. 10 is a diagram illustrating, based on subcarrier spacing, slots and symbols through which an SS/PBCH block can be transmitted among symbols and slots within 5 ms or less, according to an embodiment. In the domain through which the SS/PBCH block can be transmitted, an SS/PBCH block is not always required to be transmitted, and a SS/PBCH block may be transmitted or may not be transmitted according to the selections of a base station.

Figure 11:
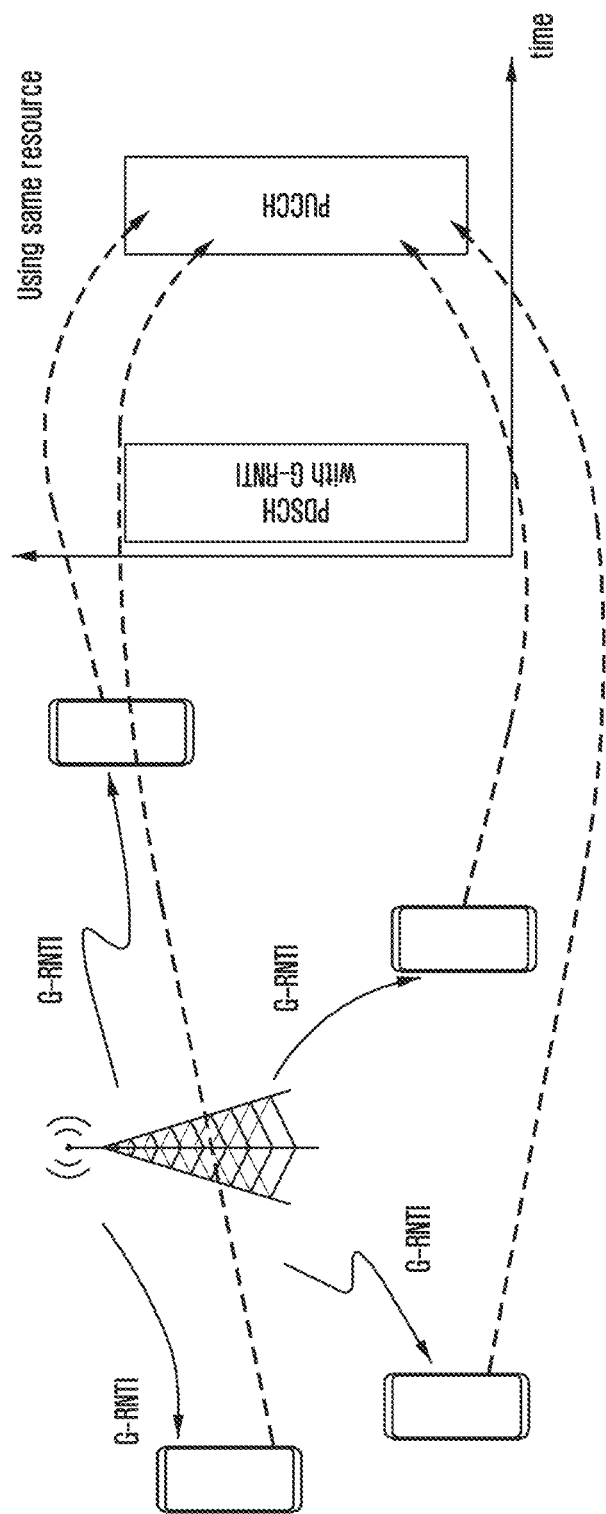
FIG. 11 is a diagram of an example in which, when groupcast data is transmitted according to the disclosure, terminals in a group, which receive groupcast data, transmit HARQ-ACK feedback by using a common resource, according to an embodiment.
Figure 12:
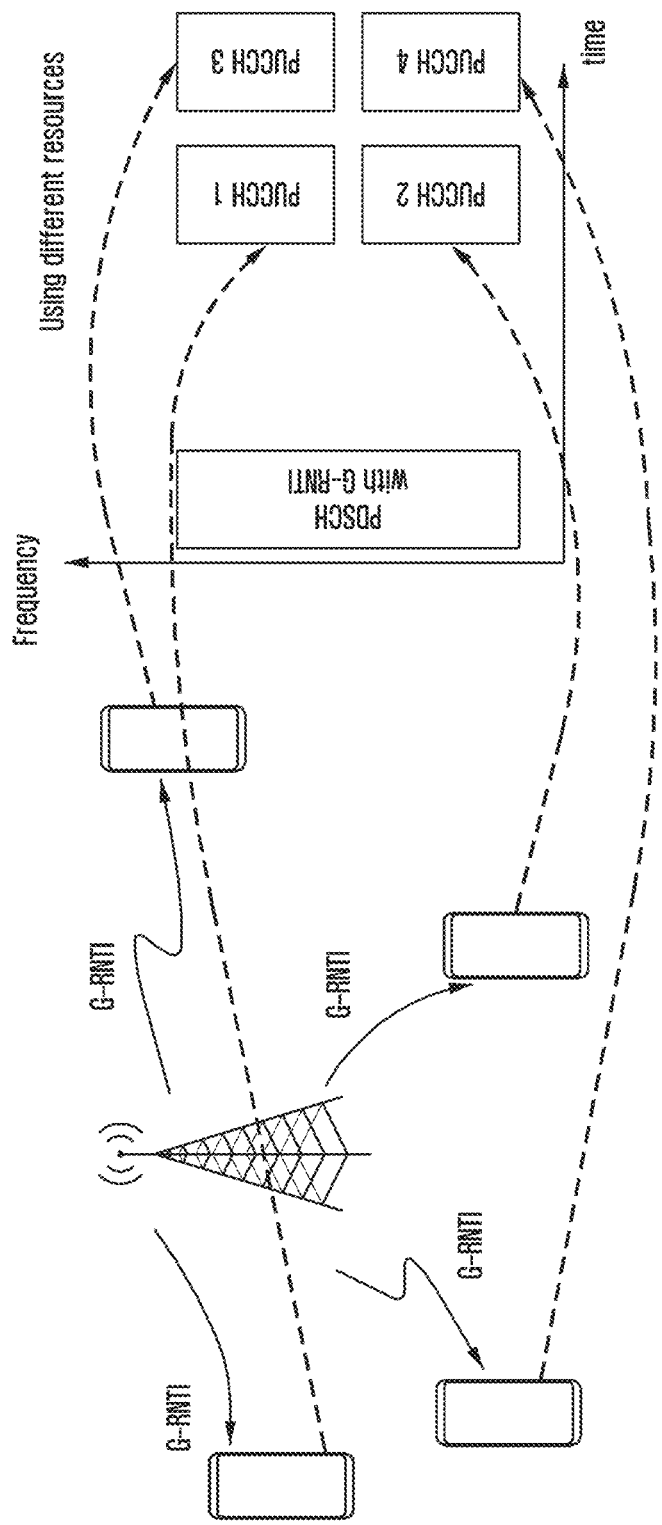
FIG. 12 is a diagram of an example in which, when groupcast data is transmitted according to the disclosure, terminals in a group, which receive groupcast data, transmit HARQ-ACK feedback by using different resources, according to an embodiment.

FIG. 11 is a diagram of an example in which, when groupcast data is transmitted according to the disclosure, terminals in a group, which receive groupcast data, transmit HARQ-ACK feedback by using a common resource, according to an embodiment. FIG. 12 is a diagram of an example in which, when groupcast data is transmitted according to the disclosure, terminals in a group, which receive groupcast data, transmit HARQ-ACK feedback by using different resources, according to an embodiment.

A terminal may be configured to receive a control channel and a data channel for groupcast from transmitting end A, and receive a control channel and a data channel for unicast from transmitting end B. The transmitting end A and the transmitting end B may be the same transmitting end, or may be different transmitting ends. Each of the transmitting end A and the transmitting end B may be a base station, a car, or a normal terminal. If each of the transmitting ends is a base station, groupcast and unicast data transmission may be performed by a base station, that is, may be performed through a Uu link. If each of the transmitting ends is a car or a normal terminal, the groupcast and unicast transmission may be sidelink transmission. Each of the transmitting ends may be a terminal, which is called a leader node or an anchor node in a group and can perform groupcast transmission for another terminal in the group and perform a function of receiving control information from another terminal. Further, the method shown in FIGS. 11 and 12 can be applied after being modified such that the transmitting end A is a car and the transmitting end B is a base station. The method shown in FIGS. 11 and 12 is described under the assumption that the transmitting end A and the transmitting end B are a single transmitting end, but the method can be modified and applied to the case where the transmitting ends A and B are different transmitting ends.

A RNTI value (which is used together with a group RNTI (G-RNTI) or a group-common RNTI, a group identifier, etc., in the following description) corresponding to a unique ID may be configured for a terminal to receive a control channel and a data channel for groupcast, or the terminal may receive the RNTI value transferred from a base station or another terminal (which may be a leader node) in a group. The terminal may receive a control channel for groupcast by using the G-RNTI value, and may receive a data channel, based on the G-RNTI value. A control channel for data scheduling may be used together with a PDCCH or a physical sidelink control channel (PSCCH), a data channel may be used together with a PDSCH or a physical sidelink shared channel (PSSCH), and a feedback channel may be used together with a PUCCH or a PSCCH. Control information for scheduling, received by a terminal is described as DCI in the following description, but may be called different names.

A transmitting end may configure, for a terminal, a resource for transmitting HARQ-ACK feedback of data transmitted by groupcast. FIG. 11 illustrates an example in which terminals, which receive groupcast data, transmit feedback through an identical frequency-time resource. The resource may be configured for each terminal by using RRC signaling or/and DCI. Each terminal receives data from a transmitting end, decodes the data, and then reports HARQ-ACK feedback information indicating a result of reception of the data, to the transmitting end through a feedback channel, and in the example illustrated in FIG. 11, all the terminals report feedback information through the same resource.

A feedback channel for reporting feedback information by each terminal, illustrated in FIG. 11, may correspond to a method using a particular sequence, and the sequence may be a Zadoff-Chu sequence. Sequence $r_{u,v}^{(\alpha,\delta)}(n)$ may be defined by $r_{u,v}^{(\alpha,\delta)}(n) = e^{j\alpha n}\bar{r}_{u,v}(n)$, $0 \leq n < M_{ZC}$, and $\bar{r}_{u,v}(0, \ldots, \bar{r}_{u,v}(M_{ZC}-1)$, which is valued of $\bar{r}_{u,v}(n)$, may be defined by Equation (2):

$$\bar{r}_{u,v}(n) = x_q(n \bmod N_{ZC}) \quad (2)$$

$$x_q(m) = e^{-j\frac{\pi q m(m+1)}{N_{ZC}}}$$

$$q = \lfloor \bar{q} + 1/2 \rfloor + v \cdot (-1)^{\lfloor 2\bar{q} \rfloor}$$

$$\bar{q} = N_{ZC} \cdot (u+1)/31$$

The length of the sequence is $M_{ZC}$, and $N_{ZC}$ may be defined as the greatest prime number among numbers smaller than $M_{ZC}$. $\alpha$ may indicate cyclic shift, and may be determined to be, for example, $$\alpha_l = \frac{2\pi}{N_{sc}^{RB}}\left((m_0 + m_{cs} + n_{cs}(n_{s,f}^\mu, l+l'))\bmod N_{sc}^{RB}\right),$$

$n_{s,f}^\mu$ in Equation (2) is a slot number in a radio frame, l is the symbol number of a OFDM symbol to which a feedback channel is mapped, and therefore, l means a first symbol to which a feedback channel is mapped. $m_0$ may be configured for a terminal by higher layer signaling, and HARQ-ACK feedback information may be transmitted as the value of $m_{cs}$ in the Equation (2). When HARQ-ACK feedback having 1 bit is transferred, if the value of HARQ-ACK is 0 (i.e., NACK), $m_{cs}$ is determined to be 0, and if the value of HARQ-ACK is 1 (i.e., ACK), $m_{cs}$ is determined to be 6. When HARQ-ACK feedback having 2 bits is transferred, if a combination of HARQ-ACK of 2 bits is {0,0}, $m_{cs}$ is determined to be 0, if a combination of HARQ-ACK is {0,1}, $m_{cs}$ is determined to be 3, if a combination of HARQ-ACK is {1,1}, $m_{cs}$ is determined to be 6, and if a combination of HARQ-ACK is {1,0}, $m_{cs}$ is determined to be 9.

The transmitting end, which has received the HARQ-ACK information, may retransmit groupcast data when receiving NACK transmitted by a terminal, which has received the groupcast data.

In the following description, another example, in which terminals belonging to the same group for groupcast data transmission transmit HARQ-ACK feedback through the same frequency-time resource, will be described. Two frequency-time resources are configured for a terminal, and one of the resources may be used for feedback transmission if HARQ-ACK is ACK, that is, data transmission has succeeded, and the remaining one may be used for feedback transmission if HARQ-ACK is NACK, that is, data transmission has failed. The transmitting end may configure particular frequency-time resources A and B for the terminals belonging to the group, and if the value of data HARQ-ACK is 1, each of the terminals transmits a feedback signal through the frequency-time resource A, whereas if the value of data HARQ-ACK is 0, each of the terminals transmits a feedback signal through the frequency-time resource B. The transmitted feedback signal may be made based on a particular sequence and, specifically, the above described sequence may be used.

FIG. 12 illustrates an example in which terminals, which receive groupcast data, transmit feedback through different frequency-time resources. The resources may be configured for terminals by using RRC signaling or/and DCI. A terminal may determine the number of HARQ-ACK bits by using the union of a unicast PDSCH mapping allocation table and a multicast PDSCH mapping allocation table.

A base station may configure, for a terminal, a single component carrier (CC) or a plurality of component carriers to transmit downlink. A slot and a symbol for downlink and uplink transmission may be configured for each CC. When a PDSCH, which is downlink data, is scheduled, slot timing information relating to a slot to which the PDSCH is mapped, and information relating to the position of a start symbol to which the PDSCH is mapped in the corresponding slot, and the number of symbols to which the PDSCH is mapped are transmitted in a particular bit field of DCI. When DCI is transmitted through slot n, and a PDSCH is scheduled, if slot timing information K0 relating to a slot through which the PDSCH is transmitted indicates 0, a start symbol position is 0, and a symbol length is 7, the corresponding PDSCH is transmitted after being mapped to seven symbols from a symbol number 0 of the slot n. The time domain resource configuration is achieved by making a base station and a terminal understand possible values as information of a start symbol and length in relation to a particular slot by using a table, and instructing, by the base station, an index value of the table to the terminal by using DCI, thereby transferring time domain resource information. The table uses a fixed value, or uses a configured value if the value is configured by higher layer signaling. Table 3 below may be an example of a table including slot information, start symbol information, and information on the number or length of symbols, the pieces of information relating to a slot and the symbols to which a PDSCH is mapped.

TABLE 3

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |

TABLE 3-continued

| Row index | dmrs-TypeA-Position | PDSCH mapping type | $K_0$ | S | L |
|---|---|---|---|---|---|
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

Under an assumption that two PDSCHs cannot be mapped to an identical OFDM symbol, a maximum of three PDSCHs may be allocated to a single slot according to Table 3. Table 3 may be made to allocate a unicast PDSCH resource to a particular terminal, and in order to allocate a groupcast PDSCH resource, Table 4 below may be used separately.

TABLE 4

| Row index | dmrs-TypeA-Position | PDSCH mapping type | $K_0$ | S | L |
|---|---|---|---|---|---|
| 1 | 2 | Type A | 0 | 2 | 6 |
|   | 3 | Type A | 0 | 3 | 5 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 6 | 4 |
|   | 3 | Type B | 0 | 8 | 2 |
| 7 | 2 | Type B | 0 | 4 | 4 |
|   | 3 | Type B | 0 | 6 | 4 |
| 8 | 2, 3 | Type B | 0 | 5 | 6 |
| 9 | 2, 3 | Type B | 0 | 5 | 2 |
| 10 | 2, 3 | Type B | 0 | 9 | 2 |
| 11 | 2, 3 | Type B | 0 | 10 | 2 |
| 12 | 2, 3 | Type A | 0 | 1 | 11 |
| 13 | 2, 3 | Type A | 0 | 1 | 6 |
| 14 | 2, 3 | Type A | 0 | 2 | 4 |
| 15 | 2, 3 | Type B | 0 | 4 | 6 |
| 16 | 2, 3 | Type B | 0 | 8 | 4 |

Under an assumption that two PDSCHs cannot be mapped to an identical OFDM symbol, a maximum of three PDSCHs may be allocated to a single slot according to Table 4.

A PDSCH, which is a downlink data signal, is transmitted, and after a K1 slot, HARQ-ACK feedback is transferred from a terminal to a base station. K1 information, which is timing information relating to timing at which the HARQ-ACK is transmitted, may be transmitted in DCI, a candidate set including possible K1 values may be transmitted by higher layer signaling, and a single value in the candidate set may be determined through the DCI.

The terminal may transfer HARQ-ACK information to the base station after collecting HARQ-ACK feedback bits, and the collected HARQ-ACK feedback bits may be called together with a HARQ-ACK codebook in the following description. The base station may configure, for the terminal, a semi-static HARQ-ACK codebook allowing transmission of HARQ-ACK feedback bits corresponding to a PDSCH, which can be transmitted at slot and symbol positions corresponding to predetermined timing, regardless of whether the PDSCH is actually transmitted. The base station may configure a dynamic HARQ-ACK codebook allowing transmission of only HARQ-ACK feedback bits corresponding to an actually transmitted PDSCH, and the terminal may determine a feedback bit, based on a counter downlink assignment index (DAI) or a total DAI included in DCI.

If a semi-static HARQ-ACK codebook is configured for the terminal, the terminal determines feedback bits required to be transmitted, by a table (or slot information, start symbol information, and information on the number or length of symbols, derived from the Table) including slot information, start symbol information, and information on the number or length of symbols, the pieces of information relating to a slot and the symbols to which a PDSCH is mapped, and K1 candidate values corresponding to information on timing of HARQ-ACK feedback on the PDSCH. The table including slot information, start symbol information, and information on the number or length of symbols, the pieces of information relating to a slot and the symbols to which a PDSCH is mapped, may be based on a default value, or may be configured by the base station for the terminal. The K1 candidate values corresponding to information on timing of HARQ-ACK feedback on the PDSCH may be determined, as default values, to be {1, 2, 3, 4, 5, 6, 7, 8}, and the set of the K1 candidate values may be configured by the base station or a transmitting end through higher layer signaling. The set of K1 candidate values may be configured to be {2, 4, 6, 8, 10, 12, 14, 16}, and one value in the set may be indicated by DCI.

If a particular terminal is configured to receive a unicast PDSCH and a groupcast PDSCH by the base station or another terminal in the group, and is configured to use a semi-static HARQ-ACK codebook to transmit HARQ-ACK feedback, the HARQ-ACK codebook may be configured by the following method. The another terminal in the group, which configures the above information for the corresponding terminal, may be a leader node of the corresponding group.

A terminal that transmits HARQ-ACK feedback may obtain $M_{A,c}$ through the following [pseudo-code 1.1] operations if $M_{A,c}$ is the set of PDSCH reception candidate occasions (occasion for candidates PDSCH receptions) in serving cell c. $M_{A,c}$ may be used to determine the number of HARQ-ACK bits which a terminal should transmit. Specifically, a HARQ-ACK codebook may be configured by using the cardinality of the set of $M_{A,c}$.

Start of Pseudo-Code 1.1

Step 1: initialize j into 0, and $M_{A,c}$ into a null set. Initialize k into 0, k corresponding to a HARQ codebook index.

Step 2: configure R to be the union of the set of PDSCH candidates indicated by rows in a table (e.g.,, Table 3) including slot information, start symbol information, and information on the number or length of symbols, the pieces of information relating to a slot and the symbols to which a unicast PDSCH can be mapped, and the set of PDSCH candidates indicated by rows in a table (e.g.,, Table 4) including slot information, start symbol information, and information on the number or length of symbols, the pieces of information relating to a slot and the symbols to which a groupcast PDSCH can be mapped. If a symbol used for PDSCH mapping, indicated by each value of R, is configured to be UL symbol according to DL and UL configurations of each symbol, which are determined by higher layer signaling, remove the corresponding row from R. Allocation of resources usable for a unicast PDSCH and a groupcast PDSCH may be determined based on tables having differently configured PDSCH reception candidates. For example, allocation of a resource may be determined for a unicast PDSCH, based on table 3, and allocation of a resource may be determined for a groupcast PDSCH, based on table 4.

Step 3.1: if the terminal can receive a single PDSCH through a single slot and R is not a null set, add k to the set of $M_{A,c}$.

Step 3.2: if the terminal can receive two or more PDSCHs in a single slot, count the number of unicast or groupcast PDSCHs allocatable to different symbols from the calculated R and then add the counted number of PDSCHs to $M_{A,c}$, where step 3.2 is performed under an assumption that unicast and groupcast PDSCHs cannot be received after being mapped to an identical OFDM symbols. In step 3.2, how many unicast or groupcast PDSCHs can be mapped in a single slot and then received is identified, and the identified number of PDSCHs is added to $M_{A,c}$.

Step 4: Increase k by 1 and then restart from Step 2.

Pseudo-code 1.1 may be a method of calculating up to how many unicast and multicast PDSCHs can be mapped in a single slot, by considering a unicast PDSCH-mappable set and a multicast PDSCH mappable set.

The above operations may be executed through pseudo-code 1.2 below.

Start of Pseudo-Code 1.2

For the set of slot timing values K1, the UE determines $M_{A,c}$ occasions for candidate PDSCH receptions or SPS PDSCH releases according to the following pseudo-code:

```
Set j = 0 – index of occasion for candidate PDSCH reception or SPS PDSCH release
Set B = Ø
Set M_{A,c} = Ø
Set C(K_1) to the cardinality of set K_1
Set k = 0 – index of slot timing values K_{1,k} in set K_1 for serving cell c
while k < C(K_1)
    Set R to the set of rows provided by the union of PDSCH-
    TimeDomainResourceAllocation_unicast and            PDSCH-
    TimeDomainResourceAllocation_groupcast
        (where, PDSCH-TimeDomainResourceAllocation_unicast is a value
    configured for a table having a unicast PDSCH reception candidate, and PDSCH-
    TimeDomainResourceAllocation_groupcast is a value configured for a table having
    a groupcast PDSCH reception candidate.)
        Set C(R) to the cardinality of R ,
        Set r = 0 – index of row provided by the union of PDSCH-
    TimeDomainResourceAllocation_unicast and            PDSCH-
    TimeDomainResourceAllocation_groupcast
        if slot n is after a slot for an active DL BWP change on serving cell c or an active
    UL BWP change on the PCell and slot n – K_{1,k} is before the slot for the active DL BWP
    change on serving cell c or the active UL BWP change on the PCell
            k = k + 1;
        else
           while r < C(R)
               if the UE is provided higher layer parameter tdd-UL-DL-
    ConfigurationCommon, or higher layer parameter tdd-UL-DL-
    ConfigurationCommon2, or higher layer parameter tdd-UL-DL-ConfigDedicated and,
    for each slot from slot n – K_{1,k} –N_{PDSCH}^{repeat} + 1 to slot n – K_{1,k}, at least one OFDM symbol
of
    the PDSCH time resource derived by row r is configured as UL where K_{1,k} is the
    k-th slot timing value in set K_1,
               R = R\r;
           end if
           r = r + 1;
       end while
       If the UE does not indicate a capability to receive more than one unicast PDSCH
    per slot and R ≠ Ø,
           M_{A,c} = M_{A,c}∪k;
           The UE does not expect to receive SPS PDSCH release and unicast PDSCH
    in a same slot;
       else
           Set C(R) to the cardinality of R
           Set m to the smallest last OFDM symbol index, as determined by the SLIV,
    among all rows of R
           while R ≠ Ø
           Set r = 0
             while r < C(R)
                 if S ≤ m for start OFDM symbol index S for row r
                     b_{r,k} = j; - index of occasion for candidate PDSCH reception or SPS
               PDSCH release associated with row r
                     R = R\r;
                     B = B∪b_{r,k};
                 end if
                 r = r + 1;
             end while
             M_{A,c} = M_{A,c} ∪j;
             j = j + 1;
             Set m to the smallest last OFDM symbol index among all rows of R;
           end while
       end if
       k = k + 1;
   end if
end while
```

Pseudo-code 1.1 and pseudo-code 1.2 may be methods assuming that a unicast PDSCH and a multicast PDSCH are not transmitted while being mapped to an identical OFDM symbol.

When a unicast PDSCH and a multicast PDSCH can be transmitted while being mapped to an identical OFDM symbol, the terminal configures a HARQ-ACK codebook for a unicast PDSCH (which can be called HARQ-ACK_codebook_unicast) and separately configures a HARQ-ACK codebook for a groupcast PDSCH (which can be called HARQ-ACK-codebook_groupcast). A unicast PDSCH HARQ-ACK codebook and a groupcast PDSCH HARQ-ACK codebook as described above may be configured based on different tables, and for example, may be configured based on Tables 3 and 4, respectively. The terminal configures respective HARQ-ACK codebooks, as described above, joins the two codebooks, then encodes the joined codebooks, and then transmits the encoded codebooks. The groupcast HARQ-ACK codebook may be connected after the unicast HARQ-ACK codebook, or the unicast HARQ-ACK codebook may be connected after the groupcast HARQ-ACK codebook, but the disclosure is not limited thereto.

Specifically, the terminal may configure a HARQ-ACK codebook through the following procedure. A table including slot information, start symbol information, and information on the number or length of symbols, the pieces of information relating to a slot and the symbols to which a PDSCH is mapped, and K1 candidate values corresponding to HARQ feedback timing information are configured for the terminal by a transmitting end (which may be the base station or another terminal in the group) by higher layer signaling. The table may be configured differently for groupcast and unicast. After the configuration, the terminal receives scheduling information for groupcast data transmission and scheduling information for unicast data transmission from the transmitting end. The scheduling information for groupcast data transmission may be related to G-RNTI. The scheduling information may be called DCI, and the DCI may include a bit field indicating a single index value in the table to transmit resource allocation information and a bit field indicating one among the K1 candidate values to transmit HARQ-ACK feedback timing information. The index value or/and one among the K1 candidate values may be instructed to the terminal by other methods including higher layer signaling, a predetermined method, or the like.

The terminal having received groupcast data and unicast data according to the scheduling information identifies a result of reception of the groupcast data and unicast data and then configures a HARQ-ACK codebook. The terminal may obtain $M_{A,c}$ by using pseudo-code 1.1 or pseudo-code 1.2 described above, or may configure the entire HARQ-ACK codebook by joining a unicast PDSCH HARQ-ACK codebook and a groupcast PDSCH HARQ-ACK codebook. The terminal encodes the configured HARQ-ACK codebook and then transmits the encoded HARQ-ACK codebook on a configured resource to the transmitting end. After the terminal has transmitted a signal of the HARQ-ACK codebook, if the HARQ-ACK codebook indicates non-reception of data, the terminal may receive retransmitted groupcast data or/and unicast data from the transmitting end.

Also disclosed is a method of, when the terminal is required to simultaneously transmit a HARQ-ACK feedback on unicast data and a HARQ-ACK feedback on groupcast data, determining priority and then transmitting the HARQ-ACK feedbacks.

If the terminal receives downlink control information and data or sidelink control information and data, and tries to transmit a feedback signal for each of the pieces of information and data to the base station or another terminal, the terminal may be required to simultaneously transmit a feedback on unicast data and a feedback on groupcast data. The terminal may perform a part of the following methods. In the embodiment, a unicast HARQ-ACK feedback may mean a HARQ-ACK feedback on unicast data, and a groupcast HARQ-ACK feedback may mean a HARQ-ACK feedback on groupcast data.

Method 1.1: if the terminal is configured or scheduled to simultaneously transmit a unicast HARQ-ACK feedback and a groupcast HARQ-ACK feedback, the terminal does not transmit the groupcast HARQ-ACK feedback and transmits only the unicast HARQ-ACK feedback.

Method 1.2: if the terminal is configured or scheduled to simultaneously transmit a unicast HARQ-ACK feedback and a groupcast HARQ-ACK feedback, the terminal does not transmit the unicast HARQ-ACK feedback and transmits only the groupcast HARQ-ACK feedback.

Method 1.3: if the terminal is configured or scheduled to simultaneously transmit a unicast channel state information (CSI) feedback and a groupcast HARQ-ACK feedback, the terminal does not transmit the unicast CSI feedback and transmits only the groupcast HARQ-ACK feedback. It is noted that HARQ-ACK feedback information may be prioritized more than CSI reporting.

Method 1.4: if the terminal is configured or scheduled to simultaneously transmit a groupcast CSI feedback and a unicast HARQ-ACK feedback, the terminal does not transmit the groupcast CSI feedback and transmits only the unicast HARQ-ACK feedback.

It is noted that HARQ-ACK feedback information may be prioritized more than CSI reporting.

Method 1.5: when the terminal tries to transmit a scheduling request (SR) for transmission of unicast data, if the terminal is configured or scheduled to transmit a groupcast HARQ-ACK or CSI feedback, the terminal does not transmit the groupcast HARQ-ACK or CSI feedback and transmits the SR for transmission of unicast data.

Method 1.6: when the terminal tries to transmit a scheduling request (SR) for transmission of unicast data, if the terminal is configured or scheduled to transmit a groupcast HARQ-ACK or CSI feedback, the terminal does not transmit the SR for transmission of unicast data and transmits the groupcast HARQ-ACK or CSI feedback.

Method 1.7: if the terminal is required to simultaneously transmit a HARQ-ACK on a sidelink unicast PSSCH (unicast data) and a HARQ-ACK on a sidelink groupcast PSSCH (groupcast data), the terminal may determine which information the terminal should transmit, according to the detail methods. Method 1.7.1: in method 1.7.1, which HARQ-ACK information is transmitted preferentially is determined based on a quality of service (QoS) value configured for a resource pool to which a PSSCH is mapped. For example, QoS may be a parameter relating to priority or latency, but may be applied while being not limited thereto.

If a priority configured for a resource pool through which a unicast PSSCH is transmitted is 1, and a priority configured for a resource pool through which a groupcast PSSCH is transmitted is 4, when the terminal is scheduled to simultaneously transmit a HARQ-ACK on a sidelink unicast PSSCH and a HARQ-ACK on a sidelink groupcast PSSCH, the terminal always transmits the HARQ-ACK on the unicast PSSCH. In method 1.7.1, it is assumed that priority 1 has higher priority than priority 4, and method 1.7.1 may be variously applied according to which value has higher priority. In method 1.7.1, a priority value corresponding to unicast and a priority value corresponding to groupcast are compared equally, but it is possible to add or subtract an offset value to or from one of the priority values and then compare them. If an offset of −2 is applied for unicast, a priority configured for a resource pool through which a unicast PSSCH is transmitted is 1, and a priority configured for a resource pool through which a groupcast PSSCH is transmitted is 2, the terminal may transmit a HARQ-ACK on the groupcast PSSCH.

Method 1.7.2: in method 1.7.2, which HARQ-ACK information is transmitted preferentially is determined based on a QoS value included in sidelink control information (SCI) for scheduling a PSSCH. QoS may be a parameter relating to priority or latency, but may be applied while being not limited thereto. If a priority included in SCI having scheduled a unicast PSSCH is 1, and a priority included in SCI having scheduled a groupcast PSSCH is 4, when the terminal is scheduled to simultaneously transmit a HARQ-ACK on a sidelink unicast PSSCH and a HARQ-ACK on a sidelink groupcast PSSCH, the terminal always transmits the HARQ-ACK on the unicast PSSCH. In method 1.7.2, it is assumed that priority 1 has higher priority than priority 4, and method 1.7.2 may be variously applied according to which value has higher priority. In method 1.7.2, a priority value corresponding to unicast and a priority value corresponding to groupcast are compared equally, but it is possible to add or subtract an offset value to or from one of the priority values and then compare them. If an offset of −2 is applied for unicast, a priority value included in SCI for scheduling a unicast PSSCH is 1, and a priority value included in SCI for scheduling a groupcast PSSCH is 2, the terminal may transmit a HARQ-ACK on the groupcast PSSCH.

Method 1.7.3: in method 1.7.3, which HARQ-ACK information is transmitted preferentially is determined based on channel sensing performed to transmit a HARQ-ACK on a sidelink unicast PSSCH, and channel sensing performed to transmit a HARQ-ACK on a sidelink groupcast PSSCH. The channel sensing may be a method of determining whether another terminal has occupied a resource for transmission, or may be a method of determining the probability of collision of the corresponding resource. The channel sensing may be performed by measuring reception energy, as performed by a listen-before-talk (LBT) method, may be performed in the course of decoding pieces of SCI, or may be performed by a combination of the two methods. The channel sensing may be performed based on a value, such as a channel busy ratio (CBR), obtained by calculating how long the corresponding resource was occupied in the past.

By performing channel sensing described above, the terminal calculates the possibility of occupation of resources for transmitting a HARQ-ACK on a sidelink unicast PSSCH and resources for transmitting a HARQ-ACK on a sidelink groupcast PSSCH, or the possibility of collision of the resources with another terminal, identifies a resource, among the resources, having high possibility of not being occupied or not colliding, and transmits a HARQ-ACK feedback to be transmitted through the corresponding resource. A resource for transmitting a HARQ-ACK on a sidelink unicast PSSCH is resource 1, and a resource for transmitting a HARQ-ACK on a sidelink groupcast PSSCH is resource 2. The level of reception energy obtained by the terminal by performing channel sensing, such as LBT, on resource 1 is A, and the level of reception energy obtained by performing channel sensing, such as LBT, on resource 2 is B. If A>B, it may be noted that the energy of a reception signal received in resource 1 is greater. Therefore, the terminal transmit a groupcast HARQ-ACK through resource 2 without transmitting a unicast HARQ-ACK. As described above, when the terminal transmits a feedback, the terminal selects a feedback having low possibility of collision, to increase the possibility of success in transmission. In method 1.7.3, the energy level of resource 1 and the energy level of resource 2 are compared equally, but it is possible to apply a method of adding or subtracting an offset value to or from one of resources 1 and 2 and then comparing them. Rather than comparing A and B, A and B+offset are compared after an offset value is added. The offset value may be previously given, or may be configured.

Method 1.7.3 is described based on sidelink, but the same method may be applied to downlink and uplink. Method 1.7.3 is described under the assumption of a HARQ-ACK feedback, but may be applied to a CSI feedback, a SR feedback, or the like.

One or more methods among the described methods may be combined and then applied. For example, methods 1.1, 1.3, and 1.5 may be applied together.

Whether groupcast transmission is performed and whether feedback transmission is performed may be configured for the terminal by the transmitting end. After the reception of the configuration, the terminal checks whether a unicast HARQ-ACK feedback, a groupcast HARQ-ACK feedback, and CSI, SR, etc., are configured or scheduled to be transmitted simultaneously. Unicast and groupcast HARQ-ACK feedback time points and a CSI feedback time point may be previously configured by the transmitting end by higher layer signaling and/or through scheduling information. If the unicast HARQ-ACK feedback, the groupcast HARQ-ACK feedback, and CSI, SR, etc. are configured or scheduled to be transmitted simultaneously, the terminal transmits information determined according to at least one of the described methods, to the transmitting end.

The disclosure provides a method in which a terminal divides a soft buffer into a soft buffer for transmission of data transmitted from a base station and a soft buffer for transmission of data transmitted through sidelink and uses the divided soft buffer. The method may be a method in which a terminal divides a virtually configured or actually possessed HARQ processes into HARQ processes for transmission of data transmitted from a base station and HARQ processes for transmission of data transmitted through sidelink and uses the divided HARQ processes. In the disclosure, data transmission/reception between a base station and a terminal may be called data transmission/reception through Uu link.

A terminal having accessed a base station reports, to the base station, that the terminal itself supports data transmission/reception through a sidelink in addition to data transmission/reception through a Uu link. The base station configures sidelink transmission/reception to be activated, and transfers pieces of configuration information required for transmission/reception to/from the terminal. The base station configures, for the terminal, the number of HARQ processes to be used to transmit or receive data through a Uu link and the number of HARQ processes to be used to transmit or receive data through a sidelink. The configured number of HARQ processes may be based on determination of bit field information of a HARQ process indicator to be included in control information for scheduling data.

The terminal determines, based on a configured HARQ process number, the size of a soft buffer for data transmission/reception through a Uu link and the size of a soft buffer for data transmission/reception through a sidelink. If the number of HARQ processes for data transmission/reception through a Uu link is configured to be 8, and the number of HARQ processes for data transmission/reception through a sidelink is configured to be 4, 8/12 (about 67%) of the entire soft buffer possessed by the terminal may be determined to be used for data transmission/reception through a Uu link, and 4/12 (about 33%) of the entire soft buffer may be determined to be used for data transmission/reception through a side link.

When HARQ processes are divided and then used as described above, if N number of HARQ processes for a Uu link are configured to be used, and M number of HARQ processes for a sidelink are configured to be used, an index value of each of the HARQ processes may be 0 to N−1 for the Uu link and 0 to M−1 for the sidelink. A HARQ process ID value included in control information for scheduling the Uu link may be information indicating one of Uu link HARQ processes indicated by indices 0 to N−1 ($\lceil \log_2 M \rceil$ bits of the control information may be used to indicate the HARQ process ID), and a HARQ process ID value included in control information for scheduling the sidelink may be information indicating one of sidelink HARQ processes indicated by indices 0 to M−1 ($\lceil \log_2 M \rceil$ bits of the control information may be used to indicate the HARQ process ID).

The index value of a HARQ process may be 0 to N−1 for a Uu link, and N to N+M−1 for a sidelink. A HARQ process ID value included in control information for scheduling the Uu link and the sidelink may be information indicating one of all the HARQ processes indicated by indices 0 to N+M−1 ($\lceil \log_2(N+M) \rceil$ bits of the control information may be used to indicate the HARQ process ID).

The disclosure provides a method in which a terminal divides a soft buffer into a soft buffer for unicast data transmission through a sidelink and a soft buffer for groupcast data transmission through a sidelink and uses the divided soft buffer. Unicast refers to data transmission/reception from a single terminal to a particular another terminal, and groupcast refers to data transmission/reception from a single terminal to terminals belonging to a particular group. The method may be a method in a method in which a terminal divides a virtually configured or actually possessed HARQ processes into HARQ processes for unicast data transmission and HARQ processes for groupcast data transmission and uses the divided HARQ processes.

A terminal having accessed a base station reports, to the base station, that the terminal itself supports groupcast data transmission/reception in addition to unicast data transmission/reception. The base station configures groupcast data transmission/reception to be activated, and transfers pieces of configuration information required for transmission/reception to/from the terminal. The base station configures, for the terminal, the number of HARQ processes to be used for unicast data transmission/reception and the number of HARQ processes to be used for groupcast data transmission/reception. The configured number of HARQ processes may be based on determination of bit field information of a HARQ process indicator to be included in control information for scheduling data The terminal determines, based on a configured HARQ process number, the size of a soft buffer for unicast data transmission/reception and the size of a soft buffer for groupcast data transmission/reception. If the number of HARQ processes for unicast data transmission/reception is configured to be 8, and the number of HARQ processes for groupcast data transmission/reception is configured to be 4, 8/12 (about 67%) of the entire soft buffer possessed by the terminal may be determined to be used for unicast data transmission/reception, and 4/12 (about 33%) of the entire soft buffer may be determined to be used for groupcast data transmission/reception.

When HARQ processes are divided and then used as described above, if N number of HARQ processes for unicast are configured to be used, and M number of HARQ processes for groupcast are configured to be used, an index value of each of the HARQ processes may be 0 to N−1 for unicast and 0 to M−1 for groupcast. A HARQ process ID value included in control information for unicast scheduling may be information indicating one of unicast HARQ processes indicated by indices 0 to N−1 ($\lceil \log_2 N \rceil$ bits of the control information may be used to indicate the HARQ process ID), and a HARQ process ID value included in control information for groupcast scheduling may be information indicating one of groupcast HARQ processes indicated by indices 0 to M−1 ($\lceil \log_2 M \rceil$ bits of the control information may be used to indicate the HARQ process ID).

The index value of a HARQ process may be 0 to N−1 for unicast, and N to N+M−1 for groupcast. A HARQ process ID value included in control information for unicast and groupcast scheduling may be information indicating one of all the HARQ processes indicated by indices 0 to N+M−1 ($\lceil \log_2(N+M) \rceil$ bits of the control information may be used to indicate the HARQ process ID).

In an NR system, if a single CB is input to an LDPC encoder, parity bits may be added to the CB and then the CB having the parity bits may be output. The amount of the parity bits may change according to an LDPC base graph. A method of transmitting all of the parity bits generated by LDPC coding of a particular input may be called full buffer rate matching (FBRM), and a method of limiting the number of transmittable parity bits may be called limited buffer rate matching (LBRM).

If resources are allocated for data transmission, an LDPC ender output is made into a circular buffer, the bits of the made buffer are transmitted repeatedly as much as the allocated resources, and the length of the circular buffer may called $N_{cb}$. If the number of all the LDPC codeword bits generated by LDPC coding is N, $N_{cb}$ is N in a FBRM method. An information word bit for applying LDPC coding may be included in the LDPC codeword bits.

In an LBRM method, $N_{cb}$ may be min(N,$N_{ref}$), $N_{ref}$ may be $\lfloor TBS_{LBRM}/C \cdot B_{LBRM} \rfloor$, and $R_{LBRM}$ may be determined to be 2/3. C may indicate the number of code blocks included in a corresponding TB, and $TBS_{LBRM}$ may indicate a TBS under an assumption of a maximum number of layers supported by the terminal in a corresponding cell, a maximum modulation order, or the like in a method of obtaining a TBS as described below. In order to calculate a $TBS_{LBRM}$, a maximum modulation order may be configured for the terminal in the corresponding cell, or if a maximum modulation order is not configured, 64 QAM ($Q_m$=6) may be assumed as the maximum modulation order, the maximum code rate (or the maximum coding rate) of 948/1024 may be assumed as a code rate, 156·$n_{PRB}$ may be assumed as $N_{RB}$, and $n_{PRB,LBRM}$ may be assumed as $n_{PRB}$. $N_{PRB,LBRM}$ may be given by Table 5 below.

TABLE 5

| Maximum number of PRBs across all configured BWPs of a carrier | $n_{PRB,1,BRM}$ |
|---|---|
| Less than 33 | 32 |
| 33 to 66 | 66 |

TABLE 5-continued

| Maximum number of PRBs across all configured BWPs of a carrier | $n_{PRB,1,BRM}$ |
|---|---|
| 67 to 107 | 107 |
| 108 to 135 | 135 |
| 136 to 162 | 162 |
| 163 to 217 | 217 |
| Larger than 217 | 273 |

A method of dividing a soft buffer and using the divided soft buffer may redefine $N_{ref}$, which is required for an LBRM procedure performed when a unicast PDSCH (or PSSCH) and a groupcast PDSCH (or PSSCH) are mapped. For example, if the number of the sum of unicast HARQ processes and groupcast HARQ processes is 32, $N_{ref}$ may be redefined as $$\left\lceil \frac{TBS_{LBRM}}{C-R_{LBRM}} \right\rceil \times \min(1, 16/32).$$

The redefinition may consider that the storage space of the terminal is restricted, because the amount of information which the terminal should store in a reception operation increases according to the number of HARQ processes. The reason of the value of 16 in the mathematical formula may be that the maximum number of HARQ processes which the base station can configure for the terminal in the NR system is 16. However, the disclosure is not limited to a particular value, and a mathematical formula using another value may be applied. The value of 32 may be the number of maximum HARQ processes for unicast or groupcast transmission, and if the mathematical formula is generalized according to the example, when a sum of the number of the HARQ processes for unicast transmission is n and a sum of the number of the HARQ processes for groupcast transmission is m, the value of 16/32 may be expressed by n/(m+n) or m/(n+m).

A unicast PDSCH and a groupcast PDSCH may be distinguished in a procedure of decoding DCI for scheduling the corresponding PDSCHs. For example, when the terminal decodes DCI, the terminal checks a CRC by scrambling or descrambling an RNTI to the CRC. If the RNTI is an RNTI allocated for unicast transmission, the terminal may determine a PDSCH scheduled by the corresponding DCI to be a unicast PDSCH, and if the RNTI is an RNTI allocated for groupcast transmission, the terminal may determine a PDSCH scheduled by the corresponding DCI to be a groupcast PDSCH. A particular bit field of the DCI may indicate whether a scheduled PDSCH is for unicast or groupcast.

Similarly, in the above embodiments and the following embodiments, a unicast PSSCH and a groupcast PSSCH may be distinguished in a procedure of decoding SCI for scheduling the corresponding PSSCHs. When the terminal decodes SCI, the terminal checks a CRC by scrambling or descrambling an RNTI to the CRC. If the RNTI is an RNTI allocated for unicast transmission, the terminal may determine a PSSCH scheduled by the corresponding SCI to be a unicast PSSCH, and if the RNTI is an RNTI allocated for groupcast transmission, the terminal may determine a PSSCH scheduled by the corresponding SCI to be a groupcast PSSCH. A particular bit field of the SCI may indicate whether a scheduled PSSCH is for unicast or groupcast. If a resource pool through a PSSCH is transmitted is configured for unicast, the corresponding PSSCH may be interpreted as a unicast PSSCH, and if a resource pool through a PSSCH is transmitted is configured for groupcast, the corresponding PSSCH may be interpreted as a groupcast PSSCH.

The disclosure provides a method and device for efficiently performing automatic gain control (AGC) by a terminal configured to transmit or receive sidelink data.

When the terminal receives a signal, the terminal performs an operation of amplifying the reception signal. The intensity of the signal and the dynamic range of a terminal amplifier may determine how much the signal is amplified in the amplification operation. The dynamic range is a signal intensity range in which an input and an output of the amplifier have a linear relation. If an input and an output of the amplifier have no linear relation, and the phase of a signal randomly changes, the corresponding signal may not be able to be used for data reception. If the amount of amplification is too great, a signal is not amplified to be greater than or equal to an intensity and the phase of the signal is randomly changed. Therefore, the terminal cannot randomly greatly amplify a reception signal. If the intensity of amplification is too small, data reception performance may degrade. Therefore, the terminal is required to amplify a reception signal to have a proper intensity. Therefore, it may be important for the terminal to firstly determine the intensity of a reception signal when the terminal amplifies the signal. The identification is for that, for example, the terminal reduces the amount of amplification if the intensity of a reception signal is too great, and the terminal increases the amount of amplification if the intensity of a reception signal is too small. As described above, the terminal is required to change the amount of amplification according to the intensity of a reception signal, and the changing operation of the terminal is called AGC.

Figure 13:
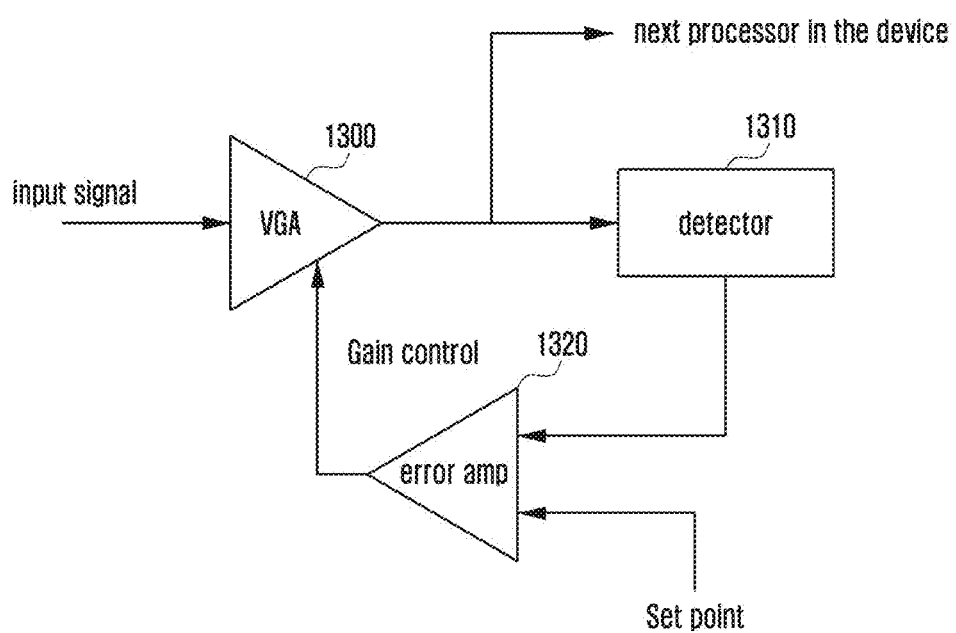
FIG. 13 is a diagram of an example of a structure of devices configured to perform automatic gain control in a conventional terminal receiver structure, according to an embodiment.

FIG. 13 is a diagram of an example of a structure of devices configured to perform automatic gain control in a conventional terminal receiver structure, according to an embodiment. FIG. 13 illustrates a part of a structure of a receiver of a terminal configured to perform AGC. A reception signal (input signal) of a terminal is amplified by passing a variable gain amplifier (VGA) 1300 first, and the amplified signal is transferred to a detector 1310 configured to estimate amplification intensity. The intensity of the signal, estimated by the detector, is compared with a set point determined by the dynamic range of the terminal, the difference value therebetween is identified by an error amplifier 1320, and the value (gain control) is transferred to a parameter of the VGA. The amount of amplification of the VGA is determined according to the difference between the estimated intensity of the signal and the set point, and the amount of the amplification functions to include the amplified signal within the dynamic range of the terminal amplifier. In other words, the AGC operation may be a procedure of determining how much a reception signal is to be amplified.

Figure 14:
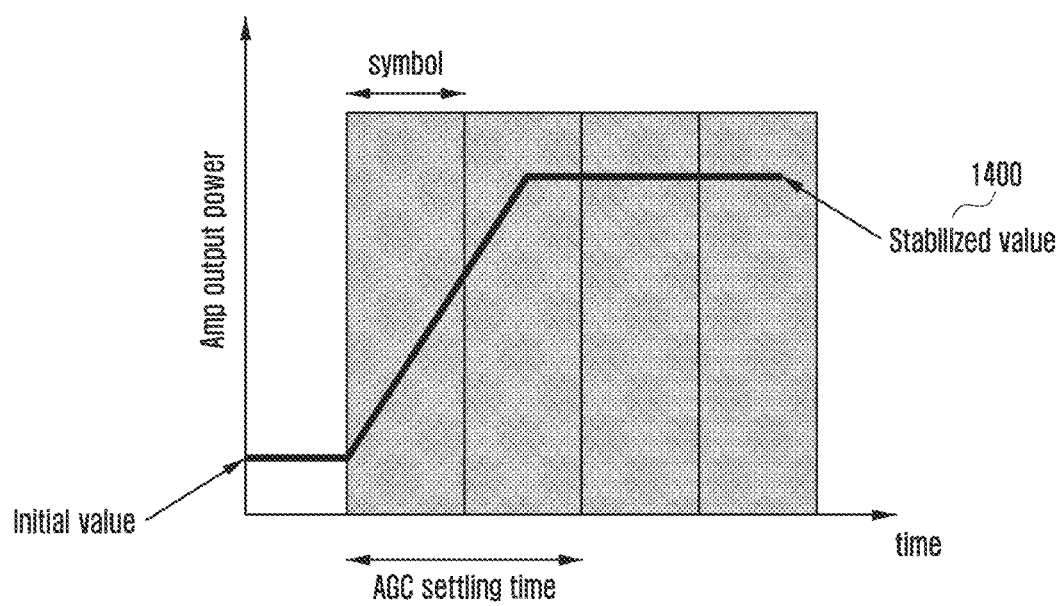
FIG. 14 is a graph showing, in a time domain, a procedure of amplifying the intensity of a signal to be a proper level by performing automatic gain control, according to an embodiment.

FIG. 14 is a graph showing, in a time domain, a procedure of amplifying the intensity of a signal to be a proper level by performing automatic gain control, according to an embodiment. FIG. 14 is a graph showing an example of the intensity of a signal having passed an amplifier, in the case where AGC is performed when CP-OFDM or DFT-S-OFDM symbols are received over time. A terminal performs an AGC operation as a signal is received, and it takes time to determine an amplification amount for amplifying the signal to have a proper intensity. A time taken to determine a proper amplification amount of an amplifier through the AGC may be referred to as an AGC settling time. The terminal determines an amplification amount by performing AGC during a time interval of about two symbols. The reliability of a signal received during the AGC settling time is low, and thus it may be difficult for the signal to be used to decode data or a control signal, and a signal according to a stabilized value 1400 after the passage of the AGC settling time may be used to decode data or a control signal. Therefore, the terminal is required to reduce an AGC settling time to minimize the degradation of data transmission/reception performance.

Figure 15:
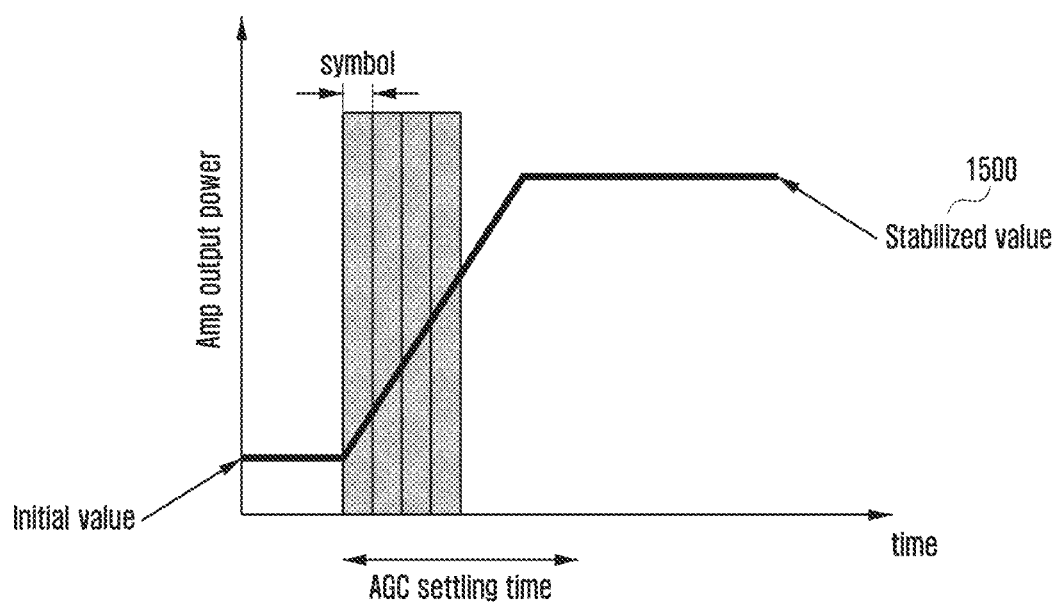
FIG. 15 is a graph showing, in a time domain, a procedure of, when a signal transmitted to have wider subcarrier spacing is received, performing automatic gain control to amplify the intensity of the signal to be a proper level, according to an embodiment.

FIG. 15 is a graph showing, in a time domain, a procedure of, when a signal transmitted to have wider subcarrier spacing is received, performing automatic gain control to amplify the intensity of the signal to be a proper level, according to an embodiment. FIG. 15 is a graph showing an example of AGC settling time of a case of using subcarrier spacing wider than that illustrated in FIG. 14. If FIG. 14 illustrates an example of an AGC settling time for subcarrier spacing of 15 kHz, FIG. 15 illustrates an example of an AGC settling time for subcarrier spacing of 60 kHz 1500. An OFDM signal having subcarrier spacing of 60 kHz has a symbol length smaller than that of a signal having subcarrier spacing of 15 kHz. Therefore, a larger number of OFDM symbols are included within the AGC settling time. Therefore, if wider subcarrier spacing is used, the terminal is required to more efficiently perform AGC.

Figure 16:
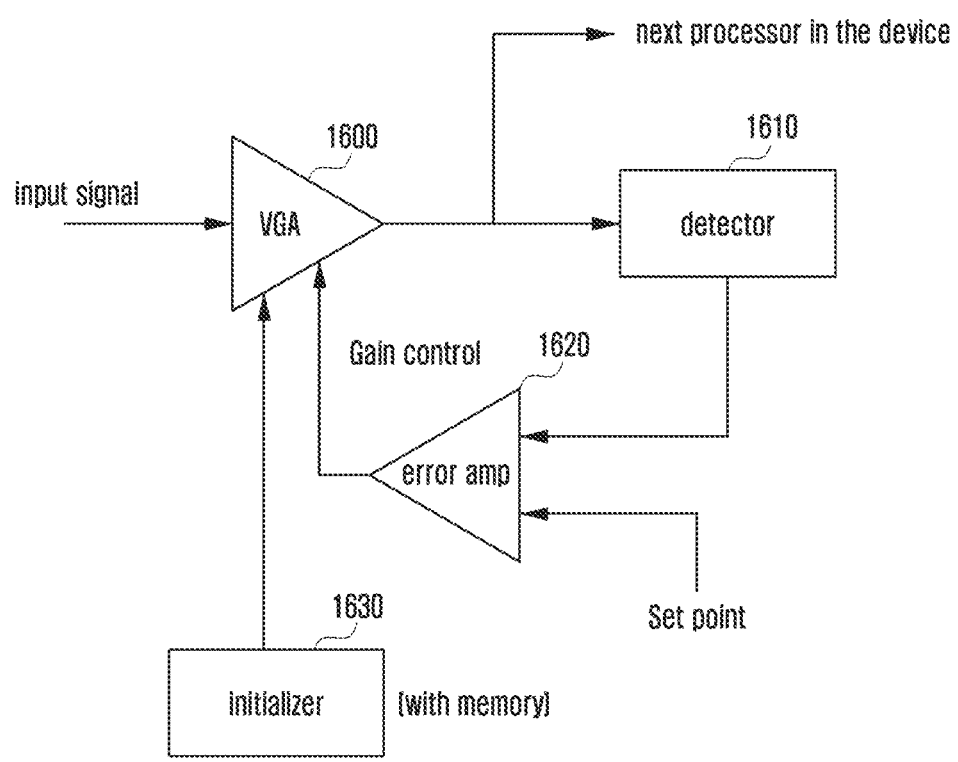
FIG. 16 is a diagram of an example of a device, which performs automatic gain control (AGC) after properly configuring an initial value to reduce an automatic gain control performing time provided in the disclosure, according to an embodiment.

FIG. 16 is a diagram of an example of a device, which performs AGC after properly configuring an initial value to reduce an automatic gain control performing time provided in the disclosure, according to an embodiment. A terminal may include a VGA 1600, a detector 1610, an error amplifier 1620, and an initializer 1630 configured to determine an initial value, and may perform AGC by using an initial value determined by the initializer. The initial value may refer to an initial value formed at the time of starting AGC illustrated in FIGS. 14 and 15, or may be a relevant parameter. If an initial value at the time of performing AGC is already similar to a stabilized value, an AGC settling time may decrease, so that efficient AGC is possible. Therefore, the initializer may store stabilized values 1400 and 1500 or relevant parameters in a memory, and may determine, based on the stored values or parameters, an initial value for performing AGC. The initializer may transfer an initial value at the time of AGC of the terminal, or a parameter relating to the initial value to the variable gain amplifier 1600. The FIG. 16 illustrates devices configured to perform AGC, but the feature merely corresponds to an example, and the operation as described above can be performed by a processor and a transceiver.

Figure 17:
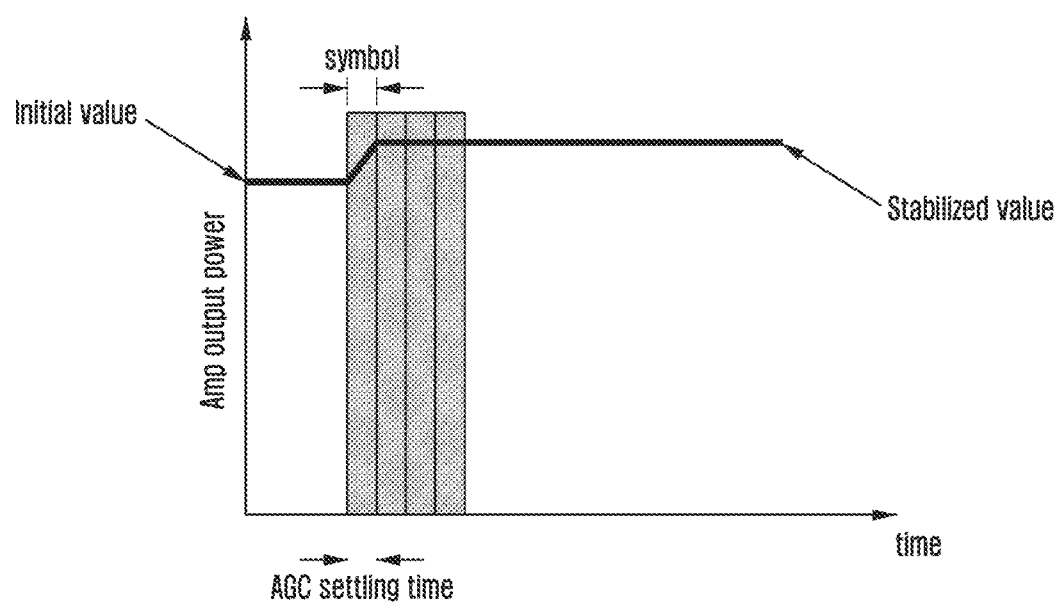
FIG. 17 is a graph showing, in a time domain, in a procedure of amplifying the intensity of a signal to be a proper level by performing automatic gain control, according to an automatic gain control method, according to an embodiment.

FIG. 17 is a graph showing, in a time domain, in a procedure of amplifying the intensity of a signal to be a proper level by performing automatic gain control, according to an automatic gain control method, according to an embodiment. FIG. 17 shows an example where an initial value for AGC is similar to a stabilized value after AGC, an AGC settling time decreases. As compared to FIG. 15, it can be noted that an AGC settling time illustrated in FIG. 17 is remarkably reduced.

If a terminal receives a signal through a resource pool previously configured for sidelink data transmission/reception, the terminal stores the intensity of the signal received through the corresponding resource pool. For example, the terminal stores information for an initial value for AGC by updating the intensity of a recently received signal at every time of receiving a signal through resource pool A. The information may be previously described. After the storing of the information, when the terminal has received a signal through another resource pool, and tries to receive a signal through resource pool A again and perform AGC, the terminal may use, as an initial value for AGC, an intensity value of a signal received through previously stored resource pool A.

Figure 18:
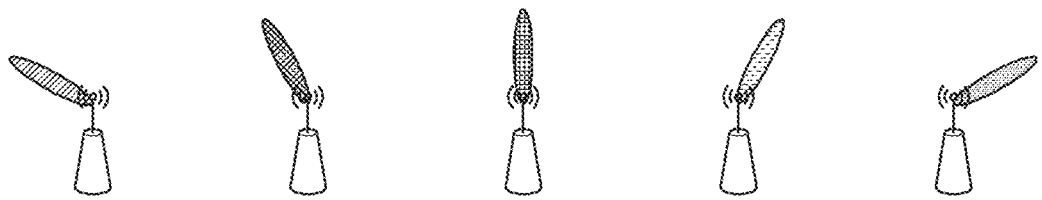
FIG. 18 illustrates an example in which a base station transmits a control signal and a data signal after applying different analog beams to symbols, according to an embodiment.

FIG. 18 is a diagram of an example in which a base station transmits a control signal and a data signal after applying different analog beams to symbols, according to an embodiment. The method may also be applied to data transmission/reception using analog beamforming. Because the intensity of a signal received by the terminal can be largely changed according to an analog beam, the terminal is required to efficiently perform AGC according to each analog beam. For example, when a base station transmits a signal to a terminal, the base station may apply different analog beams to symbols, and the application is illustrated in FIG. 18. If the intensity of a signal received and transmitted using a particular analog beam is stored by a terminal, the terminal may identify an analog beam applied to a signal to be received through a next symbol or slot and may configure an AGC initial value by using a recently stored signal intensity according to the identified analog beam. If an identical analog beam is applied to signals, there is high possibility that the intensities of the signals are similar. In the application of the identical analog beam, the terminal may configure an AGC initial value close to a stabilized value, and thus can reduce an AGC settling time.

Figure 19:
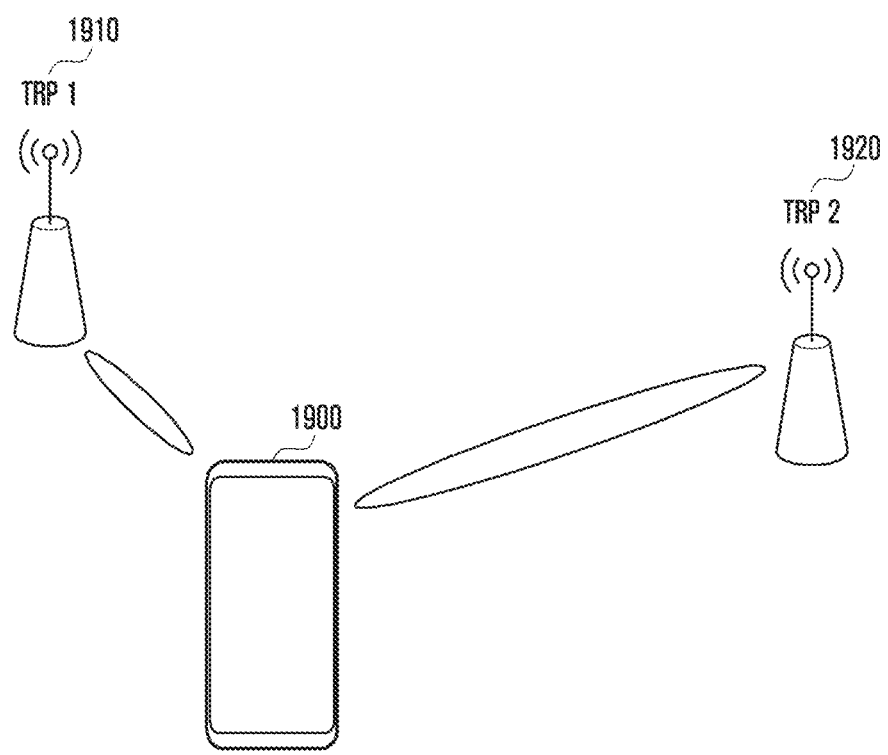
FIG. 19 illustrates an example of a terminal which receives a signal from several transmission and reception points (TRPs), according to an embodiment.

FIG. 19 is a diagram of an example of a terminal which receives a signal from several transmission and reception points (TRPs), according to an embodiment. The example may also be applied to multiple TRP transmission. A terminal 1900 may receive a signal from TRP 1 1910 and TRP 2 1920, and the intensity of a signal received by the terminal may be largely changed according to from which TRP a signal is received. Therefore, the terminal stores the intensity of a signal recently received from a particular TRP, and when AGC is performed on a symbol receiving a signal from the corresponding TRP, the terminal may configure the stored signal intensity, as an initial value for AGC. For application of the method, the terminal may store the intensity of a signal according to a transmission configuration indication (TCI) indicator value indicated by control information or higher layer signaling, and when a signal relating to the same TCI is transmitted, the terminal may configure an AGC initial value, based on the stored signal intensity.

AGC using the initial value of the terminal may be performed as the following description. The terminal may store, in an initialization unit, a stabilized value at the time of performing AGC, or a relevant parameter, and/or a parameter relating to the intensity of a reception signal, together with a resource pool identifier, such as an identifier of a resource pool, which has received the signal, or the position of the resource pool on a frequency-time resource. The above information may be updated at every time when a signal is received through a resource pool. A stabilized value and/or a parameter relating to the intensity of a reception signal may be stored together with information relating to an analog beam of the reception signal, or TCI relating to the reception signal. The analog beam-related information may be at least one of a beam signal reception time, a frequency-time resource through which the signal is transmitted, or information used to identify the analog beam.

When the terminal receives a signal, the terminal checks whether the reception signal is related to a resource pool, an analog beam, or TCI for which a stabilized value relating to the reception signal is stored. Specifically, the terminal may check whether a signal is received by the terminal through the same resource pool as a resource pool having been stored in the initialization unit, whether a signal transmitted using the same analog beam as an analog beam having been received by the terminal is received by the terminal, or whether a signal relating to the same TCI as stored TCI is received by the terminal.

After the identification, when it is determined that the stored information is related to the reception signal, the terminal determines an initial value for AGC by using a stabilized value or/and a signal intensity-related parameter stored in the initialization unit. The initial value may be determined by the initialization unit or a If a signal is received on the same resource pool at multiple times, the terminal may determine an initial value by using a stabilized value relating to the most recent signal, or/and a relevant parameter. The above method may also be used to a reception signal related to an analog beam or TCI.

If it is determined that a reception signal is not related to a resource pool, an analog beam, or TCI for which a stabilized value relating to the reception signal is stored, the terminal performs AGC without configuration of an initial value.

The disclosure provides a method and device for, when a sidelink signal is transmitted or received by broadcast, unicast, and groupcast schemes, determining a parameter of channel coding or mapping for LBRM by considering a limit of a soft buffer and a configured resource pool.

A resource block, which is a frequency resource belonging to a resource pool for a PSSCH in an LTE V2X system, may be determined by the following method:

(i) The resource block pool consists of $N_{subCH}$ sub-channels where $N_{subCH}$ is given by higher layer parameter numSubchannel.

(ii) The sub-channel m for m=0,1, . . . , $N_{subCH}$−1 consists of a set of $n_{subCHsize}$ contiguous resource blocks with the physical resource block number $n_{PRB}=n_{subCHRBstart}+m*n_{subCHsize}+j$ for j=0,1,. . . , $n_{subCHsize}$−1 where $n_{subCHRBstart}$ and $n_{subCHsize}$ are given by higher layer parameters startRBSubchannel and sizeSubchannel, respectively A resource pool may be defined even for an NR-based sidelink communication system by a method similar to the above method, and a unit (granularity) of resource allocation on a time domain may be a slot. In the following description of the disclosure, a case in which a resource pool is nonconsecutively allocated on the time axis are mainly discussed. However, a resource pool can be consecutively allocated on a time domain. A BWP may be defined for a sidelink in an NR-based system, a resource pool may be defined in the BWP, and one or a plurality of resource pools may be configured for a terminal.

Subframes ($t_0^{SL}, t_1^{SL}, \ldots, t_{T_{max}}^{SL}$), which are time resources belonging to a resource pool for a PSSCH in an LTE V2X system, may be determined by the following method:

If $0 \le t_i^{SL} < 10240$, the subframe index is relative to subframe#0 of the radio frame corresponding to SFN 0 of the serving cell or DFN 0. The set includes all the subframes except the following subframes: subframes in which sidelink synchronization signal (SLSS) resource is configured; downlink subframes and special subframes if the sidelink transmission occurs in a TDD cell; and reserved subframes which are determined by the following steps:

(i) the remaining subframes excluding $N_{slss}$ and $N_{dssf}$ subframes from the set of all the subframes are denoted by $(l_0, l_1, \ldots, l_{(10240-N_{slss}-N_{dssf}-1)})$ arranged in increasing order of subframe index, where $N_{slss}$ is the number of subframes in which SLSS resource is configured within 10240 subframes and $N_{dssf}$ is the number of downlink subframes and special subframes within 10240 subframes if the sidelink transmission occurs in a TDD cell; and (ii) a subframe $l_r$ ($0 \le r < (10240-N_{slss}-N_{dssf})$) belongs to the reserved subframes if $$r = \left\lfloor \frac{m \cdot (10240 - N_{slss} - N_{dssf})}{N_{reserved}} \right\rfloor$$

where m=0, . . . , $N_{reserved}$−1 and $N_{reserved}$=(10240−$N_{slss}$−$N_{dssf}$)mod $L_{bitmap}$. Here, $L_{bitmap}$ the length of the bitmap is configured by higher layers.

The subframes are arranged in increasing order of subframe index. A bitmap ($b_0, b_1, \ldots, b_{L_{bitmap}}$) associated with the resource pool is used where $L_{bitmap}$ the length of the bitmap is configured by higher layers. A subframe $t_k^{SL}$ ($0 \le k < (10240-N_{slss}-N_{dssf}-N_{reserved})$) belongs to the subframe pool if $b_{k'}=1$ where k'=k mod $L_{bitmap}$.

A time domain resource belonging to a resource pool may be determined even for an NR-based sidelink communication system by a method similar to the above method, and it is possible to modify and apply the method. If the terminal is connected to a base station, in communication based on a Uu link including DL and UL, the base station may transmit a UE capability enquiry message to the terminal, and the terminal may report UE capability information to the base station by higher layer signaling (or RRC signaling). The UE capability information may include information indicating a function supportable by the terminal, and may include a maximum number of layers supportable at the time of transmitting a PUSCH or/and PDSCH. The base station may identify UE capability information by an access and mobility management function (AMF).

The base station may transmit configuration information for data transmission to the terminal by higher layer signaling. The configuration information may be transmitted to the terminal through a plurality of system information blocks (SIBs) or/and a RRC message. The configuration information may include the following pieces of information:

(i) PDCCH configuration information such as PDCCH-Config and PDCCH-ConfigCommon, which is configuration information of a PDCCH, for scheduling transmission of uplink data or downlink data includes a configuration of a control resource set (CORESET) for transmitting DCI scheduling data, and information of configuring a search space;

(ii) PDSCH configuration information such as PDSCH-Config, PDSCH-ConfigCommon, and PDSCH-TimeDomainResourceAllocationList, which is configuration information relating to a PDSCH transmitting downlink data includes a configuration of a DMRS for transmitting the PDSCH and a PDSCH resource allocation type for frequency domain resource allocation, a TCI configuration indicating information relating to a beam applied to the PDSCH, PDSCH time domain resource allocation information for time domain resource allocation, which is included in downlink control information for time domain resource allocation, an aggregation factor applied to transmission of the PDSCH, information on rate matching applied to the PDSCH, a maximum number of used MIMO layers, code block group transmission configuration information, and the like;

(iii) PUCCH configuration information, such as PUCCH-Config, and PUCCH-ConfigCommon, which is configuration information relating to a PUCCH transmitting reception acknowledgement information (HARQ-ACK) relating to downlink data transmitted through a PDSCH includes a configuration (PUCCH-SpatialRelationInfo) relating to a beam applied to the PUCCH, a PUCCH resource set configuration, a PUCCH resource configuration, a configuration for each PUCCH format, and the like; and (iv) PUSCH configuration information such as PUSCH-Config, and PUSCH-ConfigCommon, which is configuration information relating to a PUSCH transmitting uplink data includes a configuration of a DMRS for transmitting the PUSCH and a PUSCH resource allocation type for frequency domain resource allocation, PUSCH time domain resource allocation information for time domain resource allocation, which is included in downlink control information for time domain resource allocation, frequency hopping information, an aggregation factor applied to transmission of the PUSCH, information on an MCS table applied to the PUSCH, PUSCH power control information, a transform precoder configuration, a maximum number of used MIMO layers, code block group transmission configuration information, and the like.

The base station transmits DCI scheduling uplink data or downlink data, to the terminal through a PDCCH. The terminal receives the DCI scheduled to the terminal itself, through blind decoding in a search space identified based on the configuration information for transmission of data. That is, the terminal checks whether a CRC attached to a DCI payload received in the search space is scrambled to a cell radio network temporary identifier (C-RNTI) corresponding to an identifier of the terminal, and if a result of the CRC identification indicates that the CRC is scrambled to the C-RNTI of the terminal itself, the terminal may identify that the corresponding DCI has been transmitted to the terminal itself. The C-RNTI may be replaced with a RNTI having another purpose, for example, a random access RNTI (RA-RNTI, which schedules a random access response message), a paging RNTI (P-RNTI, which schedules a PDSCH for a paging message), and a system information RNTI (SI-RNTI, which schedules a PDSCH for system information).

The DCI may be one of 0_0, which is a format of fallback DCI for scheduling a PUSCH, 0_1, which is a format of non-fallback DCI for scheduling a PUSCH, 1_0, which is a format of fallback DCI for scheduling a PDSCH, and 1_1, which is a format of non-fallback DCI for scheduling a PDSCH. Information included in DCI format 1_1, as an example of a DCI format, includes a carrier indicator, which indicates a carrier through which data scheduled by DCI is transmitted (0 or 3 bits), and identifier for DCI formats: indicates a DCI format ([1] bits), a bandwidth part indicator, which indicates a change of a bandwidth part (0, 1 or 2 bits), a frequency domain resource assignment which is resource allocation information indicating frequency domain resource allocation, where a represented resource changes according to whether a resource allocation type is 0 or 1, time domain resource assignment, which is resource allocation information indicating time domain resource allocation, wherein the information may indicate a configuration in a PDSCH time domain resource allocation list arranged by higher layer signaling or previously determined (1, 2, 3, or 4 bits), VRB-to-PRB mapping, which indicates a mapping relation between a virtual resource block (VRB) and a physical resource block (PRB) (0 or 1 bit), a PRB bundling size indicator, which indicates the bundling size of physical resource blocks assumed to be subjected to the same precoding (0 or 1 bit), a rate matching indicator, which indicates which rate match group is applied to a PDSCH among rate match groups configured in a higher layer (0, 1, or 2 bits), a ZP CSI-RS trigger, which triggers a zero-power channel state information reference signal (0, 1, or 2 bits), TB-related configuration information, which indicates a MCS, a new data indicator (NDI), and a redundancy version (RV) relating to one or two TBs, a HARQ process number, which indicates a number of a HARQ process applied to a PDSCH (4 bits), a downlink assignment index, which is designed for generating a dynamic HARQ-ACK codebook when a HARQ-ACK on a PDSCH is reported (0 or 2 or 4 bits), a TPC command for scheduled PUCCH, which power control information applied to a PUCCH for reporting a HARQ-ACK on a PDSCH (2 bits), a PUCCH resource indicator, which is information indicating a resource of a PUCCH for reporting a HARQ-ACK on a PDSCH (3 bits), a PDSCH-to-HARQ_feedback timing indicator, which is configuration information relating to a slot through which a PUCCH for reporting a HARQ-ACK on a PDSCH is transmitted (3 bits), antenna ports, which is information indicating an antenna port of a PDSCH DMRS and a DMRS code-division multiplexing (CDM) group through which a PDSCH is not transmitted (4, 5 or 6 bits), transmission configuration indication, which is information indicating beam-related information of a PDSCH (0 or 3 bits), an SRS request, which is information requesting transmission of an SRS (2 bits), code block group (CBG) transmission information, which is information indicating that data corresponding to which CBG is transmitted through a PDSCH, when retransmission based on a code block group is configured (0, 2, 4, 6, or 8 bits), CBG flushing out information, which is information indicating whether a code block group previously received by the terminal can be used for HARQ combining (0 or 1 bit), and DMRS sequence initialization indicating a DMRS sequence initialization parameter (1 bit).

Information included in DCI format 1_1 has been described as an example, but the above described pieces of information may also be used for another DCI format for scheduling data.

If the base station transmits, to the terminal, DCI for scheduling downlink data, the base station generates downlink data to transmit to the terminal, by receiving a TB transferred from a MAC layer and performing channel coding in a physical layer. Specifically, the base station attaches a TB CRC to a TB, and if it is necessary, the base station divides the TB having the TB CRC attached thereto, into CBs, attaches a CB CRC to the code blocks, and encodes data by applying LDCP coding. After the encoding, rate matching and CB concatenation may be applied to the encoded data. The size of the TB may be calculated as described in the disclosure. If the base station transmits DCI for scheduling uplink data, the terminal may perform the above described operations of the base station in order to generate uplink data.

Downlink data or uplink data generated as described above is transmitted through a PDSCH or PUSCH on a resource determined according to time-frequency domain resource allocation information included in DCI. The downlink data or uplink data may be transmitted together with a DMRS configured in DCI and higher layer signaling.

If the terminal receives downlink data, the terminal transmits HARQ-ACK information indicating whether the transmission of the downlink data has succeeded, through a PUCCH or PUSCH. If the HARQ-ACK information is transmitted through a PUCCH, the HARQ-ACK information may be transmitted to the base station through a PUCCH resource and a slot indicated by DCI. The HARQ-ACK information may be transmitted through a PUSCH.

The size of a TB may be calculated through the following operations in an NR system.

Operation 1.1: calculate $N_{RB}$, the number of REs allocated to PDSCH mapping in a PRB in an allocation resource $N'_{RE}$ may be calculated by $N_{sc}^{RB} \cdot N_{symb}^{sh} - N_{DMRS}^{PRB} - N_{oh}^{PRB}$.

$N_{sc}^{RB}$ may be 12, and $N_{symb}^{sh}$ may be the number of OFDM symbols allocated to a PDSCH. $N_{DMRS}^{PRB}$ is the number of REs in a single PRB, occupied by a DMRS of the same CDM group. $N_{oh}^{PRB}$ is the number of REs occupied by an overhead in a single PRB, configured by higher signaling, and may be configured to be one of 0, 6, 12, and 18. Then, $N_{RE}$, the total number of REs allocated to the PDSCH, may be calculated. $N_{RE}$ is calculated by $\min(156, N'_{RE}) \cdot n_{PRB}$, wherein $n_{PRB}$ indicates the number of PRBs allocated to the terminal.

Operation 1.2: $N_{info}$, the number of temporary information bits, may be calculated by $N_{RE} * R * Q_m * v$. R is a code rate, $Q_m$ is a modulation order, and information on the values may be transmitted by using a pre-arranged table and a MCS bit field in control information. u is the number of allocated layers. If $N_{info} \leq 3824$, a TBS may be calculated through operation 1.3 below. In the other cases, a TBS may be calculated through operation 1.4.

Operation 1.3: $N'_{info}$ may be calculated by the equations $$N'_{info} = \max\left(24, 2^n * \left\lfloor \frac{N_{info}}{2^n} \right\rfloor\right)$$

and $n = \max(3, \lfloor \log_2(N_{info}) \rfloor - 6)$. A TBS may be determined to be a value closest to $N'_{info}$ among values greater than or equal to $N'_{info}$ in Table 6 below.

TABLE 6

| Index | TBS |
| --- | --- |
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |

TABLE 6-continued

| Index | TBS |
| --- | --- |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Operation 1.4: $N'_{info}$ may be calculated by the equations of $$N'_{info} = \max\left(3840, 2^n \times \text{round}\left(\frac{N_{info} - 24}{2^n}\right)\right)$$

and $n = \lfloor \log_2(N_{info} - 24) \rfloor - 5$. A TBS may be determined through $N'_{info}$ and pseudo-code 2.1 below.

Start of Pseudo-Code 2.1 if R≤¼

--- if R ≤ ¼

$$TBS = 8 * C * \left\lceil \frac{N'_{info} + 24}{8 * C} \right\rceil - 24, \text{ where } C = \left\lceil \frac{N'_{info} + 24}{3816} \right\rceil$$

else
  if N'$_{info}$ > 8424

$$TBS = 8 * C * \left\lceil \frac{N'_{info} + 24}{8 * C} \right\rceil - 24, \text{ where } C = \left\lceil \frac{N'_{info} + 24}{8424} \right\rceil$$

else $$TBS = 8 * \left\lceil \frac{N'_{info} + 24}{8} \right\rceil - 24$$

end if
end if

---

A maximum data rate supported by the terminal in the NR system may be determined through Equation (3) below.

$$\text{data rate (in Mbps)} = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j)\mu} \cdot 12}{T_s^\mu} \cdot (1 - OH^{(j)})_{max} O \right) \quad (3)$$

In Equation (3), J indicates the number of carriers bound by carrier aggregation, Rmax is 948/1024, $v_{Layers}^{(j)}$ may be a maximum number of layers, $Q_m^{(j)}$ may be a maximum modulation order, $f^{(j)}$ may be a scaling index, and μ may indicate subcarrier spacing. One of 1, 0.8, 0.75, and 0.4 may be reported by the terminal as $f^{(j)}$, and μ may be given by Table 7 below.

TABLE 7

| μ | Δf = $2^\mu$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

$T_s^b$ is an average OFDM symbol length, $T_s^R$ may be calculated by $$\frac{10^{-2}}{14 \cdot 2^\mu},$$

and $N_{PRR}^{BW(j)\mu}$ is a maximum number of RBs in BW(j). $OH^{(j)}$ is an overhead value, and may be 0.14 in a downlink and 0.18 in an uplink of FR1 (a band less than or equal to 6 GHz), and 0.08 in a downlink and 0.10 in an uplink of FR2 (a band greater than 6 GHz), A maximum data rate in a downlink of a cell having a frequency bandwidth of 100 MHZ and subcarrier spacing of 30 kHz may be calculated to be as Table 8 below.

TABLE 8

| $f^{(j)}$ | $v_{Layers}^{(j)}$ | $Q_m^{(j)}$ | Rmax | $N_{PRB}^{BW(j),\mu}$ | $T_R^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

Meanwhile, an actual data rate, which can be measured at actual data transmission by the terminal, may be obtained by dividing the amount of data by a data transmission time interval. A data rate may be obtained by dividing, by the length of a TTI, a TBS at 1 TB transmission or the sum of TBSs at 2 TB transmission. Under an assumption used to obtain Table 7, a maximum data rate in a downlink of a cell having a frequency bandwidth of 100 MHZ and subcarrier spacing of 30 kHz may be determined according to the number of allocated PDSCH symbols as shown in Table 9 below.

TABLE 9

| $N_{symb}^{gh}$ | $N_{DMRS}^{PRB}$ | $N'_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |

TABLE 9-continued

| $N_{symb}^{sh}$ | $N_{DMRS}^{PRB}$ | $N'_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

A maximum data rate supported by the terminal may be noted through Table 8, and an actual data rate according to an allocated TBS may be noted through Table 9. There may be occasions when an actual data rate is greater than a maximum data rate, according to scheduling information.

In a wireless communication system, particularly, in an NR system, a data rate supportable by the terminal may be arranged between the base station and the terminal. The data rate may be calculated by using a maximum frequency band, a maximum modulation order, a maximum number of layers, and the like, which are supported by the terminal. However, the calculated data rate may be different from a value calculated by the size (transport block size (TBS)) of a TB used for actual data transmission and the length of a TTI.

Accordingly, there may be a case when a TBS greater than a value corresponding to a data rate supported by the terminal itself may be allocated to the terminal. The occurrence of the case may be required to be minimized, and the operation of the terminal may be required to be defined in the case.

The calculation of a TBS in NR-based sidelink data transmission may be determined based on a combination of one or more parameters as follows: the length of a CP configured for a corresponding resource pool; the number of symbols per slot, configured for the corresponding resource pool; scheduling information (the number of symbols of a PSSCH, the number of frequency resource PRBs, and MCS index) indicated by SCI; the number of aggregated slots indicated by SCI; slot period information (for example, the information indicates that a PSFCH may be transmitted every N slots) of a feedback channel (physical sidelink feedback channel (PSFCH)) resource configured for the corresponding resource pool; and whether retransmission is performed.

In relation to sidelink, whether FBRM capable of transmitting all of the parities generated by channel coding is used, or LBRM of transmitting only a part of the parities generated by channel coding is used may be determined through configuration or pre-configuration for each resource pool. In relation to sidelink, whether LBRM is applied or FBRM is applied may be configured for a resource pool according to unicast, groupcast, and broadcast transmission/reception. That is, even in the same resource pool, LBRM may be applied to unicast and groupcast, and FBRM may be applied to broadcast. In relation to sidelink, whether LBRM is applied or FBRM is applied may be determined according to whether retransmission is possible. FBRM may be applied to a transmission mode in which a transmission procedure is terminated only with initial transmission and retransmission is not performed, according to a resource pool, or a configuration in the resource pool, and RBRM may be applied to the other cases. If a terminal and a terminal engage with each other by a PC5-RRC connection required for sidelink unicast or groupcast communication, the terminals may determine whether to use FBRM or LBRM, by exchanging a configuration value or exchanging capability of FBRM or LBRM with each other through PC5-RRC signaling.

In an LBRM method for sidelink transmission, $N_{cb}$ may be $\min(N, N_{ref})$, $N_{ref}$ may be $$\left\lfloor \frac{TBS_{LBRM}}{GR_{LBRM}} \right\rfloor,$$

and $R_{LBRM}$ may be determined to be 2/3. N may indicate the number of coded bits including all of parities obtained by channel coding of a given code block. $TBS_{LBRM}$ may associated with an example of a possible maximum size of TBSs in the above mentioned method of obtaining a TBS. In order to obtain a $TBS_{LBRM}$, a maximum number of layers supported by the terminal in a corresponding cell may be assumed, if a maximum modulation order is not configured for the terminal in the corresponding cell, 64 QAM may be assumed as the maximum modulation order, the maximum code rate of 948/1024 may be assumed as a code rate, $N_{RE}$ may be assumed as $156 \cdot n_{PRB}$, and $n_{PRB}$ may be assumed as $n_{PRB,LBRM}$. $n_{PRB,LBRM}$ may be the number of PRBs configured for the corresponding resource pool. $n_{PRB,LBRM}$ may refer to the number of PRBs of a resource pool configured to use the greatest number of PRBs, among sidelink resource pools for transmission/reception configured for a sidelink BWP. Using FBRM may refer to that the $N_{cb}$ is determined to be N.

In the above description, $N_{RE}$ is assumed to be $156 \cdot n_{PRB}$, but may be a value used to establish DL or UL communication with the base station, and in a sidelink, $N_{RE}$ may be calculated by $N_{RE}=144 \cdot n_{PRB}$. 144 used above merely corresponds to an example, and the disclosure may be applied while being not limited thereto. That is, when LBRM for sidelink communication is applied, $N_{RE}=132 \cdot n_{PRB}$ or $n_{RE}=120 \cdot n_{PRB}$ may be applied. The application refers to a value used for $N_{RE}$ for application of LBRM at the time of DL or UL communication with the base station and a value used for $N_{RE}$ for application of LBRM at the time of sidelink communication may be different, or $N_{RE}$ for application of LBRM at the time of sidelink communication may be smaller than $N_{RE}$ for application of LBRM at the time of DL or UL communication with the base station. This is because the number of usable symbols is smaller in sidelink communication, than in conventional DL or UL communication with the base station since one symbol, a predetermined number of symbols, or a configured number of symbols are empty in order to secure time required for switching between transmission and reception in a single slot in a sidelink.

The disclosure provides a method of transmitting, by a reception terminal, a HARQ-ACK feedback and a method of receiving, by a base station having transmitted data, HARQ-ACK feedbacks from reception terminals and retransmitting data, in groupcast data transmission/reception. The base station may be a transmission terminal.

When the base station transmits a TB including one or several CBs to reception terminals in groupcast, the reception terminals may decode the TB, determine which CB has failed to be decoded, and which CB has not been successfully decoded, and accordingly calculate the total number of CBs for which decoding has failed. The base station configures uplink resources or PUCCH resources for transmitting HARQ-ACKs by the reception terminals, before the base station transmits corresponding data. The configuration of the PUCCH resources allows the reception terminals to transmit an uplink signal or a PUCCH for transmitting HARQ-ACK feedback information, through the corresponding PUCCH resources. For example, a PUCCH resource may be determined based on the number of CBs which have failed to be decoded by a reception terminal.

Which PUCCH resource among the configured one or plurality of PUCCH resources is used by a reception terminal to transmit HARQ-ACK feedback information through a PUCCH may be determined based on the number of CBs having failed to be decoded, the number of CBs having succeeded to be decoded, or the like. The base station may configure a first PUCCH resource, a second PUCCH resource, a third PUCCH resource, . . . , and a tenth PUCCH resource, if one CB fails to be decoded, a reception terminal may transmit a PUCCH through the first PUCCH resource, if two CBs fail to be decoded, a reception terminal may transmit a PUCCH through the second PUCCH resource, if three CBs fail to be decoded, a reception terminal may transmit a PUCCH through the third PUCCH resource, if nine CBs fail to be decoded, a reception terminal may transmit a PUCCH through the ninth PUCCH resource, and if ten or more CBs fail to be decoded, a reception terminal may transmit a PUCCH through the tenth PUCCH resource. Because several terminals may transmit PUCCHs through the configured ten PUCCH resources, one or plurality of reception terminals may transmit a PUCCH through a common PUCCH resource.

The base station attempts to receive an uplink signal or a physical channel through all of the configured PUCCH resources, to obtain information of all of the terminals, relating to the maximum number of CBs having failed to be decoded in a single terminal. The base station may identify, based on the information, the maximum number among the set of the number of CBs having failed to be decoded by the reception terminals. If the base station receives a PUCCH through the ninth PUCCH resource without receiving a PUCCH through the tenth PUCCH resource, it may be noted that a reception terminal, among the several reception terminals, having the greatest number of CBs having failed to be decoded has failed to decode nine CBs.

It is assumed that the base station configures a first PUCCH resource to a tenth PUCCH resource and transmits a TB including 14 CBs. If five reception terminals have failed to decode two CBs, one CB, six CBs, eight CBs, and one CB, respectively, a first reception terminal may transmit a feedback through the second PUCCH resource, a second reception terminal may transmit a feedback through the first PUCCH resource, a third reception terminal may transmit a feedback through the sixth PUCCH resource, a fourth reception terminal may transmit a feedback through the eight PUCCH resource, and a fifth reception terminal may transmit a feedback through the first PUCCH resource. The base station may receive feedback information through the first PUCCH resource, the second PUCCH resource, the sixth PUCCH resource, and the eight PUCCH resource. Through the above method, the base station may identify that a terminal has failed to decode eight CBs.

Therefore, the base station may generate eight or more parity CBs by applying an outer code to the 14 data CBs, and transmits the generated parity CBs at the time of retransmission. The reception terminals may decode the eight parity CBs firstly by an LDPC code or a turbo code, and apply parity CBs having succeeded to be decoded, and prior data CBs having succeeded to be decoded, to outer code decoding, thereby identifying all of data CBs. The number of parity CBs at initial transmission or retransmission may be transmitted in control information.

The base station may receive the HARQ-ACK feedbacks, generate parity CBs, based on the maximum number of CBs having failed to be decoded, and then transmit the generated parity CBs. The parity CBs may be generated from data CBs by using a Reed-Solomon (RS) code, a Luby-transform code, a raptor code, or the like. The codes may be called a linked code structure or an outer code structure.

Figure 20A:
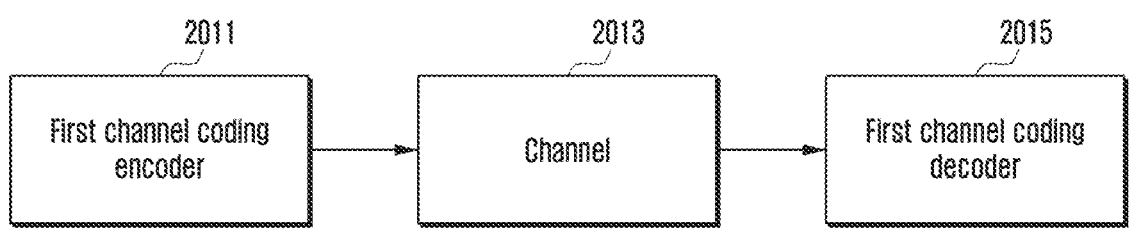
FIG. 20A is a diagram of a process of coding and decoding of a channel in the case where an outer code is not used, according to an embodiment.
Figure 20B:
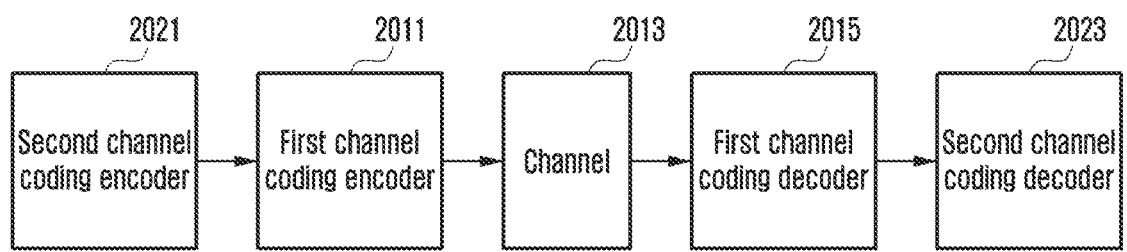
FIG. 20B is a diagram of a process of coding and decoding of a channel in the case where an outer code is used, according to an embodiment.

FIG. 20A is a diagram of a process of coding and decoding of a channel in the case where an outer code is not used, according to an embodiment. FIG. 20B is a diagram of a process of coding and decoding of a channel in the case where an outer code is used, according to an embodiment.

Referring to FIGS. 20A and 20B, when an outer code is not used, a first channel coding encoder 2011 of a transmission device and a first channel coding decoder 2015 of a reception device are used for a procedure of transmitting and receiving a signal through a channel 2013. A second channel coding encoder 2021 of a transmission device and a second channel coding decoder 2023 of a reception device may not be used. The first channel coding encoder 2011 and the first channel coding decoder 2015 of the case where an outer code is not used may be configured to be identical to those of the case where an outer code is used.

Referring to FIG. 20B, when an outer code is used, data to be transmitted passes through the second channel coding encoder 2021. Bits or symbols having passed through the second channel coding encoder 2021 pass through the first channel coding encoder 2011. When symbols, for which channel coding has been performed through the second channel coding encoder 2021 and the first channel coding encoder 2011, are received by the reception device through the channel 2013, the reception device may allow the received signal to pass through the first channel coding decoder 2015 and the second channel coding decoder 2023 sequentially. The first channel coding decoder 2015 and the second channel coding decoder 2023 may perform operations corresponding to the first channel coding encoder 2011 and the second channel coding encoder 2021, respectively.

Figure 21:
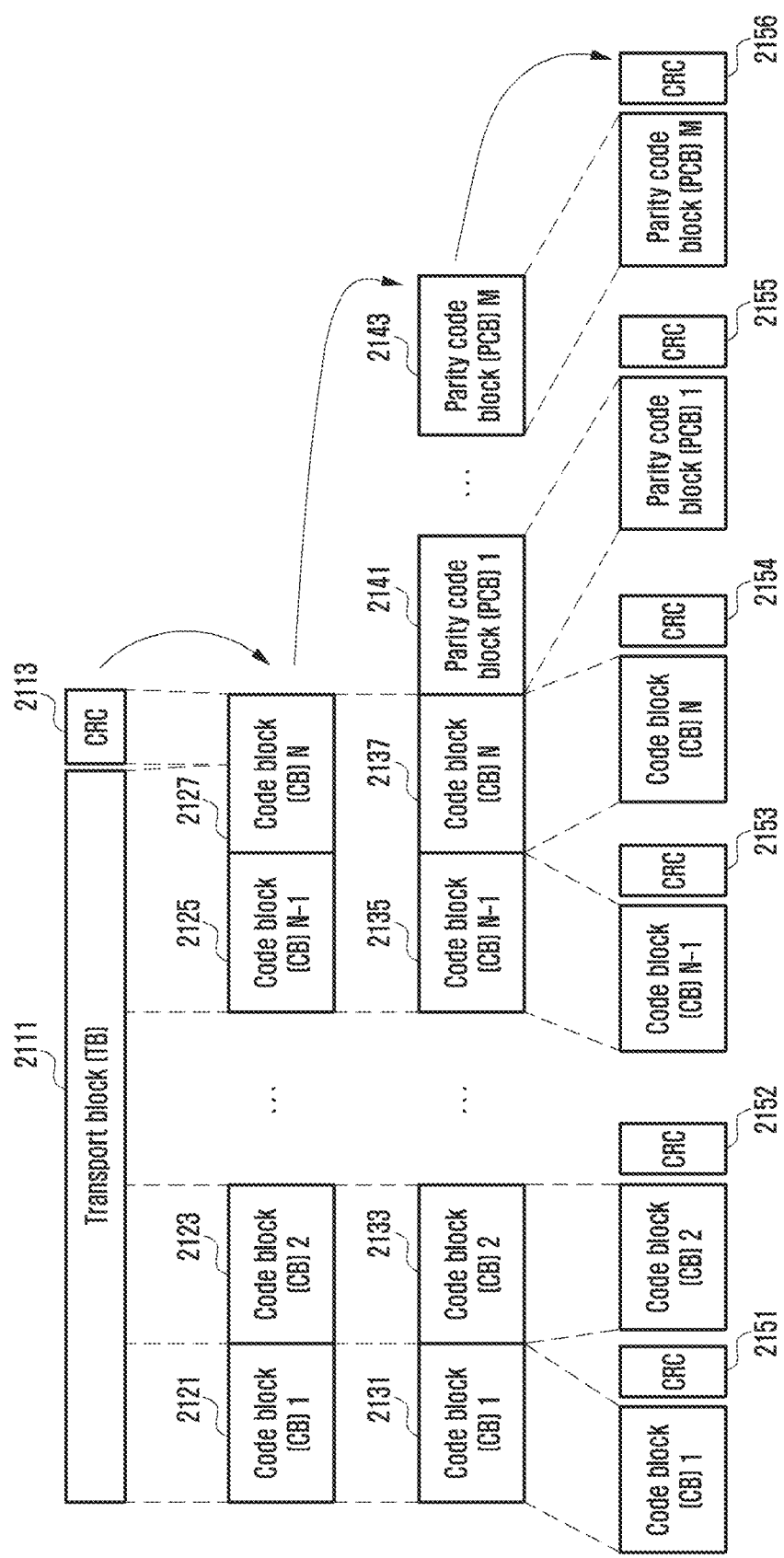
FIG. 21 is a diagram of a procedure of obtaining code blocks (CBs) and parity bit code blocks (parity bit CBs (PCBs)) in a wireless communication system, according to an embodiment.

FIG. 21 is a diagram of a procedure of obtaining CBs and parity bit code blocks (parity bit CBs (PCBs)) in a wireless communication system, according to an embodiment.

Referring to FIG. 21, a TB 2111 and the TB 2111 having a CRC 2113 added thereto may be divided into at least one CB. If a single CB is generated according to the size of the TB, the CRC may not be added to the generated CB. When an outer code is applied to CBs 2121, 2123, 2125, and 2127 (or CBs 2131, 2133, 2135, and 2137) to be transmitted, CBs 2141 and 2143 may be generated.

Like the CBs 2121, 2123, 2125, and 2127 (or CBs 2131, 2133, 2135, and 2137), CBs formed by dividing a TB (or a TB having a CRC added thereto) may be called data CBs, and like the CBs 2141 and 2143, CBs generated by applying an outer code to data CBs may be called PCBs.

The PCBs 2141 and 2143 generated by applying an outer code may be positioned after the last CB 2137. After the outer code is applied, CRCs 2151, 2152, 2153, 2154, 2155, and 2156 may be added to CBs and PCBs, respectively. The CBs having the CRCs added thereto or the PCBs having the CRCs added thereto may be encoded based on a channel code (for example, a first channel code).

The NR system employs a HARQ scheme that retransmits corresponding data in a physical layer if decoding fails at the initial transmission. In a HARQ scheme, if a reception device fails to decode data, the reception device transmits, to a transmission device, information (NACK) indicating decoding failure, to allow the transmission device to retransmit the corresponding data in a physical layer. The reception device combines data retransmitted by the transmission device, with the previous data for which decoding has failed, to increase a data reception performance. Also, if the reception device succeeds to decode data, the reception device transmits, to the transmission device, information (ACK) indicating decoding success, to allow the transmission device to transmit new data.

Since there is a high possibility that CBs having failed to be decoded are different for each of a plurality of receiving ends, the larger the number of receiving ends, the larger the number of CBs required to be retransmitted. In the case where an outer code is used, even if CBs having failed to be decoded by a plurality of reception devices are different, a transmission device transmits common parity CBs generated by applying the outer code, to the plurality of reception devices, thereby allowing the reception devices to restore desired data CBs by using the common parity CBs. Each of the reception devices may transmit information indicating the number of data CBs having failed to be decoded, rather than information indicating the index of a data CB having failed to be decoded, and therefore, the number of bits of feedback information transmitted by the reception devices to the transmission device may be reduced.

Figure 22:
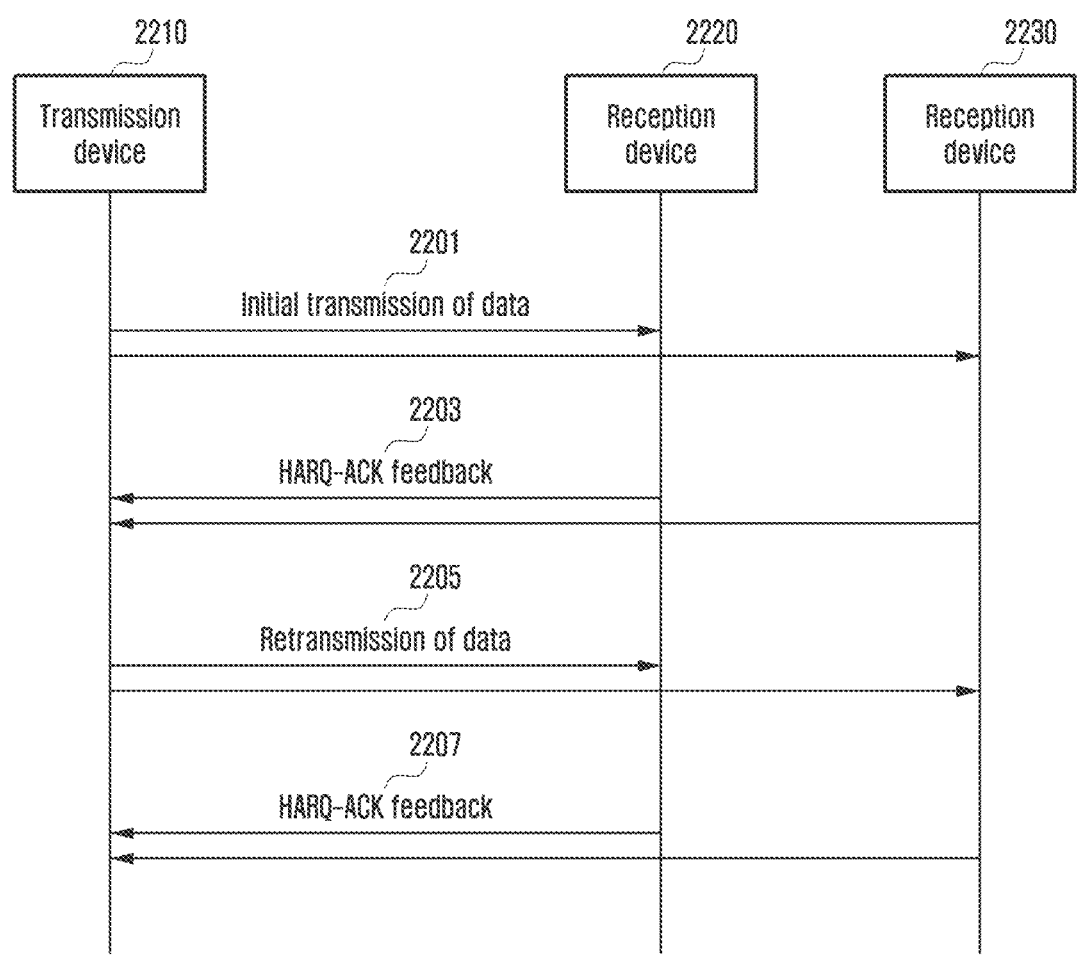
FIG. 22 is a diagram of a process of data transmission between a transmission device and reception devices in a wireless communication system, according to an embodiment.

FIG. 22 is a diagram of a process of data transmission between a transmission device and reception devices in a wireless communication system, according to an embodiment. In the following description, a transmission device is configured to transmit data by using a sidelink or a cellular link, and may be a terminal, a base station, or the like, and a reception device is configured to receive data from the transmission device and perform HARQ-ACK feedback on the data, and may be a terminal, a base station, or the like.

Referring to FIG. 22, at step 2201, a transmission device 2210 transmits data to reception devices 2220 and 2230. The transmission of data at step 2201 may be initial transmission of data. The transmission device 2210 may transmit data transferred from a MAC layer, through a physical channel, and the physical channel may include a control channel. The transmission device 2210 may transmit at least one TB to the reception devices 2220 and 2230. Each TB transmitted at step 2201 may include at least one data CB.

At step 2203, the reception devices 2220 and 2230 may transmit feedback information, such as a HARQ-ACK feedback, to the transmission device 2210. The feedback information may include a result of decoding of data corresponding to the initial transmission. The feedback information may include information relating to the number of CBs having failed to be decoded or the number of CBs having succeeded to be decoded, among CBs included in data corresponding to the initial transmission. In other words, the feedback information may include information indicating the number of CBs having failed to be decoded or the number of CBs having succeeded to be decoded.

At step 2205, the transmission device 2210 transmits data CBs and/or PCBs to the reception devices, based on the feedback information received at step 2203. The transmission of data at step 2205 may be retransmission of data. The transmission device 2210 may transmit PCBs, which has not been transmitted in the initial transmission operation, in the retransmission operation. The transmission device 2210 may determine the number of PCBs to be transmitted in the retransmission operation, based on the feedback information. If the feedback information includes information indicating the number of CBs having failed to be decoded by each of the reception devices 2220 and 2230, the transmission device 2210 may determine, as the number of parity CBs to be transmitted in the retransmission step, a number corresponding to the maximum value among the set of the number of CBs having failed to be decoded by the reception devices 2220 and 2230, and the transmission device 2210 may transmit the corresponding number of PCBs to the reception devices.

At step 2207, the reception devices 2220 and 2230 may transmit feedback information, such as a HARQ-ACK feedback, to the transmission device 2210. The feedback information may include a result of decoding of data transmitted in the retransmission step. The feedback information may include information relating to the number of CBs having failed to be decoded or the number of CBs having succeeded to be decoded, among CBs included in data transmitted in the retransmission step.

Figure 23:
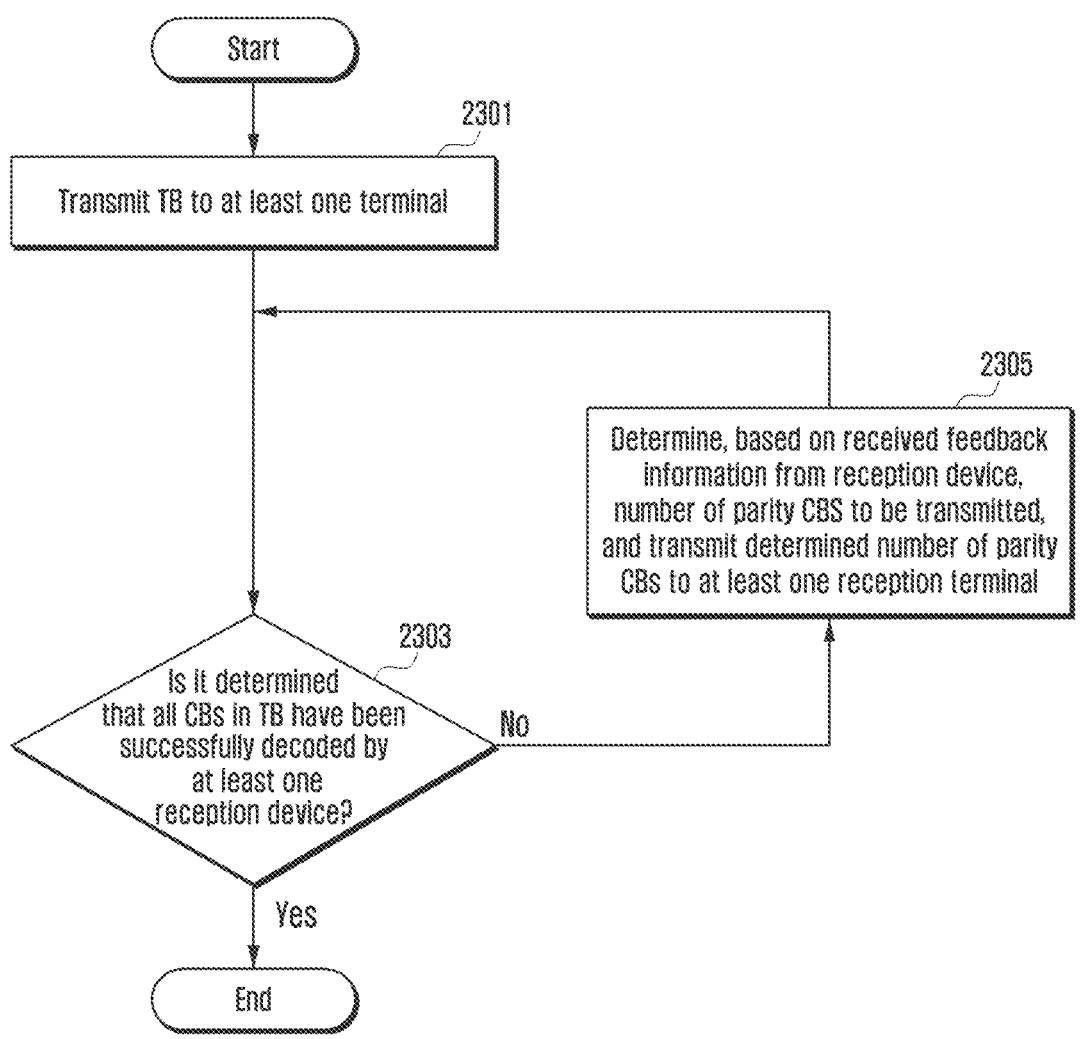
FIG. 23 is a flowchart of a transmission device that performs retransmission in a wireless communication system, according to an embodiment.

FIG. 23 is a flowchart of a transmission device that performs retransmission in a wireless communication system, according to an embodiment;

Referring to FIG. 23, at step 2301, a transmission device may transmit a TB to at least one terminal. The transmission at step 2301 may be initial transmission. If the transmission device is a terminal, the terminal may be configured or scheduled to transmit data to another terminal by a base station, or may have an authority to transmit data to another terminal in a group. The at least one terminal having received the TB decodes data, based on control information and determines whether CBs of the received TB has been successfully decoded. The at least one terminal transmits, to the transmission device, feedback information (e.g., HARQ-ACK feedback) including information indicating the number of CBs having failed to be decoded or the number of CBs having succeeded to be decoded.

At step 2303, the transmission device determines whether all of the CBs in the TB have been successfully decoded by the at least one reception device. The transmission device may determine, based on the feedback information received from the at least one reception device, whether all of the CBs in the TB have been successfully decoded by the at least one reception device. If all of the CBs in the TB have been successfully decoded by the at least one reception device, the transmission device may terminate the algorithm.

If all of the CBs in the TB have not been successfully decoded by the at least one reception device, at step 2305, the transmission device determines, based on the feedback information received from the reception device, the number of PCBs to be transmitted, and transmits the determined number of PCBs to the at least one reception terminal. The transmission device may obtain the PCBs by applying an outer code to the CBs of the TB. The transmission device may identify, based on the feedback information, the maximum value among the set of the number of CBs having failed to be decoded by each of the at least one reception device, and may transmit, to the at least one reception terminal, PCBs, the number of which corresponds to the identified maximum value.

The transmission device may transmit and/or retransmit data, based on the outer code, and the reception device having received the data may feed the number of CBs having failed to be decoded or the number of CBs having succeeded to be decoded among the CBs included in the data back to the transmission device. The feedback method may achieve performance gain effect of remarkably reducing the amount of feedbacks or the amount of data to be retransmitted, unlike a conventional method of feeding back information indicating a CB or CBG having failed to be decoded.

The disclosure provides a method for configuring a QoS value of a PSSCH in the case where a terminal transmits the corresponding PSSCH through an NR sidelink.

A terminal is operated based on a resource pool, previously configured, configured, or already defined between terminals, to perform transmission/reception through a sidelink.

The resource pool may be the set of frequency and time domain resources usable in transmitting or receiving a sidelink signal. That is, a sidelink signal is required to be transmitted or received on predetermined frequency-time resources, and the resources are defined to be a resource pool. The resource pool may be defined for each of transmission and reception, or may be used after being commonly defined for transmission and reception. Terminals may transmit or receive a sidelink signal after one or a plurality of resource pools are configured for the terminals. Configuration information relating to a resource poor used for transmission or reception of a sidelink, and other pieces of configuration information for the sidelink may be pre-installed at the time of the production of a terminal, may be configured by a current base station, may be pre-configured by another base station or another network unit before access to the current base station, may be fixed values, may be designated (provisioned) by a network, or may be self-constructed by the terminal.

In order to indicate a frequency domain resource of a resource pool, a start index and the length (i.e., the number of PRBs) of PRBs to belong to the resource pool may be configured, but the disclosure is not limited thereto, and PRBs may be configured by the units of bitmaps to define a single resource pool. In order to indicate a time domain resource of a resource pool, the indices of OFDM symbols or slots to belong to the resource pool may be configured by the units of bitmaps. In another method, formulas may be applied to the set of particular slots, and slots satisfying a corresponding formula may be defined to belong to a corresponding resource pool. In the case of configuring of a time domain resource, for example, a bitmap may indicate which slots among slots during a particular time interval belong to a particular resource pool, and whether a time resource at every particular time interval corresponds to the resource pool may be determined by the bitmap.

A subchannel may be defined by a unit of frequency, including a plurality of RBs. In other words, a subchannel may be defined as an integer multiple of a RB. Subchannels may be configured to have an identical size or different sizes, and a single subchannel is generally configured by consecutive PRBs, but don't have to be configured by consecutive PRBs necessarily. A subchannel may be a basic unit for resource allocation for a PSSCH or a PSCCH. Therefore, the size of a subchannel may be differently configured according to whether a corresponding channel is a PSSCH or a PSCCH. A subchannel as a term may be replaced with a resource block group (RBG), a set of RBGs, a set of PRBs, or the like.

A startRBSubchannel, which is higher signaling or configuration information, is assumed to indicate a start position of a subchannel in a frequency domain in a resource pool. A resource block, which is a frequency resource belonging to a resource pool for a PSSCH in an LTE V2X system, may be determined by the following method:

(i) The resource block pool $N_{subCH}$ includes sub-channels where $N_{subCH}$ is given by higher layer parameter numSubchannel;

(ii) The sub-channel m for m=0,1, ..., $N_{subCH}$−1 includes a set of $n_{subCHsize}$ contiguous resource blocks with the physical resource block number $n_{PRB} = n_{subCHRBstart} + m*n_{subCHsize} + j$ for j=0,1, ..., $n_{subCHsize}$−1 where $n_{subCHRBstart}$ and $n_{subCHsize}$ are given by higher layer parameters startRBSubchannel and sizeSubchannel, respectively A unit (granularity) of resource allocation on a time domain for the configuration of a resource pool may be a slot. In the following description of the disclosure, slots to which a resource pool is nonconsecutively allocated on the time axis are mainly discussed. However, a resource pool can be either consecutively allocated on a time domain or configured in units of symbols.

A startSlot, which is higher signaling or configuration information, is assumed to indicate a start position of a slot on a time domain in a resource pool. Subframes ($t_0^{SL}$, $t_1^{SL}$, ..., $t_{T_{max}}^{SL}$( )), which are time resources belonging to a resource pool for a PSSCH in an LTE V2X system, may be determined by the above described method.

The above-mentioned method corresponds to a method including: firstly reporting, by a bitmap, which slot (in the above example, subframe) among slots during a particular period is included in a resource pool, excepting slots used for a downlink, and determining, according to information of the bitmap, which slot among slots reported as belonging to the resource pool, belong to the resource pool.

A sidelink control channel may be called a PSCCH, and a sidelink shared channel or a sidelink data channel may be called a PSSCH. A broadcast channel broadcasted together with a synchronization signal may be called a physical sidelink broadcast channel (PSBCH), and a channel for transmission of a feedback may be called a PSFCH. A PSCCH or a PSSCH may be used to transmit a feedback. The channels may be referred to as an LTE-PSCCH, an LTE-PSSCH, an NR-PSCCH, an NR-PSSCH, etc. according to communication systems in which the channels are transmitted. In the disclosure, a sidelink may indicate a link between terminals, and a Uu link may indicate a link between a base station and a terminal.

Information transmitted by a sidelink may include SCI, sidelink feedback control information (SFCI), sidelink channel state information (SCSI), and a sidelink shared channel (SL-SCH), which is a transport channel.

The pieces of information and the transport channel may be mapped to a physical channel by the method indicated by Tables 10 and 11 below.

TABLE 10

| TrCH (Transport channel) | Physical Channel |
|---|---|
| SL-SCH | PSSCH |

TABLE 11

| Control information | Physical Channel |
| --- | --- |
| SCI | PSCCH |
| SFCI | PSFCH |
| SCSI | PSSCH |

If SCSI is transmitted through a PSFCH, mapping between a transport channel and a physical channel as indicated by Tables 12 and 13 below may be applied.

TABLE 12

| TrCH (Transport channel) | Physical Channel |
| --- | --- |
| SL-SCH | PSSCH |

TABLE 13

| Control information | Physical Channel |
| --- | --- |
| SCI | PSCCH |
| SFCI | PSFCH |
| SCSI | PSSCH, PSFCH |

If SCSI is transmitted to a higher layer to a control element (MAC control element (MAC CE)) of a MAC layer, the transmission corresponds to SL-SCH, and thus the SCSI may be transmitted through a PSSCH, and mapping between a transport channel and a physical channel as indicated by Tables 14 and 15 below may be applied.

TABLE 14

| TrCH (Transport channel) | Physical Channel |
| --- | --- |
| SL-SCH | PSSCH |

TABLE 15

| Control information | Physical Channel |
| --- | --- |
| SCI | PSCCH |
| SFCI | PSFCH |
| SCSI | PSSCH, PSFCH |

When CSI of a sidelink is transmitted to MAC CE, a reception terminal may transfer at least one of the following additional information to a transmission terminal, together with the CSI: Information on a slot through which a sidelink CSI-RS used to measure CSI is transmitted, that is, information relating to timing at which the sidelink CSI-RS is transmitted; Information relating to a frequency domain in which CSI is measured, that is, information relating to a frequency domain in which a sidelink CSI-RS is transmitted. The information may include the index of a subchannel, etc.; Information on a rank indicator (RI) and a channel quality indicator (CQI); Information on a preferred precoding matrix; Information relating to preferred beamforming; ID information of a reception terminal having received a sidelink CSI-RS; ID information of a transmission terminal having transmitted a sidelink CSI-RS; ID information of a transmission terminal transmitting sidelink CSI feedback information; and ID information of a reception terminal receiving sidelink CSI feedback information.

Figure 24A:
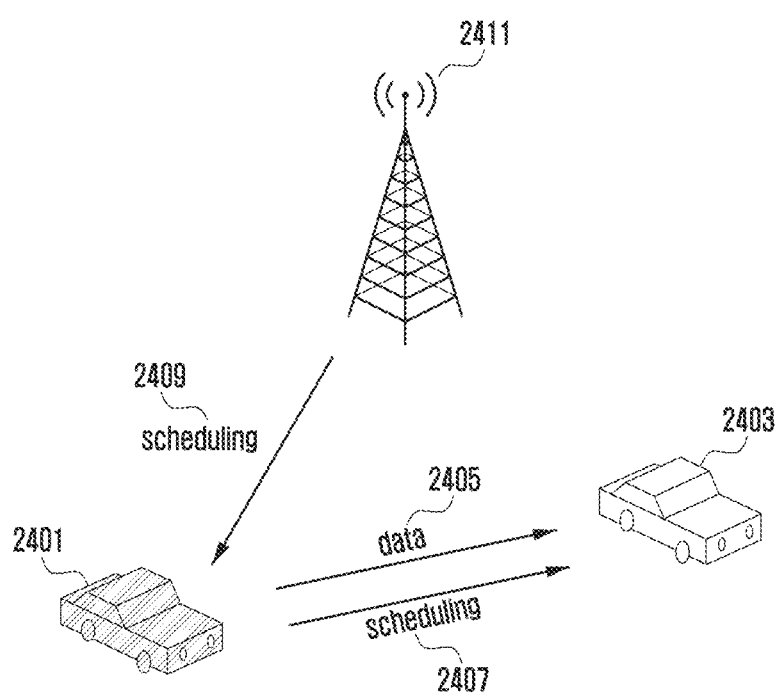
FIG. 24A illustrates an example of Mode 1 that is a method of performing sidelink communication, according to an embodiment.

FIG. 24A is a diagram of an example of Mode 1 that is a method of performing sidelink communication, according to an embodiment. In the disclosure, a method of receiving scheduling information from a base station and performing sidelink communication, based on the scheduling information is called Mode 1, but can be called differently therefrom.

A terminal 2401 that attempts to perform transmission through a sidelink receives scheduling information 2409 for sidelink communication from a base station 2411. In the disclosure, the terminal 2401 that attempts to transmit data through a sidelink may be called a transmission terminal, and a terminal 2403 that receives data through a sidelink may be called a reception terminal. Each of the transmission terminal 2401 and the reception terminal 2403 may transmit and receive data through a sidelink. The scheduling information 2409 for sidelink communication may be obtained by receiving DCI, and the DCI may include the following pieces of information: a carrier indicator, which may be used for a purpose of scheduling sidelink for another carrier in the state where carrier aggregation (CA) has been applied; a lowest index at the allocation of subchannels for initial transmission, which may be used to allocate a frequency resource at initial transmission; Information to be included in sidelink control information such as frequency resource allocation information, which may include resource allocation information or resource reservation information for initial transmission, retransmission, and N number of transmissions after the transmissions and information on time interval between initial transmission and retransmission; Information relating to a sidelink slot structure, where the information may include information relating to which slots and symbols can be used for sidelink; HARQ-ACK or/and CSI feedback timing information, where the information may include timing information for transmitting a HARQ-ACK feedback or a CSI feedback to a base station through a sidelink, recipient ID which is ID information relating to by which terminals reception is to be performed; and QoS information such as priority, which is information relating to that data having which priority is to be transmitted The scheduling may be used for scheduling for one-time transmission of a sidelink, or may be used for periodic transmission, semi-persistent scheduling, (SPS) or a configured grant transmission method (configured grant). Scheduling methods may be distinguished by an indicator included in DCI, an RNTI scrambled to a CRC added to the DCI, or an ID value. 0 bits, etc. may be added to the DCI to allow the size of the DCI to be identical to that of another DCI format of the DCI for downlink scheduling or uplink scheduling.

The transmission terminal 2401 receives DCI for sidelink scheduling from the base station 2411, transmits a PSCCH including the sidelink scheduling information 2407 and transmits a PSSCH which is data corresponding to the information (2405). The sidelink scheduling information 2407 may be SCI, and the SCI may include the following pieces of information: HARQ process number, which is a HARQ process ID for an operation relating to a HARQ of transmitted data; New data indicator (NDI) which is information relating to whether data which is currently being transmitted is new data; Redundancy Version, which is information relating to which parity bit is transmitted at the time of mapping after channel coding of data; Layer-1 source ID which is ID information in a physical layer, of a terminal that performs transmission; Layer-1 destination ID, which is ID information in a physical layer, of a terminal that performs reception; Frequency-domain resource assignment for scheduling PSSCH, which is frequency domain resource configuration information of transmitted data; MCS, which is information on modulation order and coding rate; a QoS indication, which may include priority, target latency/delay, target distance, target error rate, etc.; Antenna port(s), which is information on an antenna port for data transmission; DMRS sequence initialization, which may include information such as an ID value for initializing a DMRS sequence; PTRS-DMRS association, which may include information relating to PTRS mapping; CBGTI, which may be used as an indicator for retransmission by the units of CBGs; Resource reservation, which is information for resource reservation; Time gap between initial transmission and retransmission, which is information on time interval between initial transmission and retransmission; Retransmission index, which is an indicator of identifying retransmission; Transmission format/cast type indicator, which is an indicator of identifying a transmission format or distinguishing between unicast/groupcast/broadcast; Zone ID which is location information of a transmission terminal; NACK distance, which is a reference indicator of determining whether a reception terminal is required to transmit a HARQ-ACK/NACK; HARQ feedback indication, which may include whether a HARQ feedback is required to be transmitted, or whether a HARQ feedback is being transmitted; Time-domain resource assignment for scheduling PSSCH, which is time domain resource information of transmitted sidelink data; Second SCI indication, which is an indicator including mapping information of second SCI in the case of two-stage control information; and DMRS pattern which is information on a DMRS pattern (for example, the position of a symbol to which a DMRS is mapped).

The control information may be transmitted to the reception terminal after being included in a single piece of SCI, or may be transmitted after being included in two pieces of SCI. The transmission through two pieces of SCI may be called a 2-stage SCI method.

Figure 24B:
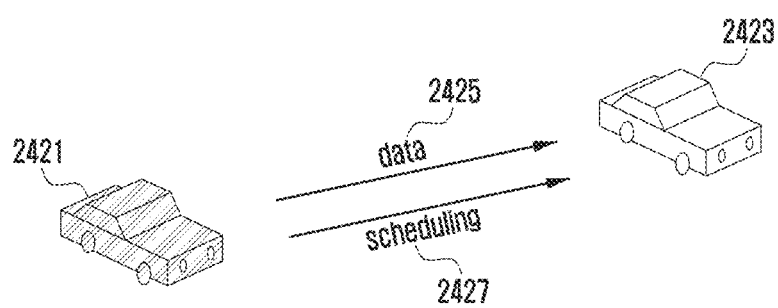
FIG. 24B illustrates an example of Mode 2 that is a method of performing sidelink communication, according to an embodiment.

FIG. 24B is a diagram of an example of Mode 2 that is a method of performing sidelink communication, according to an embodiment. In the disclosure, a method of performing sidelink communication by a determination of a transmission terminal 2421 without receiving scheduling information from a base station is called Mode 2, but can be called differently therefrom. The transmission terminal 2421 transmits a PSCCH including sidelink scheduling information 2427 to a reception terminal 2423 (2427), and transmits a PSSCH corresponding to the information to the reception terminal 2423 (2425). The sidelink scheduling information 2427 may include SCI, and the SCI may include information identical or similar to SCI information of Mode 1.

In the disclosure, a DL may indicate a link through which a signal is transmitted from a base station to a terminal. In the disclosure, a UL may indicate a link transmitted from a terminal to a base station.

Resources of a resource pool may be determined according to information on frequency and time resources, and a configuration of transmission and reception operations performed in a resource pool may also be provided to a terminal according to the resource pool. The resources of the resource pool and the configuration information according to the resource pool may be configured for a terminal by a base station, may be configured through information exchange between terminals, or may be previously stored at the time of the production of the terminal.

In a 5G system, QoS information may be transmitted through a QoS parameter referred to as a 5G QoS identifier (5GI). A resource type, priority, latency time, error rate, etc. may be assigned to a single 5QI value, and may be defined by Table 16 below.

TABLE 16

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | $10^{-2}$ | N/A | 2000 ms | Conversational Voice |
| 2 | | 40 | 150 ms (NOTE 11, NOTE 13) | $10^{-3}$ | N/A | 2000 ms | Conversational Video (Live Streaming) |
| 3 (NOTE 14) | | 30 | 50 ms (NOTE 11, NOTE 13) | $10^{-3}$ | N/A | 2000 ms | Real Time Gaming, V2X messages Electricity distribution - medium voltage, Process automation - monitoring |
| 4 | | 50 | 300 ms (NOTE 11, NOTE 13) | $10^{-6}$ | N/A | 2000 ms | Non-Conversational Video (Buffered Streaming) |
| 65 (NOTE 9, NOTE 12) | | 7 | 75 ms (NOTE 7, NOTE 8) | $10^{-2}$ | N/A | 2000 ms | Mission Critical user plane Push To Talk voice (e.g., MCPTT) |
| 66 (NOTE 12) | | 20 | 100 ms (NOTE 10, NOTE 13) | $10^{-2}$ | N/A | 2000 ms | Non-Mission-Critical userplane Push To Talk voice |
| 67 (NOTE 12) | | 15 | 100 ms (NOTE 10, NOTE 13) | $10^{-3}$ | N/A | 2000 ms | Mission Critical Video user plane |
| 75 (NOTE 14) | | | | | | | |
| 71 | | 56 | 150 ms (NOTE 11, NOTE 15) | $10^{-6}$ | N/A | 2000 ms | "Live" Uplink Streaming (e.g. TS 26.238 [76]) |
| 72 | | 56 | 300 ms (NOTE 11, NOTE 15) | $10^{-4}$ | N/A | 2000 ms | "Live" Uplink Streaming (e.g. TS 26.238 [76]) |
| 73 | | 56 | 300 ms (NOTE 11, NOTE 15) | $10^{-8}$ | N/A | 2000 ms | "Live" Uplink Streaming (e.g. TS 26.238 [76]) |

TABLE 16-continued

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 74 | | 56 | 500 ms (NOTE 11, NOTE 15) | $10^{-8}$ | N/A | 2000 ms | "Live" Uplink Streaming (e.g. TS 26.238 [76]) |
| 75 | | 56 | 500 ms (NOTE 11, NOTE 15) | $10^{-4}$ | N/A | 2000 ms | "Live" Uplink Streaming (e.g. TS 26.238 [76]) |
| 5 | Non-GBR (NOTE 1) | 10 | 100 ms NOTE 10, NOTE 13) | $10^{-6}$ | N/A | N/A | IMS Signalling |
| 6 | | 60 | 300 ms (NOTE 10, NOTE 13) | $10^{-6}$ | N/A | N/A | Video (Buffered Streaming) TCP-based (e.g., www, e-mail, chat, ftp, p2p file sharing, progressive video, etc.) |
| 7 | | 70 | 100 ms (NOTE 10, NOTE 13) | $10^{-3}$ | N/A | N/A | Voice, Video (Live Streaming) Interactive Gaming |
| 8 | | 80 | 300 ms (NOTE 13) | $10^{-6}$ | N/A | N/A | Video (Buffered Streaming) TCP-based (e.g., www, e-mail, chat, ftp, p2p file sharing, progressive video, etc.) |
| 9 | | 90 | | | | | |
| 69 (NOTE 9, NOTE 12) | | 5 | 60 ms (NOTE 7, NOTE 8) | $10^{-6}$ | N/A | N/A | Mission Critical delay sensitive signalling (e.g., MC-PTT signalling) |
| 70 (NOTE 12) | | 55 | 200 ms (NOTE 7, NOTE 10) | $10^{-6}$ | N/A | N/A | Mission Critical Data (e.g. example services are the same as 5QI 6/8/9) |
| 79 | | 65 | 50 ms (NOTE 10, NOTE 13) | $10^{-2}$ | N/A | N/A | V2X messages |
| 80 | | 68 | 10 ms (NOTE 5, NOTE 10) | $10^{-6}$ | N/A | N/A | Low Latency eMBB applications Augmented Reality |
| 82 | Delay Critical GBR | 19 | 10 ms (NOTE 4) | $10^{-4}$ | 255 bytes | 2000 ms | Discrete Automation (see TS 22.261 [2]) |
| 83 | | 22 | 10 ms (NOTE 4) | $10^{-4}$ | 1354 bytes (NOTE 3) | 2000 ms | Discrete Automation (see TS 22.261 [2]) |
| 84 | | 24 | 30 ms (NOTE 6) | $10^{-5}$ | 1354 bytes (NOTE 3) | 2000 ms | Intelligent transport systems (see TS 22.261 [2]) |
| 85 | | 21 | 5 ms (NOTE 5) | $10^{-5}$ | 255 bytes | 2000 ms | Electricity Distribution-high voltage (see TS 22.261 [2]) |

A packet which is delayed more than packet delay budget (PDB) is not counted as lost, thus not included in the packet error rate (PER) (note 1). It is required that default maximum data burst volume (MDBV) is supported by a public land mobile network (PLMN) supporting the related 5Qis (note 2). This MDBV value is set to 1354 bytes to avoid IP fragmentation for the IPv6 based, IPSec protected GTP tunnel to the 5G-AN node (the value is calculated as in Annex C of TS 23.060 and further reduced by 4 bytes to allow for the usage of a GTP-U extension header) (note 3). A delay of 1 ms for the delay between a user plane function (UPF) terminating N6 and a 5G-AN should be subtracted from a given PDB to derive the packet delay budget that applies to the radio interface. When a dynamic CN component of the PDB is used, see 5.7.3.4 of TS 23.501 (note 4).

A delay of 2 ms for the delay between a UPF terminating N6 and a 5G-AN should be subtracted from a given PDB to derive the packet delay budget that applies to the radio interface. When a dynamic CN component of the PDB is used, see 5.7.3.4 of TS 23.501 (note 5). A delay of 5 ms for the delay between a UPF terminating N6 and a 5G-AN should be subtracted from a given PDB to derive the packet delay budget that applies to the radio interface. When a dynamic CN component of the PDB is used, see 5.7.3.4 of TS 23.501 (note 6). For mission critical services, it may be assumed that the UPF terminating N6 is located "close" to the 5G_AN (roughly 10 ms) and is not normally used in a long distance, home routed roaming situation. Hence delay of 10 ms for the delay between a UPF terminating N6 and a 5G_AN should be subtracted from this PDB to derive the packet delay budget that applies to the radio interface (note 7). In both RRC Idle and RRC Connected mode, the PDB requirement for these 5QIs can be relaxed (but not to a value greater than 320 ms) for the first packet(s) in a downlink data or signalling burst in order to permit reasonable battery saving (discontinuous reception, DRX) techniques (note 8).

It is expected that 5QI-65 and 5QI-69 are used together to provide mission critical push to talk service (e.g., 5QI-5 is not used for signalling). It is expected that the amount of traffic per UE will be similar or less compared to the IP multimedia subsystem (IMS) signalling (note 9). In both RRC Idle and RRC Connected mode, the PDB requirement for these 5QIs can be relaxed for the first packet(s) in a downlink data or signalling burst in order to permit battery saving (DRX) techniques (note 10). In RRC Idle mode, the PDB requirement for these 5QIs can be relaxed for the first packet(s) in a downlink data or signalling burst in order to permit battery saving (DRX) techniques (note 11). This 5QI value can only be assigned upon request from the network side. The UE and any application running on the UE is not allowed to request this 5QI value (note 12).

A delay of 20 ms for the delay between a UPF terminating N6 and a 5G-AN should be subtracted from a given PDB to derive the packet delay budget that applies to the radio interface (note 13). This 5QI is not supported as it is only used for transmission of V2X messages over multimedia broadcast multicast services (MBMS) bearers as define in TS 23.285 (note 14). For "live" uplink streaming, guidelines for PDB values of the different 5QIs correspond to the latency configurations. In order to support higher latency reliable streaming services (above 500 ms PDB), if different PDB and PER combinations are needed these configurations will have to use non-standardised 5Qis (note 15).

For example, in Table 16, a 5QI value of 82 has parameters such as a data type of delay critical GBR, a priority of 19, a latency time limit of 10 ms, an error rate of 10-4, and a one-time data generation amount of 255 bytes.

When a resource pool is configured for a sidelink, the set of 5QI values that data transmittable or receivable through the corresponding resource pool can have may be configured together. That is, when a particular resource pool is configured, data having 5QI values of 1, 2, 4, 5, 6, 82, 83, and 84 may be configured to be transmitted or received through the corresponding resource pool. In this case, it may be considered that data having a value other than eight 5QI values of {1, 2, 4, 5, 6, 82, 83, 84} is not transmitted or received through the corresponding resource pool. A QoS parameter for sidelink transmission/reception may be determined differently from Table 16 above and then applied, and the corresponding parameter may be referred to as a PC5 5QI or a PQI (PC5 5QI). The PC5 indicates an inter-terminal link, and may be considered as a sidelink.

In a terminal that transmits control information (SCI) through the corresponding resource pool, the SCI may include 5QI information.

If the corresponding pool is configured to allow data having 5QI values of 1, 2, 4, 5, 6, 82, 83, and 84 to be transmitted or received therethrough, 3 bits included in the SCI may be used as a 5QI indicator indicating one of {1, 2, 4, 5, 6, 82, 83, 84}. A sidelink transmission terminal may receive configuration information configuring a 5QI value that data transmittable through a resource pool corresponding to a resource pool configuration can have, and the sidelink transmission terminal may determine the size of a 5QI indication bit field included in SCI transmitted through the corresponding resource pool, according to the configuration information. If the configuration information indicates that data may correspond to one of N number of 501 values, a 501 indication bit field may have a size of $\lceil \log_2 N \rceil$, and the disclosure is not limited thereto. The sidelink transmission terminal may transmit the SCI including the 501 configuration information, based on the determined size of the 501 indication bit field. A terminal that receives the SCI may analyze the 501 indicator bit field included in the SCI to determine 501 information of data scheduled by the SCI.

While a terminal performs sidelink transmission/reception, the terminal may perform a particular operation, based on the distance between a transceiver and the terminal, and a required communication distance condition of transmitted data. When groupcast sidelink data is transmitted or received, a transmitter may transmit data after including, in SCI, location information (e.g., the ID value of a zone in which the transmitter is located) of the transmitter itself and also including, in the SCI, a reference distance value (e.g., reference zone ID, a reference distance, or a distance threshold) allowing the transmission of a HARQ-ACK feedback. A terminal that receives the groupcast sidelink data receives the SCI after decoding same, and identifies, in the SCI, the transmitter location information and the reference distance value allowing the transmission of a HARQ-ACK feedback. The terminal (may be used together with a receiver) that receives the SCI may determine whether the receiver transmits a HARQ-ACK feedback to the transmitter, based on the analyzed transmitter location information and reference distance value allowing the transmission of a HARQ-ACK feedback, and location information of the receiver itself. If the difference between the location of the transmitter and the location of the receiver is greater than the reference distance value allowing the transmission of a HARQ-ACK feedback, the receiver does not transmit a HARQ-ACK feedback. Meanwhile, if the difference between the location of the transmitter and the location of the receiver is smaller than the reference distance value allowing the transmission of a HARQ-ACK feedback, the receiver transmits a HARQ-ACK feedback.

The reference distance value may be referred to as a range value as described below. A range value may be one of parameters indicating the quality of a sidelink service. A range value which can be one of the QoS may be interpreted that a particular service should be provided up to a proposed range value, or a particular type of data should be transmitted up to the proposed range value. A range value may be a reference on which a transceiver processes a data packet. The unit of a range value may be a meter, and maximum distance information may be configured for a transmission/reception terminal. The configuration of the maximum distance information may mean that according to a configured maximum distance value, a terminal does not transmit or receive data having, as a QoS parameter, a distance value greater than the corresponding maximum distance value. A range value is not limited to the above description, and may be applied according to various methods.

A reference distance value allowing the transmission of a HARQ-ACK feedback as described above may be determined according to data transmitted through a PSSCH, and the reference distance value may be transmitted together with data at the time of transmission of the data from a higher layer. The transmission terminal may transmit the reference distance value after including same in SCI scheduling the PSSCH. That is, SCI including a reference distance value of transmitted data may schedule a PSSCH including the data. The reference distance value may be indicated through SCI by including, in the SCI, information directly indicating the reference distance value or including, in the SCI, an index indicating a range value. For example, one of indices of 0, . . . , n may be included in SCI, and an index of k may indicate a particular reference distance value (e.g., about 100 m) or a range (e.g., about 100 to about 149 m) of a particular reference distance value. Ann ID value of a zone (section) indicating a particular region or an index value indicating zone ID may be included in SCI.

Data transmitted through a PSSCH may be transmitted from a higher layer in the type of a TB. A single TB or two TBs may be transmitted through a single PSSCH. Various types of data may be included in a single TB. If various types of data having different reference distance values are included in a single TB, there is a need to determine which value is determined as a representative reference distance value and is included in SCI.

First, a reference distance value included in SCI may be determined based on the maximum value or the minimum value among the reference distance values of various types of data. A transmitter may include, in SCI, the greatest value among the reference distance values of various types of data. The inclusion may be described as "The UE shall set the "Range Value" field according to the largest range value among those range value(s) indicated by higher layers corresponding to the transport block".

A purpose of the method is to even allow transmission of data required to be transmitted the farthest. The disclosure is not limited thereto, the transmitter may include, in SCI, the smallest value among the reference distance values of various types of data included in a single TB, and the inclusion may be described as "The UE shall set the Range Value field according to the smallest range value among those range value(s) indicated by higher layers corresponding to the transport block".

The above description includes an example of a case when a single TB is transmitted through a PSSCH, but the description can also be applied to a case when two TBs are transmitted through a PSSCH. The transmitter may include, in SCI, the greatest value among the reference distance values of various types of data included in two TBs. The inclusion may be described as "The UE shall set the "Range Value" field according to the largest range value among those range value(s) indicated by higher layers corresponding to the transport block(s)".

The transmitter may include, in SCI, the smallest value among the reference distance values of various types of data included in two TBs.

Secondly, a reference for determining a reference distance value may be configured and then a reference distance value, among the reference distance values of various types of data, selected according to the configuration may be included in SCI. A reference for determining a reference distance value to be included in SCI may be configured as the maximum value, the minimum value, the average value, or the like among the reference distance values of various types of data, and the transmission terminal determines a reference distance value to be included in SCI, according to the reference.

Figure 25:
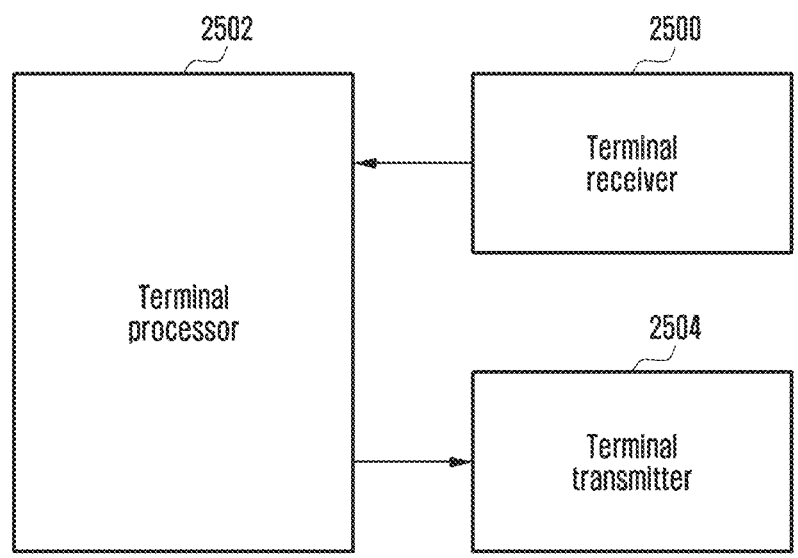
FIG. 25 is a diagram of an internal structure of a terminal, according to an embodiment.
Figure 26:
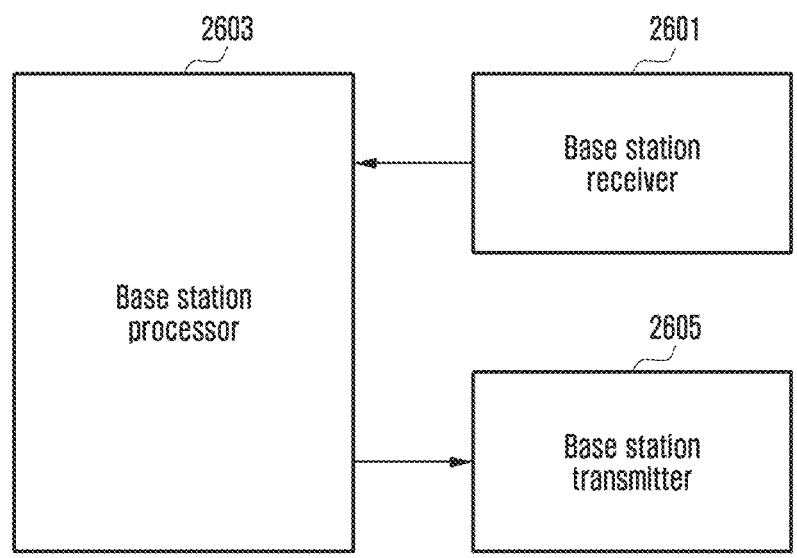
FIG. 26 is a diagram of an internal structure of a base station, according to an embodiment.

FIGS. 25 and 26 illustrate a transmitter, a receiver, and a processor of each of a terminal and a base station to perform the above embodiments. A method for transmitting an HARQ-ACK by a terminal is determined, and a method for performing transmission or reception by a terminal or a base station to perform AGC is shown. In order to perform the methods, each of the receiver, the processor, and the transmitter of the terminal and the base station are required to operate. A base station may be a terminal configured to perform transmission through a sidelink, or may be a conventional base station. A terminal may be a terminal configured to perform transmission or reception through a sidelink.

FIG. 25 is a diagram of an internal structure of a terminal, according to an embodiment. As illustrated in FIG. 25, a terminal of the disclosure may include a terminal receiver 2500, a terminal transmitter 2504, and a terminal processor 2502. The terminal receiver 2500 and the terminal transmitter 2504 may be collectively referred to as a transceiver in an embodiment. The transceiver may transmit or receive a signal to or from a base station. The signal may include control information and data. In order to transmit or receive a signal, the transceiver may include a RF transmitter configured to upregulate and amplify the frequency of a transmitted signal, a RF receiver configured to perform low-noise amplification on a received signal and downregulate the frequency of the signal, and the like. The transceiver may receive a signal through a wireless channel, then output the received signal to the terminal processor 2502, and transmit a signal output from the terminal processor 2502, through a wireless channel. The terminal processor 2502 may control a series of procedures to allow the terminal to be operated according to the aforementioned embodiments.

FIG. 26 is a diagram of an internal structure of a base station, according to an embodiment. As illustrated in FIG. 26, a base station of the disclosure may include a base station receiver 2601, a base station transmitter 2605, and a base station processor 2603. The base station receiver 2601 and the base station transmitter 2605 may be collectively referred to as a transceiver in an embodiment. The transceiver may transmit or receive a signal to or from a terminal. The signal may include control information and data. In order to transmit or receive a signal, the transceiver may include a RF transmitter configured to upregulate and amplify the frequency of a transmitted signal, a RF receiver configured to perform low-noise amplification on a received signal and downregulate the frequency of the signal, and the like. The transceiver may receive a signal through a wireless channel, then output the received signal to the base station processor 2603, and transmit a signal output from the base station processor 2603, through a wireless channel. The base station processor 2603 may control a series of procedures to allow the base station to be operated according to the aforementioned embodiments.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a terminal in a communication system, the method comprising:
    receiving, from a base station, configuration information on a list of physical uplink control channel (PUCCH) resources, wherein the PUCCH resources in the list correspond to a specific number of hybrid automatic repeat request acknowledgement (HARQ-ACK) information bits;
    receiving, from the base station, control signaling including a plurality of downlink control information (DCI) formats for a multicast data reception;
    receiving, from the base station, a plurality of data blocks on a physical downlink shared channel (PDSCH) based on the plurality of DCI formats;
    identifying a PUCCH resource from the list of the PUCCH resources based on data blocks that failed to be decoded among the plurality of data blocks; and
    transmitting, to the base station, on the identified PUCCH resource, HARQ-ACK information in response to the plurality of data blocks.

2. The method of claim 1, further comprising receiving, from the base station, information indicating that a HARQ feedback for the multicast data reception is enabled for the terminal.

3. The method of claim 1, wherein the HARQ-ACK information in response to the plurality of data blocks includes a Zadoff-Chu sequence with a cyclic shift value applied.

4. The method of claim 1, wherein the identified PUCCH resource is associated with a number of the data blocks that failed to be decoded.

5. The method of claim 1, wherein the plurality of DCI formats for the multicast data reception is received based on a radio network temporary identifier (RNTI) for the multicast data reception.

6. A method performed by a base station in a communication system, the method comprising:
    transmitting, to a terminal, configuration information on a list of physical uplink control channel (PUCCH) resources, wherein the PUCCH resources in the list correspond to a specific number of hybrid automatic repeat request acknowledgement (HARQ-ACK) information bits;
    transmitting, to the terminal, control signaling including a plurality of downlink control information (DCI) formats for a multicast data transmission;
    transmitting, to the terminal, a plurality of data blocks on a physical downlink shared channel (PDSCH) corresponding to the plurality of DCI formats; and
    receiving, from the terminal, on a PUCCH resource, HARQ-ACK information in response to the plurality of data blocks,
    wherein the PUCCH resource among the list of the PUCCH resources is associated with data blocks that failed to be decoded among the plurality of data blocks.

7. The method of claim 6, further comprising transmitting, to the terminal, information indicating that a HARQ feedback for the multicast data transmission is enabled for the terminal.

8. The method of claim 6, wherein the HARQ-ACK information in response to the plurality of data blocks includes a Zadoff-Chu sequence with a cyclic shift value applied.

9. The method of claim 6, wherein the PUCCH resource is associated with a number of the data blocks that failed to be decoded.

10. The method of claim 6, wherein the plurality of DCI formats for the multicast data transmission is transmitted based on a radio network temporary identifier (RNTI) for the multicast data transmission.

11. A terminal in a communication system, the terminal comprising:
    a transceiver; and
    a controller configured to:
        receive, from a base station, configuration information on a list of physical uplink control channel (PUCCH) resources, wherein the PUCCH resources in the list correspond to a specific number of hybrid automatic repeat request acknowledgement (HARQ-ACK) information bits,
        receive, from the base station, control signaling including a plurality of downlink control information (DCI) formats for a multicast data reception,
        receive, from the base station, a plurality of data blocks on a physical downlink shared channel (PDSCH) based on the plurality of DCI formats,
        identify a PUCCH resource from the list of the PUCCH resources based on data blocks that failed to be decoded among the plurality of data blocks, and
        transmit, to the base station, on the identified PUCCH resource, HARQ-ACK information in response to the plurality of data blocks.

12. The terminal of claim 11, wherein the controller is further configured to receive, from the base station, information indicating that a HARQ feedback for the multicast data reception is enabled for the terminal.

13. The terminal of claim 11, wherein the HARQ-ACK information in response to the plurality of data blocks includes a Zadoff-Chu sequence with a cyclic shift value applied.

14. The terminal of claim 11, wherein the identified PUCCH resource is associated with a number of the data blocks that failed to be decoded.

15. The terminal of claim 11, wherein the plurality of DCI formats for the multicast data reception is received based on a radio network temporary identifier (RNTI) for the multicast data reception.

16. A base station in a communication system, the base station comprising:
    a transceiver; and
    a controller configured to:
        transmit, to a terminal, configuration information on a list of physical uplink control channel (PUCCH) resources, wherein the PUCCH resources in the list correspond to a specific number of hybrid automatic repeat request acknowledgement (HARQ-ACK) information bits:

transmit, to the terminal, control signaling including a plurality of downlink control information (DCI) formats for a multicast data transmission, transmit, to the terminal, a plurality of data blocks on a physical downlink shared channel (PDSCH) corresponding to the plurality of DCI formats, and receive, from the terminal, on a PUCCH resource, HARQ-ACK information in response to the plurality of data blocks, wherein the PUCCH resource among the list of the PUCCH resources is associated with data blocks that failed to be decoded among the plurality of data blocks.

17. The base station of claim 16, wherein the controller is further configured to transmit, to the terminal, information indicating that a HARQ feedback for the multicast data transmission is enabled for the terminal.

18. The base station of claim 16, wherein the HARQ-ACK information in response to the plurality of data blocks includes a Zadoff-Chu sequence with a cyclic shift value applied.

19. The base station of claim 16, wherein the PUCCH resource is associated with a number of the data blocks that failed to be decoded.

20. The base station of claim 16, wherein the plurality of DCI formats for the multicast data transmission is transmitted based on a radio network temporary identifier (RNTI) for the multicast data transmission.

* * * * *